US011575869B2

(12) United States Patent
Hur et al.

(10) Patent No.: US 11,575,869 B2
(45) Date of Patent: *Feb. 7, 2023

(54) OVERLAY PROCESSING METHOD IN 360 VIDEO SYSTEM, AND DEVICE THEREOF

(71) Applicant: LG ELECTRONICS INC., Seoul (KR)

(72) Inventors: Hyejung Hur, Seoul (KR); Sejin Oh, Seoul (KR); Soojin Hwang, Seoul (KR); Jangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/038,880

(22) Filed: Sep. 30, 2020

(65) Prior Publication Data

US 2021/0014469 A1 Jan. 14, 2021

Related U.S. Application Data

(63) Continuation of application No. 16/490,049, filed as application No. PCT/KR2018/011323 on Sep. 21, 2018, now Pat. No. 10,848,737.

(Continued)

(30) Foreign Application Priority Data

Apr. 6, 2018 (KR) ........................ 10-2018-0040350
Jul. 4, 2018 (KR) ........................ 10-2018-0077375

(51) Int. Cl.
*H04N 19/162* (2014.01)
*H04N 19/169* (2014.01)
(Continued)

(52) U.S. Cl.
CPC ........... *H04N 13/178* (2018.05); *H04N 5/278* (2013.01); *H04N 13/161* (2018.05)

(58) Field of Classification Search
CPC .. G06F 3/011; G06F 3/04845; G06F 16/4393; G06F 16/50; G06F 16/58;
(Continued)

(56) References Cited

U.S. PATENT DOCUMENTS 9,648,225 B1 5/2017 Preston
10,754,242 B2 * 8/2020 Kim ...................... G06T 3/4038
(Continued)

FOREIGN PATENT DOCUMENTS

CN 1756313 4/2006
CN 103327217 9/2013
(Continued)

OTHER PUBLICATIONS

PCT International Application No. PCT/KR2018/011323, International Search Report dated Dec. 26, 2018, 22 pages.
(Continued)

*Primary Examiner* — Alison Slater
(74) *Attorney, Agent, or Firm* — Lee, Hong, Degerman, Kang & Waimey PC

(57) ABSTRACT

A 360 image data processing method performed by a 360 video receiving device, according to the present invention, comprises the steps of: receiving 360 image data; acquiring information and metadata on an encoded picture from the 360 image data; decoding the picture on the basis of the information on the encoded picture; and rendering the decoded picture and an overlay on the basis of the metadata, wherein the metadata includes overlay-related metadata, the overlay is rendered on the basis of the overlay-related metadata, and the overlay-related metadata includes information on a region of the overlay.

10 Claims, 47 Drawing Sheets

Related U.S. Application Data

(60) Provisional application No. 62/563,093, filed on Sep. 26, 2017.

(51) Int. Cl.

| | |
|---|---|
| ***H04N 19/187*** | (2014.01) |
| ***H04N 19/33*** | (2014.01) |
| ***H04N 19/62*** | (2014.01) |
| ***H04N 13/178*** | (2018.01) |
| ***H04N 13/161*** | (2018.01) |
| ***H04N 5/278*** | (2006.01) |

(58) Field of Classification Search

CPC .. G06F 16/7867; G06F 3/147; G06F 3/04815; G06F 3/04842; G06T 15/04; G06T 15/205; G06T 19/006; G06T 17/05; G06T 11/00; G06T 19/00; G06T 11/60; G06T 2200/32; G06T 3/4038; G06T 11/003; G06T 17/20; G06T 19/003; G06T 19/20; G06T 2200/24; G06T 2207/10016; G06T 2219/028; G06T 2219/2004; G06T 3/0062; G06T 17/00; H04N 21/44008; H04N 13/128; H04N 13/161; H04N 21/4312; H04N 21/435; H04N 13/178; H04N 13/183; H04N 13/239; H04N 13/279; H04N 13/332; H04N 13/344; H04N 13/363; H04N 19/167; H04N 19/46; H04N 21/816; H04N 19/597; H04N 21/4316; H04N 13/10; H04N 5/23238; H04N 13/293; H04N 13/139; H04N 13/194; H04N 21/234345; H04N 21/23614; H04N 21/2638; H04N 21/2393; H04N 21/4728; H04N 21/4884; H04N 21/6587; H04N 5/278; G06K 2009/2045; G06K 9/32; G06K 9/3233

See application file for complete search history.

(56) References Cited

U.S. PATENT DOCUMENTS

| | | | |
|---|---|---|---|
| 2008/0291217 A1 | 11/2008 | Vincent et al. | |
| 2011/0149036 A1* | 6/2011 | Suh | H04N 21/435 348/43 |
| 2012/0099836 A1 | 4/2012 | Welsh et al. | |
| 2013/0182072 A1 | 7/2013 | Seo et al. | |
| 2014/0019302 A1 | 1/2014 | Meadow et al. | |
| 2014/0375764 A1 | 12/2014 | Choe et al. | |
| 2015/0049086 A1 | 2/2015 | Morato et al. | |
| 2015/0172544 A1 | 6/2015 | Deng et al. | |
| 2016/0026253 A1 | 1/2016 | Bradski et al. | |
| 2016/0379415 A1 | 12/2016 | Espeset et al. | |
| 2018/0025752 A1 | 1/2018 | Patel et al. | |
| 2018/0295400 A1 | 10/2018 | Thomas et al. | |
| 2018/0302590 A1 | 10/2018 | Kuzyakov et al. | |
| 2018/0330112 A1 | 11/2018 | Racz et al. | |
| 2018/0343470 A1 | 11/2018 | Schmit | |
| 2019/0037173 A1 | 1/2019 | Lee et al. | |
| 2019/0065595 A1 | 2/2019 | Cain et al. | |
| 2019/0075351 A1 | 3/2019 | Hall et al. | |
| 2019/0200096 A1* | 6/2019 | Katsumata | H04N 21/23439 |
| 2019/0306519 A1 | 10/2019 | Chen et al. | |
| 2019/0379876 A1 | 12/2019 | Hur et al. | |
| 2020/0045286 A1* | 2/2020 | Boyce | H04N 13/117 |
| 2021/0112233 A1* | 4/2021 | Hannuksela | H04N 13/111 |

FOREIGN PATENT DOCUMENTS

| | | |
|---|---|---|
| CN | 103607568 | 2/2014 |
| CN | 103635953 | 3/2014 |
| CN | 103905744 | 7/2014 |
| CN | 106231183 | 12/2016 |
| CN | 106231317 | 12/2016 |
| CN | 107113414 | 8/2017 |
| EP | 1614997 | 1/2006 |
| KR | 1020070122179 | 12/2007 |
| KR | 101295002 | 8/2013 |
| KR | 1020140037144 | 3/2014 |
| KR | 101403317 | 6/2014 |
| KR | 1020170012979 | 2/2017 |
| WO | 2015174501 | 11/2015 |
| WO | 2017142353 | 8/2017 |

OTHER PUBLICATIONS

U.S. Appl. No. 16/490,049, Office Action dated Dec. 17, 2019, 26 pages.

U.S. Appl. No. 16/490,049, Office Action dated May 1, 2020, 22 pages.

U.S. Appl. No. 16/490,049, Notice of Allowance dated Jul. 22, 2020, 10 pages.

European Patent Office Application Serial No. 18862956.2, Search Report dated May 10, 2021, 12 pages.

LG Electronics, "[OMAF] On Support of Timed Text for Omnidirectional Video", International Organisation for Standardisation ; ISO/IEC JTC1/SC29/WG11; Coding of Moving Pictures and Audio; Jul. 2017, 3 pages.

The State Intellectual Property Office of the People's Republic of China Application Serial No. 201880061896.0, Office Action dated Jul. 5, 2021, 6 pages.

Qian et al., "Optimizing 360 Video Delivery Over Celluar Networks", All Things Cellular '16, Oct. 2016, 6 pages.

Lyu et al., "The Study of Building 360 Video", China Academic Journal Electronics Publishing House, vol. 6 No. 1, Jan. 2017, 7 pages.

The State Intellectual Property Office of the People's Republic of China Application Serial No. 201880061896.0, Notice of Allowance dated Feb. 14, 2022, 5 pages.

* cited by examiner

FIG. 2

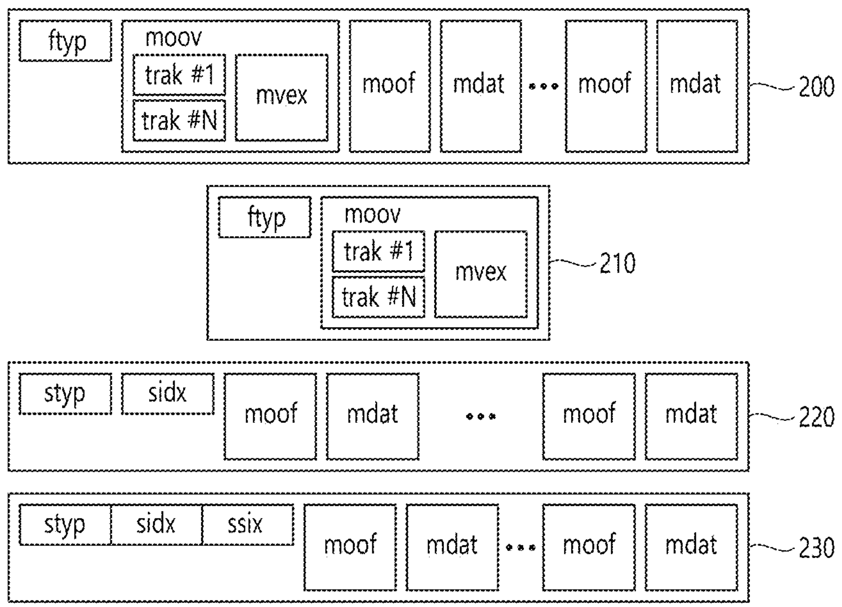

250

```
aligned(8) class Box (unsigned int(32) boxtype, optional
unsigned int(8)[16] extended_type)
{
   unsigned int(32) size;
   unsigned int(32) type = boxtype;
   if (size==1) {
      unsigned int(64) largesize;
   } else if (size==0) {
   //      box extends to end of file
   }
   if (boxtype=='uuid') {
      unsigned int(8)[16] usertype = extended_type;
   }
}
```

```
aligned(8) class FullBox(unsigned int(32) boxtype, unsigned int(8)
v, bit(24) f) extends Box(boxtype) {
   unsigned int(8)         version = v;
   bit(24)                   flags = f;
}
```

FIG. 11

```
...
        <Default metadata>
unsigned    int(8)     vr_geometry;
unsigned    int(8)     projection_schme;

        <Stereoscopic related metadata>
unsigned    int(1)     is_stereoscopic;
unsigned    int(3)     stereo_mode;

        <Initial view related metadata>
signed      int(8)     initial_view_yaw_degree;
signed      int(8)     initial_view_pitch_degree;
signed      int(8)     initial_view_roll_degree;

        <ROI related metadata>
unsigned int(1)        2d_roi_range_flag;
unsigned int(1)        3d_roi_range_flag;
if (2d_roi_region_flag==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_roi_region_flag==1{
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}

        <Field of View related metadata>
unsigned int(1)        content_fov_flag;
if (content_fov_flag==1) {
  unsigned int(16)     content_fov;
}

        <Cropped Region related metadata>
unsigned int(1)        is_copped_region;
if (content_fov_flag==1) {
  unsigned int(16)     cr_region_left_top_x;
  unsigned int(16)     cr_region_left_top_y;
  unsigned int(16)     cr_region_width;
  unsigned int(16)     cr_region_height;
}
...
```

(a) (b) (c)

When positioned on 3D space

Exemplary opacity of overlay plane – image of VR media image is shown

Blending option –

Focus effect – other parts are processed with blur effect

OVERLAY PROCESSING METHOD IN 360 VIDEO SYSTEM, AND DEVICE THEREOF

CROSS-REFERENCE TO RELATED APPLICATIONS

This application is a continuation of U.S. patent application Ser. No. 16/490,049, filed on Aug. 29, 2019, which is the National Stage filing under 35 U.S.C. 371 of International Application No. PCT/KR2018/011323, filed on Sep. 21, 2018, which claims the benefit of earlier filing date and right of priority to U.S. Provisional Application No. 62/563,093, filed on Sep. 26, 2017, and also claims the benefit of Korean Application Nos. 10-2018-0040350, filed on Apr. 6, 2018, and 10-2018-0077375, filed on Jul. 4, 2018, the contents of which are all incorporated by reference herein in their entirety.

BACKGROUND OF THE INVENTION

Field of the Invention

The present invention relates to 360 video (or 360-degree video) and, most particularly, to an overlay processing method in a 360 video system and a device thereof.

Related Art

Virtual reality (VR) systems allow users to feel as if they are in electronically projected environments. Systems for providing VR can be improved in order to provide images with higher picture quality and spatial sounds. VR systems allow users to interactively consume VR content.

SUMMARY OF THE INVENTION

Technical Objects

A technical object of the present invention is to provide a 360 video data processing method and a device thereof.

Another technical object of the present invention is to provide a method and device for transmitting metadata for 360 video data.

Yet another technical object of the present invention is to provide a method and device for overlay processing for a 360 video.

A further technical object of the present invention is to provide a method and device for transmitting metadata for an overlay for a 360 video.

Technical Solutions

According to an exemplary embodiment of the present invention, provided herein is a 360-degree image data processing method performed by a 360-degree video receiving device. The method may include the steps of receiving 360-degree image data, acquiring information on an encoded picture and metadata from the 360-degree image data, decoding a picture based on the information on the encoded picture, and rendering the decoded picture and an overlay based on the metadata, wherein the metadata may include overlay related metadata, wherein the overlay may be rendered based on the overlay related metadata, and wherein the overlay related metadata may include information on a region of the overlay.

According to another exemplary embodiment of the present invention, provided herein is a 360-degree video receiving device. The device may include a reception processor receiving 360-degree image data and acquiring information on an encoded picture and metadata from the 360-degree image data, a data decoder decoding a picture based on the information on the encoded picture, and a renderer rendering the decoded picture and an overlay based on the metadata, wherein the metadata may include overlay related metadata, wherein the renderer may render the overlay based on the overlay related metadata, and wherein the overlay related metadata may include information on a region of the overlay.

According to yet another exemplary embodiment of the present invention, provided herein is a 360-degree image data processing method performed by a 360-degree video transmitting device. The method may include the steps of acquiring a 360-degree image, deriving a picture by processing the 360-degree image, generating metadata related to the 360-degree image, encoding the picture, and performing processing for storing or transmission of the encoded picture and the metadata, wherein the metadata may include overlay related metadata, and wherein the overlay related metadata may include information on a region of the overlay.

According to a further exemplary embodiment of the present invention, provided herein is a 360-degree image data processing method performed by a 360-degree video transmitting device. The device may include a data input unit acquiring a 360-degree image, a projection processor deriving a picture by processing the 360-degree image, a metadata processor generating metadata related to the 360-degree image, a data encoder encoding the picture, and a transmission processor performing processing for storing or transmission of the encoded picture and the metadata, wherein the metadata may include overlay related metadata, and wherein the overlay related metadata may include information on a region of the overlay.

Effects of the Invention

According to the present invention, VR contents (360 contents) may be efficiently transmitted in an environment supporting next generation hybrid broadcasting, which uses both the terrestrial network and the Internet network.

According to the present invention, when a user consumes 360 contents, a solution for providing interactive experience may be proposed.

According to the present invention, when a user consumes 360 contents, a solution for performing signaling so that the intentions of a 360 contents provider can be accurately reflected may be proposed.

According to the present invention, when delivering 360 contents, a solution for efficiently expanding transmission capacity and allowing the necessary information to be transported (or delivered) may be proposed.

According to the present invention, an overlay may be efficiently provided to the 360 video, and user viewpoint based auxiliary information may be efficiently displayed.

According to the present invention, a link to a specific target may be provided through an overlay for the 360 video.

According to the present invention, a link for efficient screen shifting or auxiliary information provision may be provided through an overlay.

According to the present invention, signaling information corresponding to the 360-degree video data may be efficiently stored and transmitted via International Organization for Standardization (ISO) based media file formats, such as ISO base media file format (ISOBMFF), and so on.

According to the present invention, signaling information corresponding to the 360-degree video data may be transmitted via HyperText Transfer Protocol (HTTP) based adaptive streaming, such as Dynamic Adaptive Streaming over HTTP (DASH), and so on.

According to the present invention, signaling information corresponding to the 360-degree video data may be stored and transmitted via Supplemental enhancement information (SEI) message or Video Usability Information (VUI), and, accordingly, an overall transmission efficiency may be enhanced.

BRIEF DESCRIPTION OF THE DRAWINGS

FIGS. 2 and 3 are views illustrating a structure of a media file according to an embodiment of the present invention.

FIG. 11 shows an example of 360 video related metadata according to an exemplary embodiment of the present invention.

DESCRIPTION OF EXEMPLARY EMBODIMENTS

Figure 1:
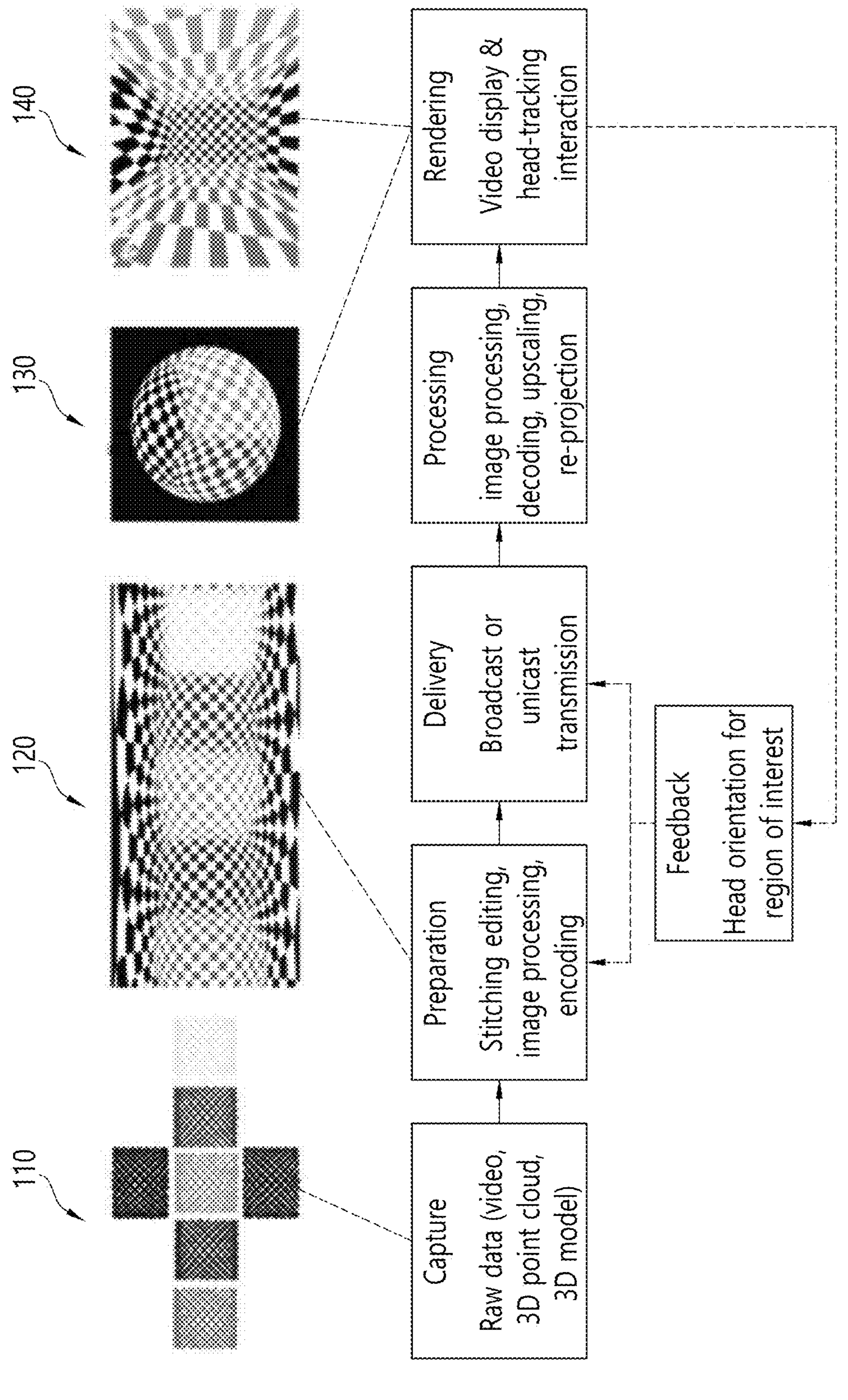
FIG. 1 is a view illustrating overall architecture for providing a 360-degree video according to the present invention.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as “include” and “have” are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, preferred embodiments of the present invention will be described in more detail with reference to the attached drawings. Hereinafter, the same reference numbers will be used throughout this specification to refer to the same components and redundant description of the same component will be omitted.

FIG. 1 is a view illustrating overall architecture for providing a 360-degree video according to the present invention.

The present invention proposes a method of providing 360-degree content in order to provide virtual reality (VR) to users. VR may refer to technology for replicating actual or virtual environments or those environments. VR artificially provides sensory experience to users and thus users can experience electronically projected environments.

360-degree content refers to content for realizing and providing VR and may include a 360-degree video and/or 360-degree audio. The 360-degree video may refer to video or image content which is necessary to provide VR and is captured or reproduced omnidirectionally (360 degrees). Hereinafter, the 360 video may refer to 360-degree video. A 360-degree video may refer to a video or an image represented on 3D spaces in various forms according to 3D models. For example, a 360-degree video can be represented on a spherical surface. The 360-degree audio is audio content for providing VR and may refer to spatial audio content whose audio generation source can be recognized to be located in a specific 3D space. 360-degree content may be generated, processed and transmitted to users and users can consume VR experiences using the 360-degree content. A 360-degree video may be referred to as an omnidirectional video, and a 360-degree image may be referred to as an omnidirectional image.

Particularly, the present invention proposes a method for effectively providing a 360-degree video. To provide a 360-degree video, a 360-degree video may be captured through one or more cameras. The captured 360-degree video may be transmitted through series of processes and a reception side may process the transmitted 360-degree video into the original 360-degree video and render the 360-degree video. In this manner, the 360-degree video can be provided to a user.

Specifically, processes for providing a 360-degree video may include a capture process, a preparation process, a transmission process, a processing process, a rendering process and/or a feedback process.

The capture process may refer to a process of capturing images or videos for a plurality of viewpoints through one or more cameras. Image/video data (110) shown in FIG. 1 may be generated through the capture process. Each plane of (110) in FIG. 1 may represent an image/video for each viewpoint. A plurality of captured images/videos may be referred to as raw data. Metadata related to capture can be generated during the capture process.

For capture, a special camera for VR may be used. When a 360-degree video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image (120) in FIG. 1.

Video data projected on the 2D image may be subjected to the region-wise packing process in order to improve video coding efficiency. Region-wise packing may refer to a process of processing video data projected on a 2D image for each region. Here, regions may refer to divided areas of a 2D image on which 360-degree video data is projected. Regions can be obtained by dividing a 2D image equally or arbitrarily according to an embodiment. Further, regions may be divided according to a projection scheme in an embodiment. The region-wise packing process is an optional process and may be omitted in the preparation process.

The processing process may include a process of rotating regions or rearranging the regions on a 2D image in order to improve video coding efficiency according to an embodiment. For example, it is possible to rotate regions such that specific sides of regions are positioned in proximity to each other to improve coding efficiency.

The processing process may include a process of increasing or decreasing resolution for a specific region in order to differentiate resolutions for regions of a 360-degree video according to an embodiment. For example, it is possible to increase the resolution of regions corresponding to relatively more important regions in a 360-degree video to be higher than the resolution of other regions. Video data projected on the 2D image or region-wise packed video data may be subjected to the encoding process through a video codec.

According to an embodiment, the preparation process may further include an additional editing process. In this editing process, editing of image/video data before and after projection may be performed. In the preparation process, metadata regarding stitching/projection/encoding/editing may also be generated. Further, metadata regarding an initial viewpoint or a region of interest (ROI) of video data projected on the 2D image may be generated.

The transmission process may be a process of processing and transmitting image/video data and metadata which have passed through the preparation process. Processing according to an arbitrary transmission protocol may be performed for transmission. Data which has been processed for transmission may be delivered through a broadcast network and/or a broadband. Such data may be delivered to a reception side in an on-demand manner. The reception side may receive the data through various paths.

The processing process may refer to a process of decoding received data and re-projecting projected image/video data on a 3D model. In this process, image/video data projected on the 2D image may be re-projected on a 3D space. This process may be called mapping or projection according to context. Here, 3D model to which image/video data is mapped may have different forms according to 3D models. For example, 3D models may include a sphere, a cube, a cylinder and a pyramid.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form (130) shown in FIG. 1. The form (130) shown in FIG. 1 corresponds to a case in which the image/video is re-projected on a 3D spherical model. A user can view a region of the rendered image/video through a VR display. Here, the region viewed by the user may have a form (140) shown in FIG. 1.

The feedback process may refer to a process of delivering various types of feedback information which can be acquired in a display process to a transmission side. Interactivity in consumption of a 360-degree video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

The head orientation information may refer to information about the position, angle, motion and the like of the head of a user. Based on this information, information about a region in a 360-degree video which is currently viewed by the user, that is, viewport information, can be calculated.

The viewport information may be information about a region in a 360-degree video which is currently viewed by a user. Gaze analysis may be performed through the viewpoint information to check how the user consumes the 360-degree video, which region of the 360-degree video is gazed by the user, how long the region is gazed, and the like. Gaze analysis may be performed at a reception side and a result thereof may be delivered to a transmission side through a feedback channel. A device such as a VR display may extract a viewport region based on the position/direction of the head of a user, information on a vertical or horizontal field of view (FOV) supported by the device, and the like.

According to an embodiment, the aforementioned feedback information may be consumed at a reception side as well as being transmitted to a transmission side. That is, decoding, re-projection and rendering at the reception side may be performed using the aforementioned feedback information. For example, only a 360-degree video with respect to a region currently viewed by the user may be preferentially decoded and rendered using the head orientation information and/or the viewport information.

Here, a viewport or a viewport region may refer to a region in a 360-degree video being viewed by a user. A viewpoint is a point in a 360-degree video being viewed by a user and may refer to a center point of a viewport region. That is, a viewport is a region having a viewpoint at the center thereof, and the size and the shape of the region can be determined by an FOV which will be described later.

In the above-described overall architecture for providing a 360-degree video, image/video data which is subjected to the capture/projection/encoding/transmission/decoding/re-projection/rendering processes may be referred to as 360-degree video data. The term "360-degree video data" may be used as the concept including metadata and signaling information related to such image/video data.

To store and transmit media data such as the aforementioned audio and video data, a standardized media file format may be defined. According to an embodiment, a media file may have a file format based on ISO BMFF (ISO base media file format).

Figure 3:
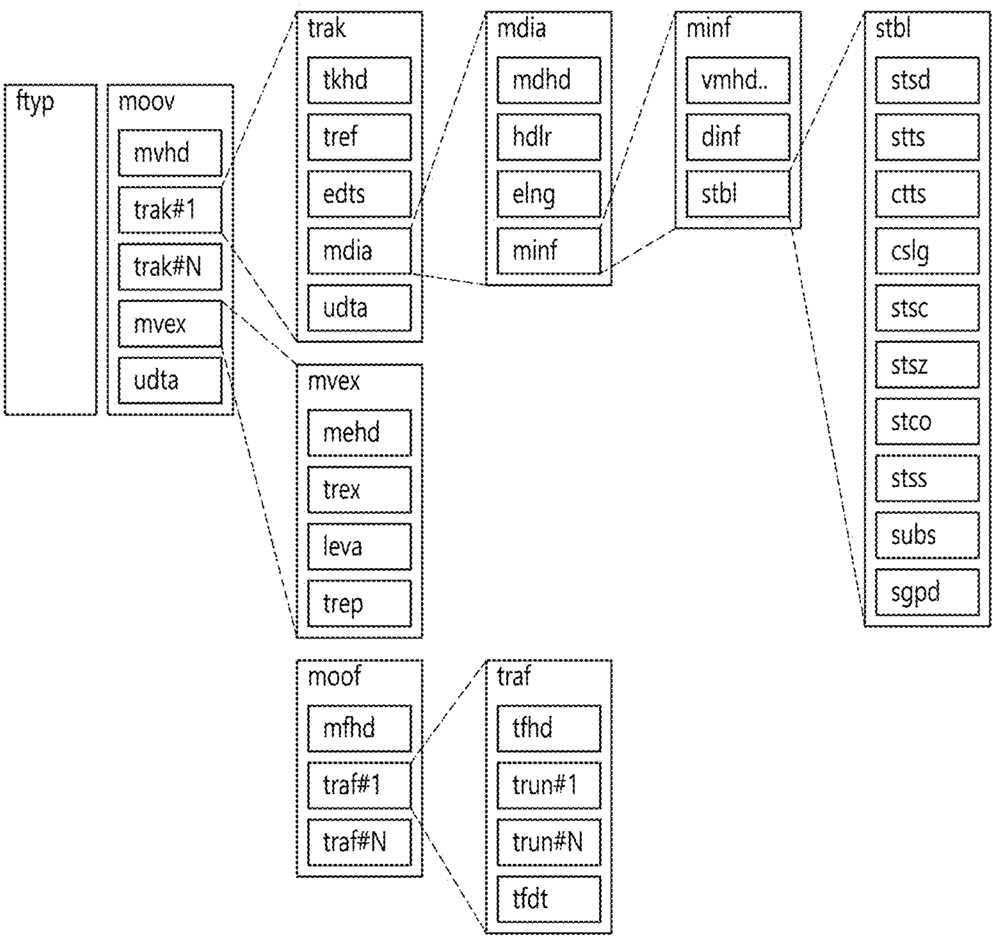

FIGS. 2 and 3 are views illustrating a structure of a media file according to an embodiment of the present invention.

The media file according to the present invention may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to the present invention may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to the present invention may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment (210) may include information related to media decoder initialization except media data. This file may correspond to the aforementioned initialization segment, for example. The initialization segment can include the aforementioned ftyp box and/or moov box.

A file of the illustrated embodiment (220) may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment (230), an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment (250). In the present embodiment, a size field and a large size field can represent the length of the corresponding box in bytes. A version field can indicate the version of the corresponding box format. A type field can indicate the type or identifier of the corresponding box. A flags field can indicate a flag associated with the corresponding box.

Figure 4:
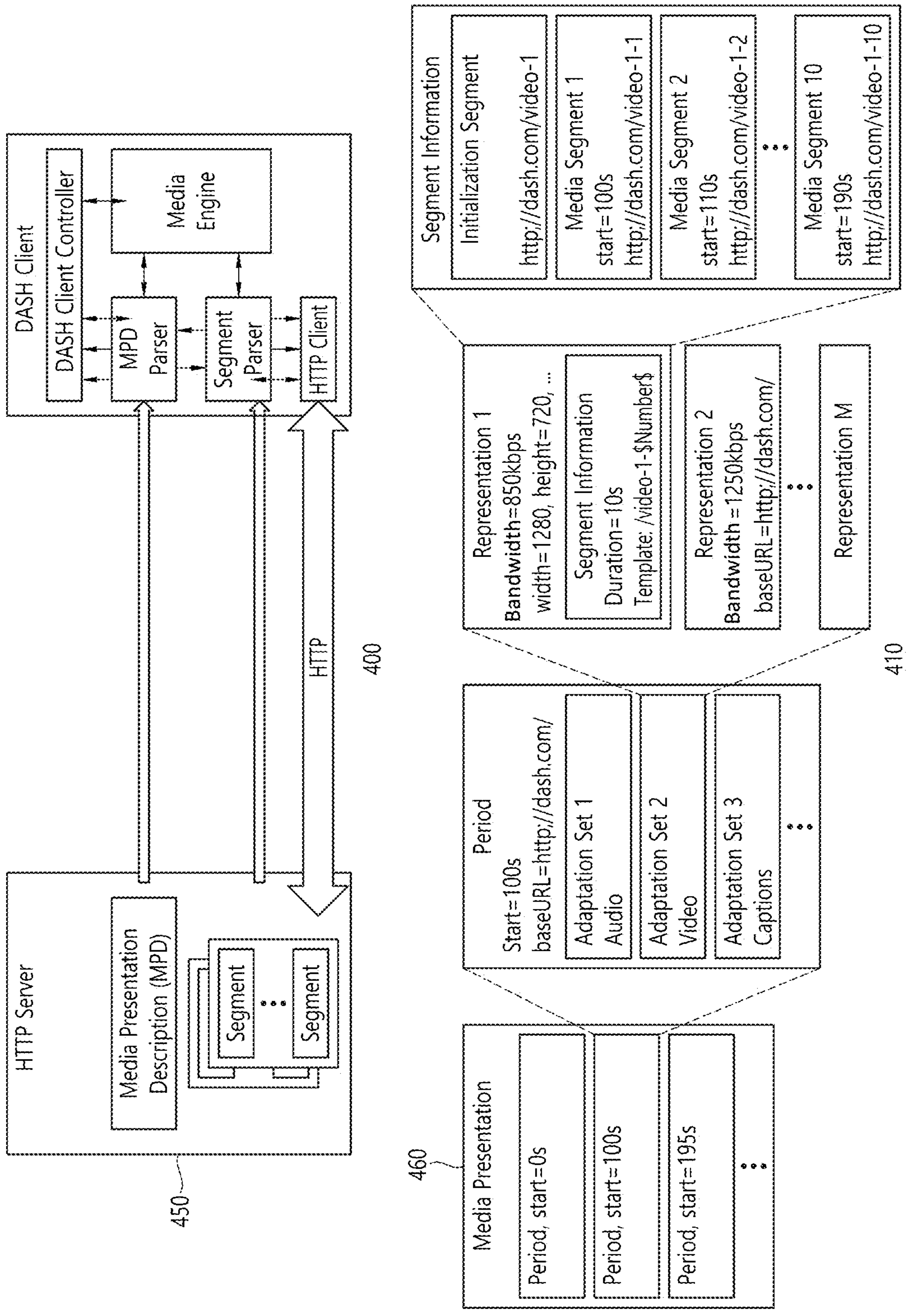
FIG. 4 illustrates an example of the overall operation of a DASH-based adaptive streaming model.

FIG. 4 illustrates an example of the overall operation of a DASH-based adaptive streaming model. The DASH-based adaptive streaming model according to an illustrated embodiment (400) illustrates an operation between an HTTP server and a DASH client. Here, Dynamic Adaptive Streaming over HTTP (DASH) is a protocol for supporting HTTP-based adaptive streaming and can dynamically support streaming according to a network state. Accordingly, AV content may be seamlessly reproduced.

First, the DASH client may acquire an MPD. The MPD may be delivered from a service provider, such as the HTTP server. The DASH client may request a segment from the server using segment access information described in the MPD. Here, this request may be performed in view of the network condition.

After acquiring the segment, the DASH client may process the segment in a media engine and may display the segment on a screen. The DASH client may request and acquire a necessary segment in view of reproduction time and/or the network state in real time (adaptive streaming). Accordingly, content may be seamlessly reproduced.

The media presentation description (MPD) is a file including detailed information for allowing the DASH client to dynamically acquire a segment and may be expressed in XML format.

A DASH client controller may generate a command to request an MPD and/or a segment in view of the network state. In addition, the controller may control acquired information to be used in an internal block, such as the media engine.

An MPD parser may parse the acquired MPD in real time. Accordingly, the DASH client controller can generate a command to acquire a required segment.

A segment parser may parse the acquired segment in real time. Depending on pieces of information included in the segment, internal blocks including the media engine may perform certain operations.

An HTTP client may request a required MPD and/or segment from the HTTP server. The HTTP client may also deliver an MPD and/or segment acquired from the server to the MPD parser or the segment parser.

The media engine may display content on a screen using media data included in the segment. Here, pieces of information of the MPD may be used.

A DASH data model may have a hierarchical structure (410). A media presentation may be described by the MPD. The MPD may describe a temporal sequence of a plurality of periods forming a media presentation. A period may represent one section of media content.

In one section, pieces of data may be included in adaptation sets. An adaptation set may be a collection of a plurality of media content components that can be exchanged with each other. An adaptation set may include a collection of representations. A representation may correspond to a media content component. Within one representation, content may be temporally divided into a plurality of segments, which may be for proper accessibility and delivery. The URL of each segment may be provided to enable access to each segment.

The MPD may provide information related to the media presentation, and a period element, an adaptation set element, and a presentation element may describe a period, an adaptation set, and a presentation, respectively. A representation may be divided into sub-representations, and a sub-representation element may describe a sub-representation.

Common properties/elements may be defined, which may be applied to (included in) an adaptation set, a representation, a sub-representation, or the like. Among the common properties/elements, there may be an essential property and/or a supplemental property.

The essential property may be information including elements that are considered essential in processing media presentation-related data. The supplemental property may be information including elements that may be used for processing the media presentation-related data. Descriptors to be described in the following embodiments may be defined and delivered in an essential property and/or a supplemental property when delivered via the MPD.

Figure 5:
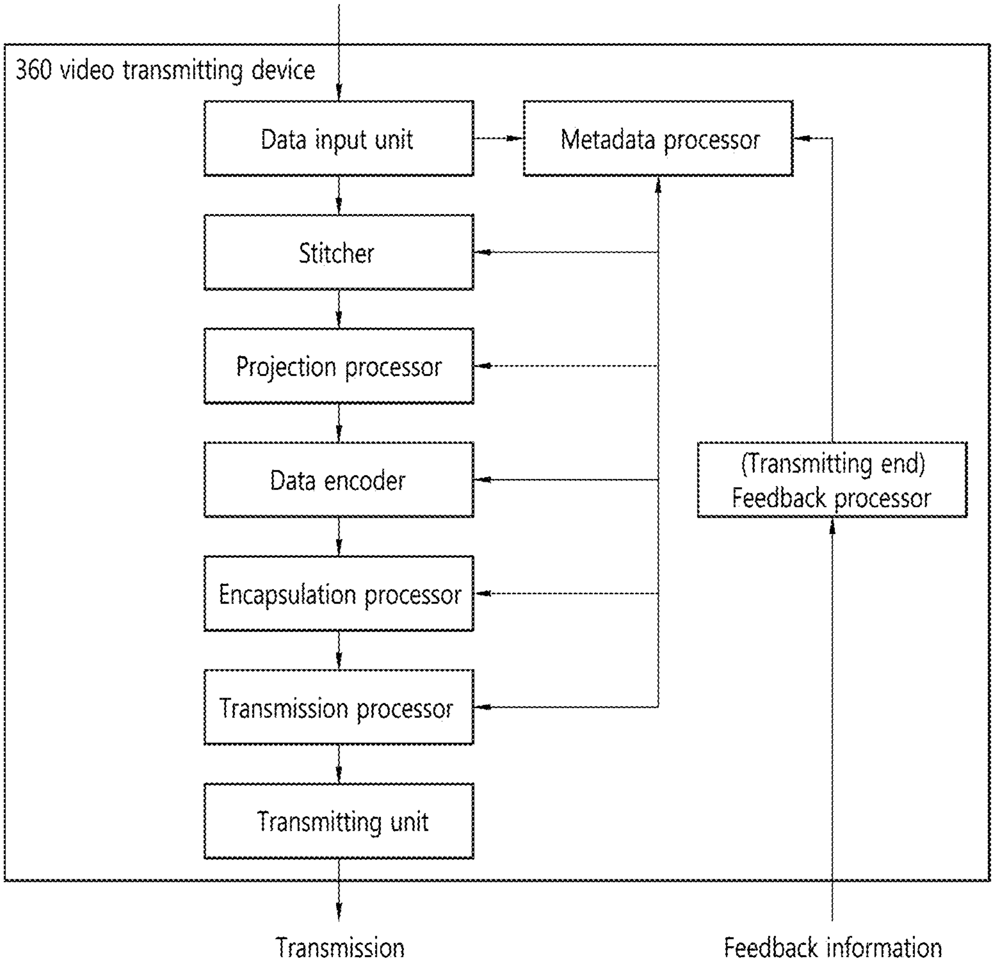
FIG. 5 is a view schematically illustrating a configuration of a 360-degree video transmission apparatus to which the present invention is applicable.

FIG. 5 is a view schematically illustrating a configuration of a 360-degree video transmission apparatus to which the present invention is applicable.

The 360-degree video transmission apparatus according to the present invention can perform operations related the above-described preparation process and the transmission process. The 360-degree video transmission apparatus may include a data input unit, a stitcher, a projection processor, a region-wise packing processor (not shown), a metadata processor, a (transmission side) feedback processor, a data encoder, an encapsulation processor, a transmission processor, and/or a transmitter as internal/external elements.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360-degree video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360-degree video data on a 2D image. The projection processor may perform projection according to various schemes which will be described later. The projection processor may perform mapping in consideration of the depth of 360-degree video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) can perform the aforementioned region-wise packing process. That is, the region-wise packing processor can perform the process of dividing the projected 360-degree video data into regions and rotating and rearranging regions or changing the resolution of each region. As described above, the region-wise packing process is optional and thus the region-wise packing processor may be omitted when region-wise packing is not performed. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor can process metadata which may be generated in a capture process, a stitching process, a projection process, a region-wise packing process, an encoding process, an encapsulation process and/or a process for transmission. The metadata processor can generate 360-degree video-related metadata using such metadata. According to an embodiment, the metadata processor may generate the 360-degree video-related metadata in the form of a signaling table. 360-degree video-related metadata may also be called metadata or 360-degree video related signaling information according to signaling context. Further, the metadata processor may forward the acquired or generated metadata to internal elements of the 360-degree video transmission apparatus as necessary. The metadata processor may forward the 360-degree video-related metadata to the data encoder, the encapsulation processor and/or the transmission processor such that the 360-degree video-related metadata can be transmitted to a reception side.

The data encoder can encode the 360-degree video data projected on the 2D image and/or region-wise packed 360-degree video data. The 360-degree video data can be encoded in various formats.

The encapsulation processor can encapsulate the encoded 360-degree video data and/or 360-degree video-related metadata in a file format. Here, the 360-degree video-related metadata may be received from the metadata processor. The encapsulation processor can encapsulate the data in a file format such as ISOBMFF, CFF or the like or process the data into a DASH segment or the like. The encapsulation processor may include the 360-degree video-related metadata in a file format. The 360-degree video-related metadata may be included in a box having various levels in ISOBMFF or may be included as data of a separate track in a file, for example. According to an embodiment, the encapsulation processor may encapsulate the 360-degree video-related metadata into a file. The transmission processor may perform processing for transmission on the encapsulated 360-degree video data according to file format. The transmission processor may process the 360-degree video data according to an arbitrary transmission protocol. The processing for transmission may include processing for delivery over a broadcast network and processing for delivery over a broadband. According to an embodiment, the transmission processor may receive 360-degree video-related metadata from the metadata processor as well as the 360-degree video data and perform the processing for transmission on the 360-degree video-related metadata.

The transmitter can transmit the 360-degree video data and/or the 360-degree video-related metadata processed for transmission through a broadcast network and/or a broadband. The transmitter may include an element for transmission through a broadcast network and/or an element for transmission through a broadband.

According to an embodiment of the 360-degree video transmission apparatus according to the present invention, the 360-degree video transmission apparatus may further include a data storage unit (not shown) as an internal/external element. The data storage unit may store encoded 360-degree video data and/or 360-degree video-related metadata before the encoded 360-degree video data and/or 360-degree video-related metadata are delivered to the transmission processor. Such data may be stored in a file format such as ISOBMFF. Although the data storage unit may not be required when 360-degree video is transmitted in real time, encapsulated 360-degree data may be stored in the data storage unit for a certain period of time and then transmitted when the encapsulated 360-degree data is delivered over on demand, NRT (Non Real Time), a broadband, and the like.

According to another embodiment of the 360-degree video transmission apparatus according to the present invention, the 360-degree video transmission apparatus may further include a (transmission side) feedback processor and/or a network interface (not shown) as internal/external elements. The network interface can receive feedback information from a 360-degree video reception apparatus according to the present invention and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360-degree video data processing.

According to another embodiment of the 360-degree video transmission apparatus according to the present invention, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360-degree video data on a spherical surface before projection. Information about region rotation, that is, rotation directions, angles and the like may be signaled through 360-degree video-related metadata. According to another embodiment of the 360-degree video transmission apparatus according to the present invention, the data encoder may perform encoding differently for respective regions. The data encoder may encode a specific region in high quality and encode other regions in low quality. The transmission side feedback processor may forward feedback information received from the 360-degree video reception apparatus to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360-degree video transmission apparatus according to the present invention, the transmission processor may perform processing for transmission differently for respective regions. The transmission processor may apply different transmission parameters (modulation orders, code rates, and the like) to the respective regions such that data delivered to the respective regions have different robustness.

Here, the transmission side feedback processor may forward feedback information received from the 360-degree video reception apparatus to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360-degree video transmission apparatus according to the present invention may be hardware elements. According to an embodiment, the internal/external elements may be changed, omitted, replaced by other elements or integrated.

Figure 6:
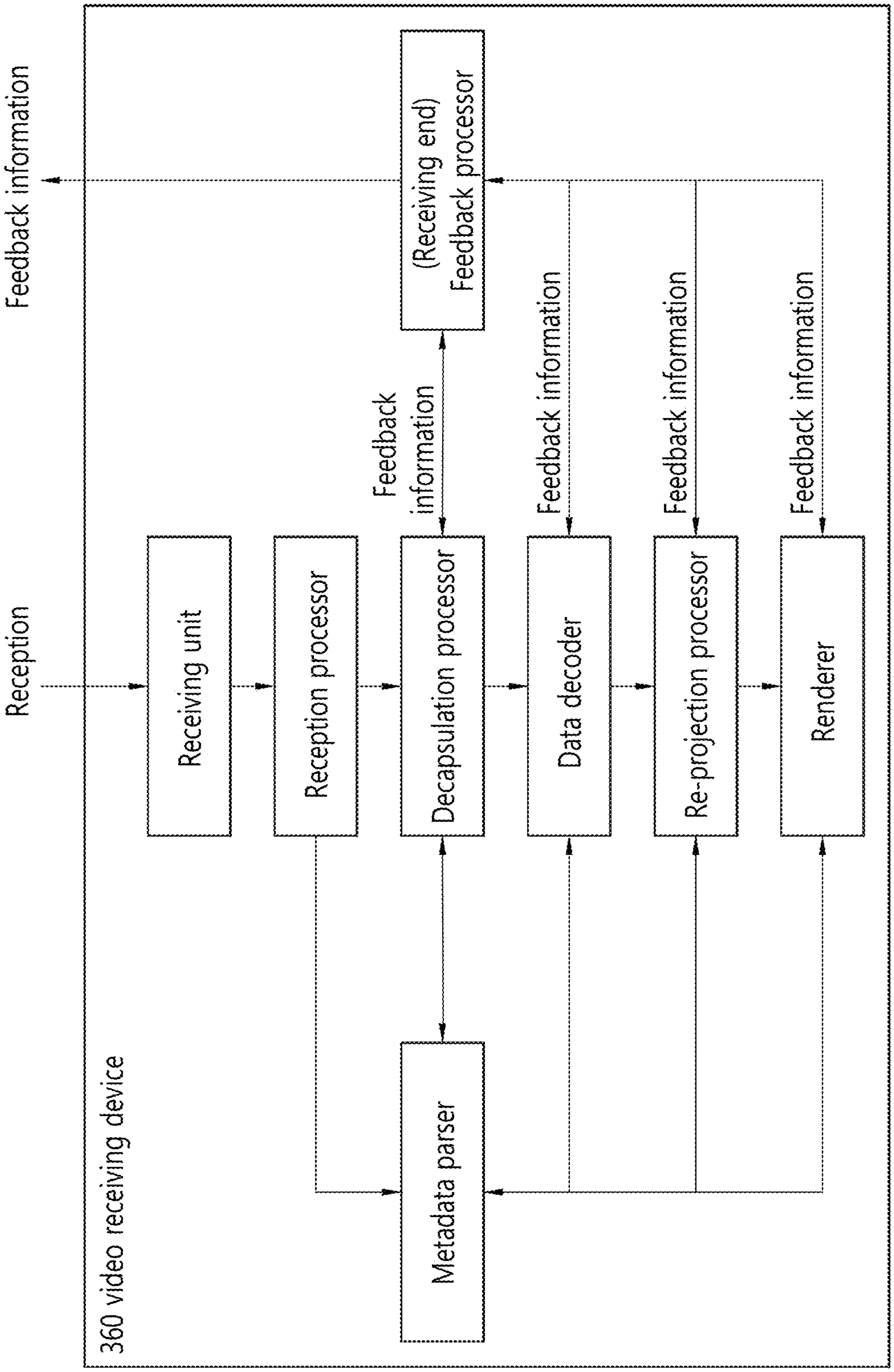
FIG. 6 is a view schematically illustrating a configuration of a 360-degree video reception apparatus to which the present invention is applicable.

FIG. 6 is a view schematically illustrating a configuration of a 360-degree video reception apparatus to which the present invention is applicable.

The 360-degree video reception apparatus according to the present invention can perform operations related to the above-described processing process and/or the rendering process. The 360-degree video reception apparatus may include a receiver, a reception processor, a decapsulation processor, a data decoder, a metadata parser, a (reception side) feedback processor, a re-projection processor, and/or a renderer as internal/external elements. A signaling parser may be called the metadata parser.

The receiver can receive 360-degree video data transmitted from the 360-degree video transmission apparatus according to the present invention. The receiver may receive the 360-degree video data through a broadcast network or a broadband depending on a channel through which the 360-degree video data is transmitted.

The reception processor can perform processing according to a transmission protocol on the received 360-degree video data. The reception processor may perform a reverse process of the process of the aforementioned transmission processor such that the reverse process corresponds to processing for transmission performed at the transmission side. The reception processor can forward the acquired 360-degree video data to the decapsulation processor and forward acquired 360-degree video-related metadata to the metadata parser. The 360-degree video-related metadata acquired by the reception processor may have the form of a signaling table.

The decapsulation processor can decapsulate the 360-degree video data in a file format received from the reception processor. The decapsulation processor can acquire 360-degree video data and 360-degree video-related metadata by decapsulating files in ISOBMFF or the like. The decapsulation processor can forward the acquired 360-degree video data to the data decoder and forward the acquired 360-degree video-related metadata to the metadata parser. The 360-degree video-related metadata acquired by the decapsulation processor may have the form of a box or a track in a file format. The decapsulation processor may receive metadata necessary for decapsulation from the metadata parser as necessary.

The data decoder can decode the 360-degree video data. The data decoder may receive metadata necessary for decoding from the metadata parser. The 360-degree video-related metadata acquired in the data decoding process may be forwarded to the metadata parser.

The metadata parser can parse/decode the 360-degree video-related metadata. The metadata parser can forward acquired metadata to the data decapsulation processor, the data decoder, the re-projection processor and/or the renderer.

The re-projection processor can perform re-projection on the decoded 360-degree video data. The re-projection processor can re-project the 360-degree video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360-degree video data corresponding to a specific area of the 3D space on the 3D space using metadata necessary for re-projection.

The renderer can render the re-projected 360-degree video data. As described above, re-projection of 360-degree video data on a 3D space may be represented as rendering of 360-degree video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360-degree video through a VR display or the like. The VR display is a device which reproduces a 360-degree video and may be included in a 360-degree video reception apparatus (tethered) or connected to the 360-degree video reception apparatus as a separate device (un-tethered).

According to an embodiment of the 360-degree video reception apparatus according to the present invention, the 360-degree video reception apparatus may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360-degree video transmission apparatus.

As described above, the feedback information may be consumed at the reception side as well as being transmitted to the transmission side. The reception side feedback processor may forward the acquired feedback information to internal elements of the 360-degree video reception apparatus such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360-degree video reception apparatus according to the present invention may be hardware elements. According to an embodiment, the internal/external elements may be changed, omitted, replaced by other elements or integrated. According to an embodiment, additional elements may be added to the 360-degree video reception apparatus.

Another aspect of the present invention may pertain to a method for transmitting a 360-degree video and a method for receiving a 360-degree video. The methods for transmitting/receiving a 360-degree video according to the present invention may be performed by the above-described 360-degree video transmission/reception apparatuses or embodiments thereof.

Embodiments of the above-described 360-degree video transmission/reception apparatuses and transmission/reception methods and embodiments of the internal/external elements of the apparatuses may be combined. For example, embodiments of the projection processor and embodiments of the data encoder may be combined to generate as many embodiments of the 360-degree video transmission apparatus as the number of cases. Embodiments combined in this manner are also included in the scope of the present invention.

Figure 7:
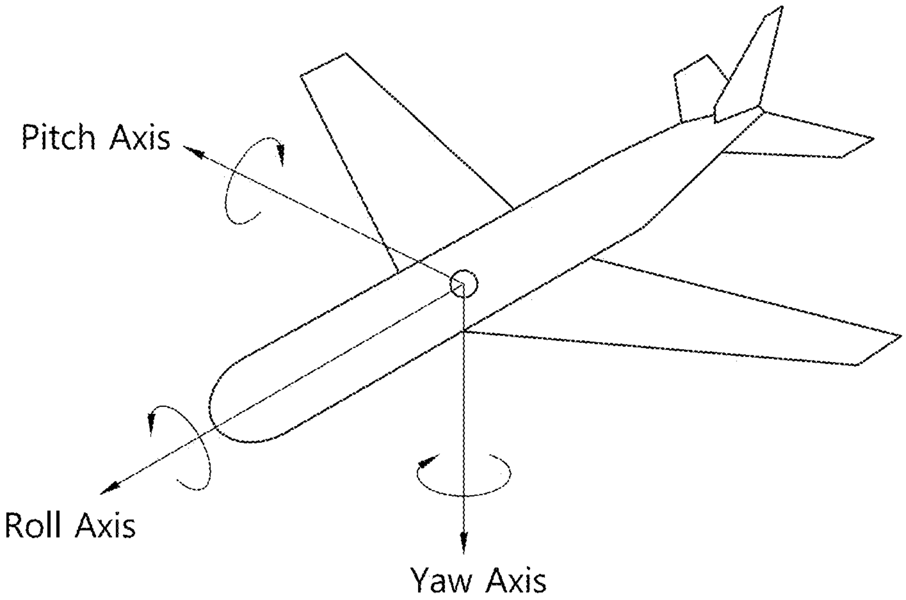
FIG. 7 is a view illustrating the concept of aircraft principal axes for describing a 3D space of the present invention.

FIG. 7 is a view illustrating the concept of aircraft principal axes for describing a 3D space of the present invention. In the present invention, the concept of aircraft principal axes can be used to represent a specific point, position, direction, interval, region and the like in a 3D space. That is, the content of aircraft principal axes can be used to describe a 3D space before projection or after reprojection and perform signaling therefor in the present invention. According to an embodiment, a method using the concept of X, Y and Z axes or spherical coordinates may be used.

An aircraft can freely rotate three-dimensionally. Axes constituting a three dimension are referred to as a pitch axis, a yaw axis and a roll axis. These may be referred to as a pitch, a yaw and a roll or a pitch direction, a yaw direction and a roll direction in the description.

The pitch axis can refer to an axis which is a base of a direction in which the front end of the aircraft rotates up and down. In the illustrated concept of aircraft principal axes, the pitch axis can refer to an axis which connects the wings of the aircraft.

The yaw axis can refer to an axis which is a base of a direction in which the front end of the aircraft rotates to the left and right. In the illustrated concept of aircraft principal axes, the yaw axis can refer to an axis which connects the top to the bottom of the aircraft. The roll axis can refer to an axis which connects the front end to the tail of the aircraft in the illustrated concept of aircraft principal axes, and a rotation in the roll direction can refer to a rotation based on the roll axis. As described above, a 3D space in the present invention can be described using the concept of the pitch, yaw and roll.

As described above, video data projected on a 2D image may be subjected to region-wise packing in order to enhance video coding efficiency. Region-wise packing may refer to a process of processing video data projected on a 2D image by regions. Here, regions may refer to divided areas of a 2D image on which 360-degree video data is projected. Divided regions of a 2D image may be divided according to a projection scheme. A 2D image may be referred to as a video frame or a frame.

The present invention proposes metadata about a region-wise packing process according to a projection scheme and a method of signaling the metadata. The region-wise packing process may be efficiently performed based on the metadata.

Figure 8:
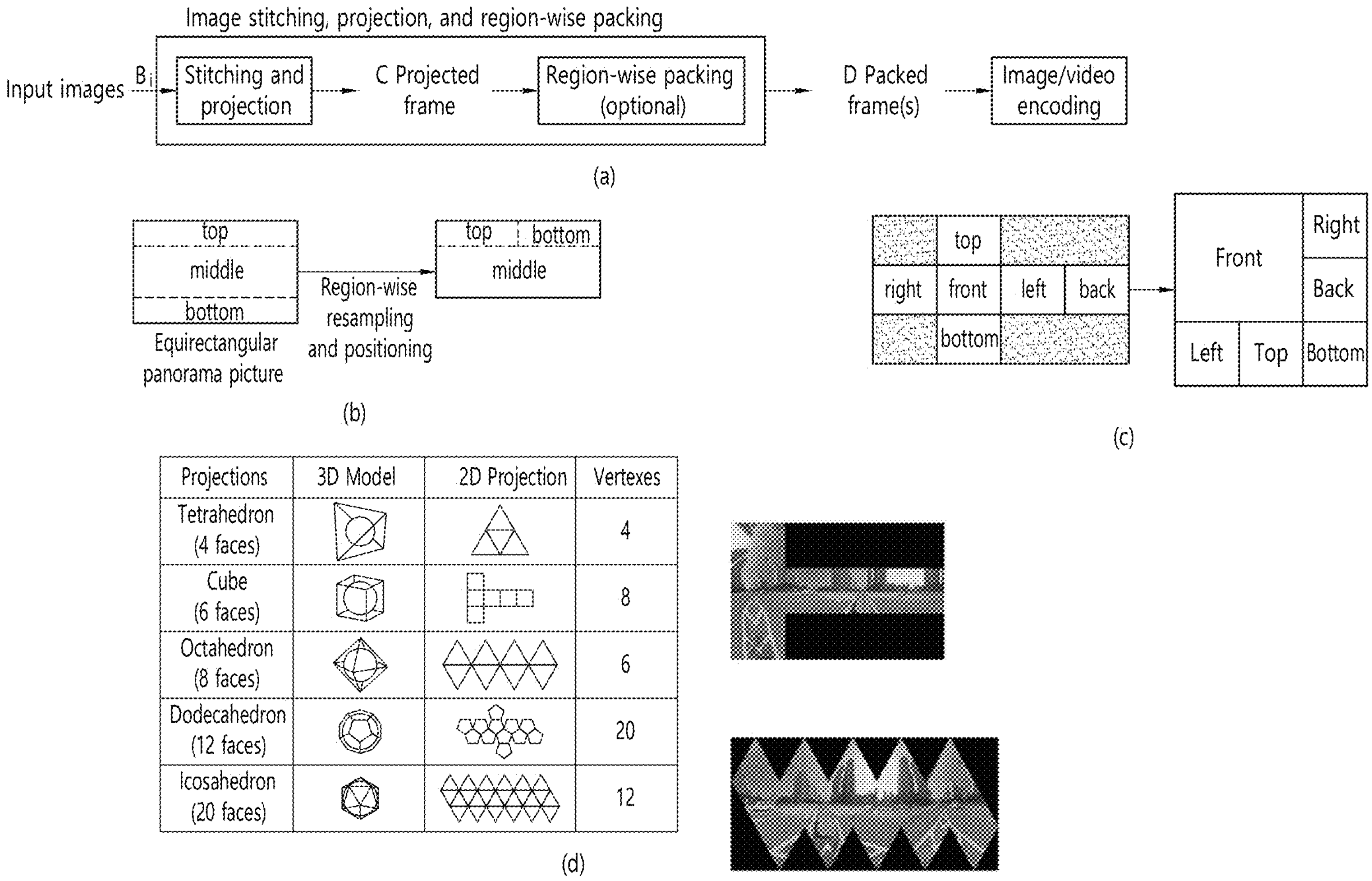
FIG. 8 illustrates a process of processing a 360-degree video and a 2D image to which a region-wise packing process according to a projection format is applied.

FIG. 8 illustrates a process of processing a 360-degree video and a 2D image to which a region-wise packing process according to a projection format is applied. In FIG.

8, (a) illustrates a process of processing input 360-degree video data. Referring to (a) of FIG. 8, input 360-degree video data from a viewpoint may be stitched and projected on a 3D projection structure according to various projection schemes, and the 360-degree video data projected on the 3D projection structure may be represented as a 2D image. That is, the 360-degree video data may be stitched and may be projected into the 2D image. The 2D image into which the 360-degree video data is projected may be referred to as a projected frame. The projected frame may be subjected to the above-described region-wise packing process. Specifically, the projected frame may be processed such that an area including the projected 360-degree video data on the projected frame may be divided into regions, and each region may be rotated or rearranged, or the resolution of each region may be changed. That is, the region-wise packing process may indicate a process of mapping the projected frame to one or more packed frames. The region-wise packing process may be optionally performed. When the region-wise packing process is not applied, the packed frame and the projected frame may be the same. When the region-wise packing process is applied, each region of the projected frame may be mapped to a region of the packed frame, and metadata indicating the position, shape, and the size of the region of the packed frame mapped to each region of the projected frame may be derived.

In FIGS. 8, (*b*) and 8 (*c*) illustrate examples of mapping each region of the projected frame is mapped to a region of the packed frame. Referring to (b) of FIG. 8, the 360-degree video data may be projected onto a 2D image (or frame) according to a panoramic projection scheme. Top, middle, and bottom regions of the projected frame may be rearranged as shown in the right figure via region-wise packing. Here, the top region may represent a top region of a panorama on the 2D image, the middle region may represent a middle region of the panorama on the 2D image, and the bottom region may represent a bottom region of the panorama on the 2D image. Referring to (c) of FIG. 8, the 360-degree video data may be projected onto a 2D image (or frame) according to a cubic projection scheme. Front, back, top, bottom, right, and left regions of the projected frame may be rearranged as shown in the right figure via region-wise packing. Here, the front region may represent a front region of a cube on the 2D image, and the back region may represent a back region of the cube on the 2D image. The top region may represent a top region of the cube on the 2D image, and the bottom region may represent a bottom region of the cube on the 2D image. The right region may represent a right region of the cube on the 2D image, and the left region may represent a left region of the cube on the 2D image.

In FIG. 8, (d) illustrates various 3D projection formats for projecting the 360-degree video data. Referring to (d) of FIG. 8, the 3D projection formats may include a tetrahedron, a cube, an octahedron, a dodecahedron, and an icosahedron. 2D projections shown in (d) of FIG. 8 may represent projected frames corresponding to 2D images resulting from the projection of 360-degree video data according to the 3D projection formats.

The foregoing projection formats are provided for illustrative purposes, and some or all of the following various projection formats (or projection schemes) may be used according to the present invention. A projection format used for a 360-degree video may be indicated, for example, through a projection format field of metadata.

Figure 9A:
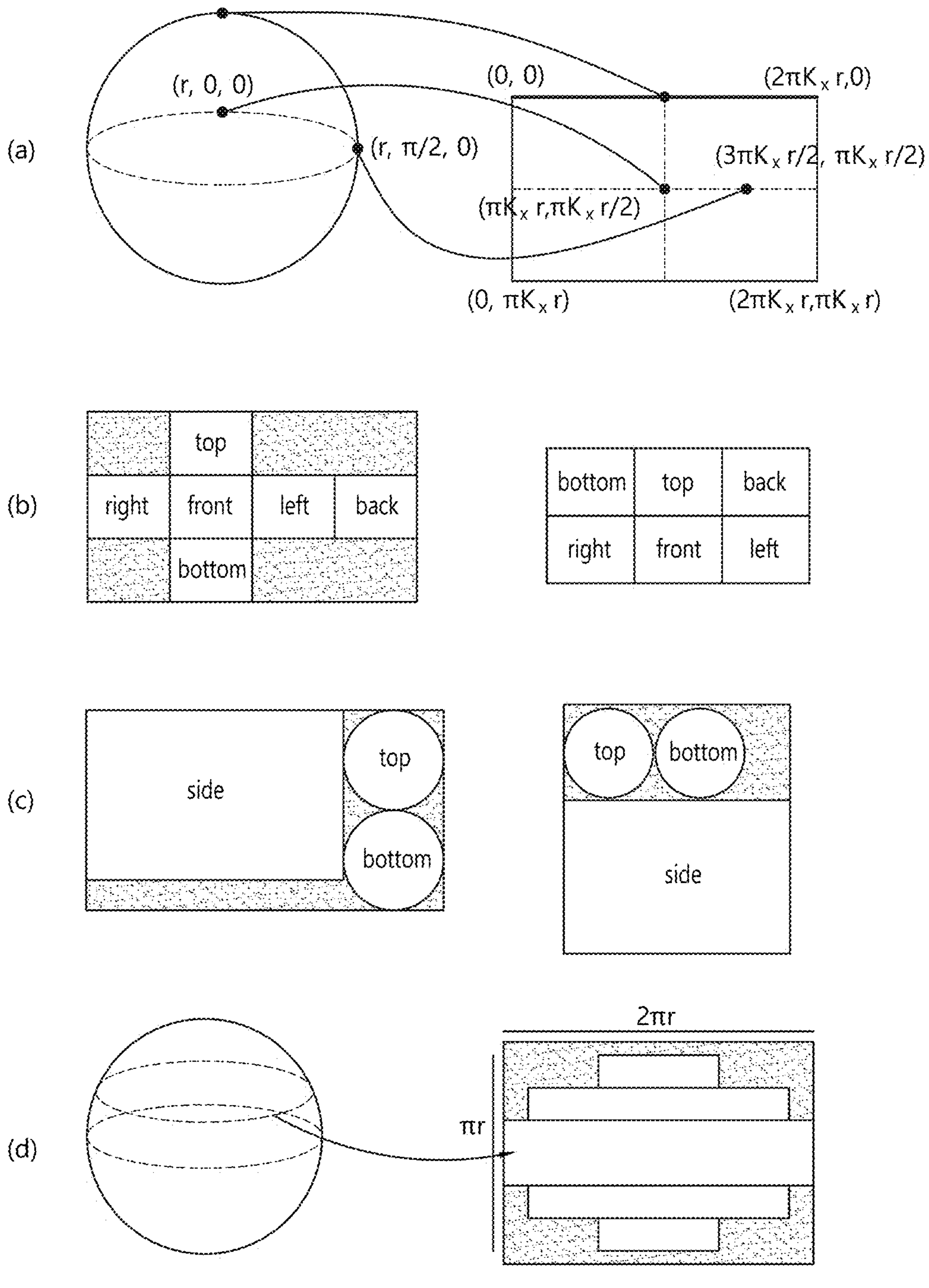
FIG. 9A and FIG. 9B illustrate projection formats according to the present invention.
Figure 9B:
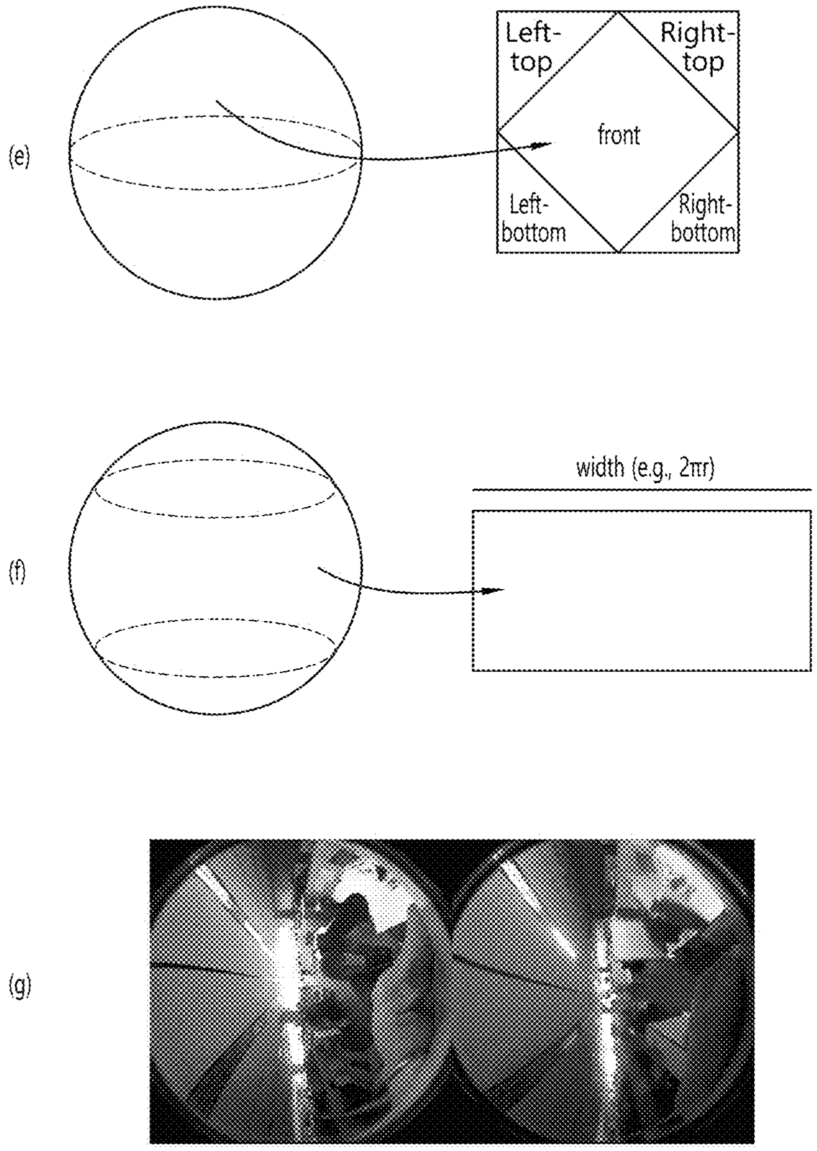

FIG. 9A and FIG. 9B illustrate projection formats according to the present invention.

In FIG. 9A, (a) illustrates an equirectangular projection format. When the equirectangular projection format is used, a point (r, $\theta_0$, 0), that is, $\theta=\theta_0$ and $\varphi=0$, on the spherical surface may be mapped to a center pixel of a 2D image. Also, it may be assumed that a principal point of a front camera is a point (r, 0, 0) on the spherical surface, and $\varphi_0=0$. Accordingly, a converted value (x, y) on the XY coordinate system may be converted into a pixel (X, Y) on the 2D image by the following equation.

$$X=K_x*x+X_\circ=K_x*(\theta-\theta_0)*r+X_\circ$$

$$Y=-K_y*y-Y_\circ \qquad \text{[Equation 1]}$$

When a top left pixel of the 2D image is positioned at (0, 0) on the XY coordinate system, an offset for the x-axis and an offset for the y-axis may be represented by the following equation.

$$X_\circ=K_x*\pi r$$

$$Y_\circ=-K_y*\pi/2*r \qquad \text{[Equation 2]}$$

Using these offsets, the equation for conversion onto the XY coordinate system may be modified as follows.

$$X=K_xx+X_\circ=K_x*(\pi+\theta-\theta_0)*r$$

$$Y=-K_yy-Y_\circ=K_y*(\pi/2-\varphi)*r \qquad \text{[Equation 3]}$$

For example, when $\theta_0=0$, that is, when the center pixel of the 2D image indicates data corresponding to $\theta=0$ on the spherical surface, the spherical surface may be mapped to an area defined by width=$2K_x\pi r$ and height=$K_x\pi r$ relative to (0, 0) on the 2D image. Data corresponding to $\varphi=\pi/2$ on the spherical surface may be mapped to an entire top side on the 2D image. Further, data corresponding to (r, $\pi/2$, 0) on the spherical surface may be mapped to a point ($3\pi K_x r/2$, $\pi K_x r/2$) on the 2D image.

A reception side may re-project 360-degree video data on a 2D image onto a spherical surface, which may be represented by the following equation for conversion.

$$\theta=\theta_0+X/K_x*r-\pi$$

$$\varphi=\pi/2-Y/K_y*r \qquad \text{[Equation 4]}$$

For example, a pixel defined by XY coordinates ($K_x\pi r$, 0) on the 2D image may be re-projected into a point defined by $\theta=\theta_0$ and $\varphi=\pi/2$ on the spherical surface.

In FIG. 9A, (b) illustrates a cubic projection format. For example, stitched 360-degree video data may be represented on a spherical surface. A projection processor may divide the 360-degree video data in a cubic shape and may project the 360-degree video data onto a 2D image. The 360-degree video data on the spherical surface may be projected on the 2D image corresponding to each face of a cube as shown in the left figure or the right figure in (b) of FIG. 9A.

In FIG. 9A, (c) illustrates a cylindrical projection format. Assuming that stitched 360-degree video data may be represented on a spherical surface, the projection processor may divide the 360-degree video data in a cylindrical shape and may project the 360-degree video data onto a 2D image. The 360-degree video data on the spherical surface may be projected on the 2D image corresponding to a side face, a top face, and a bottom face of a cylinder as shown in the left figure or the right figure in (b) of FIG. 9A.

In FIG. 9A, (d) illustrates a tile-based projection format. When the tile-based projection scheme is used, the projection processor may divide 360-degree video data on a spherical surface into one or more subareas to be projected onto a 2D image as shown in (d) of FIG. 9A. The subareas may be referred to as tiles.

In FIG. 9B, (e) illustrates a pyramid projection format. Assuming that stitched 360-degree video data may be represented on a spherical surface, the projection processor may view the 360-degree video data as a pyramid shape and may divide the 360-degree video data into faces to be projected onto a 2D image. The 360-degree video data on the spherical surface may be projected on the 2D image corresponding to a front face of a pyramid and four side faces of the pyramid including a left-top, left-bottom, right-top, and right-bottom faces as shown in the left figure or the right figure in (e) of FIG. 9B. Herein, the bottom surface may be an area including data acquired by a camera that faces the front surface. Here, the front face may be a region including data acquired by a front camera In FIG. 9B, (f) illustrates a panoramic projection format. When the panoramic projection format is used, the projection processor may project only a side face of 360-degree video data on a spherical surface onto a 2D image as shown in (f) of FIG. 9B. This scheme may be the same as the cylindrical projection scheme except that there are no top and bottom faces.

According to the embodiment of the present invention, projection may be performed without stitching. In FIG. 9B, (g) illustrates a case where projection is performed without stitching. When projecting is performed without stitching, the projection processor may project 360-degree video data onto a 2D image as it is as shown in (g) of FIG. 9. In this case, without stitching, images acquired from respective cameras may be projected on a 2D image as it is.

Referring to (g) of FIG. 9B, two images may be projected onto a 2D image without stitching. Each image may be a fish-eye image acquired through each sensor of a spherical camera (or a fish-eye camera). As described above, a reception side may stitch image data acquired by camera sensors and may map the stitched image data onto a spherical surface, thereby rendering a spherical video, that is, a 360-degree video.

Figure 10A:
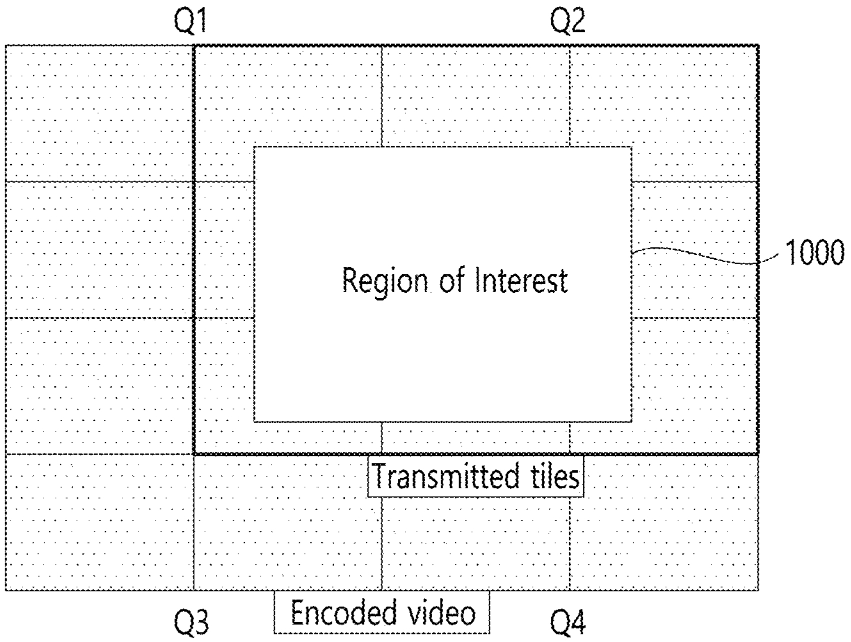
FIG. 10A and FIG. 10B illustrate a tile according to an embodiment of the present invention.
Figure 10B:
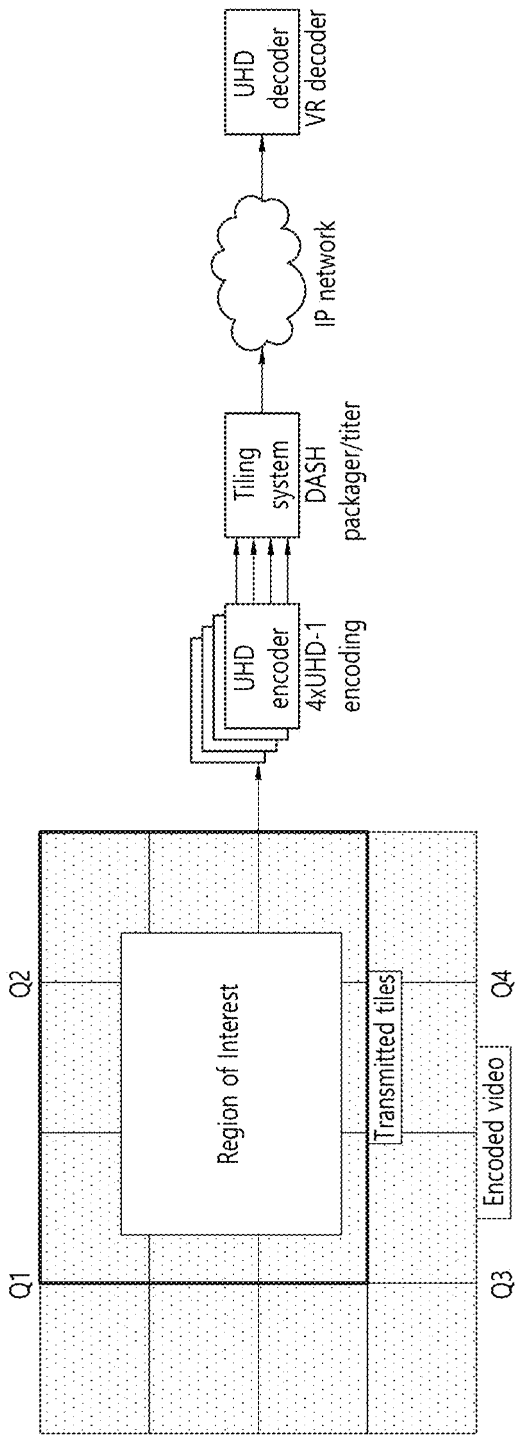

FIG. 10A and FIG. 10B illustrate a tile according to an embodiment of the present invention.

360-degree video data projected onto a 2D image or 360-degree video data subjected to up to region-wise packing may be divided into one or more tiles. FIG. 10*a* shows that one 2D image is divided into 16 tiles. Here, as described above, the 2D image may be a projected frame or a packed frame. In another embodiment of the 360-degree video transmission apparatus according to the present invention, the data encoder may independently encode each tile.

Region-wise packing described above and tiling may be distinguished. Region-wise packing described above may refer to a process of dividing 360-degree video data projected on a 2D image into regions and processing the divided regions in order to improve coding efficiency or to adjust resolutions. Tiling may refer to a process in which a data encoder divides a projected or packed frame into tiles and independently encodes each tile. When a 360-degree video is provided, a user does not consume all parts of the 360-degree video at the same time. Tiling may allow the user to transmit only a tile corresponding to an important part or a certain part, such as a viewport currently viewed by the user, to a reception side or to consume the tile with a limited bandwidth. Tiling enables efficient utilization of the limited bandwidth and makes it possible for the reception side to reduce operation loads as compared with the case of processing the entire 360-degree video data at one time.

Since a region and a tile are distinguished, these two areas do not need to be the same. In an embodiment, however, a region and a tile may refer to the same area. In an embodiment, when region-wise packing is performed in accordance with a tile, a region and a tile may be the same. Further, in an embodiment where each face and each region are the same according to the projection scheme, each face, each region, and each tile may refer to the same area according to the projection scheme. Depending on the context, a region may also be referred to as a VR region, and a tile may also be referred to as a tile region.

A region of interest (ROI) may refer to an area of interest from users proposed by a 360-degree content provider. When producing a 360-degree video, a 360-degree content provider may produce a 360-degree video in consideration of a particular area in which users are interested. In an embodiment, the ROI may correspond to an area in which an important part of the content of a 360-degree video is reproduced.

In another embodiment of the 360-degree video transmission/reception apparatus according to the present invention, the feedback processor of the reception side may extract and collect viewport information and may transmit the viewport information to the feedback processor of the transmission side. In this process, the viewport information may be transmitted using network interfaces of both sides. FIG. 10A shows a viewport (1000) in the 2D image. Here, the viewport may extend over nine tiles in the 2D image.

In this case, the 360-degree video transmission apparatus may further include a tiling system. In an embodiment, the tiling system may be located after the data encoder (in FIG. 10B), may be included in the data encoder or the transmission processor described above, or may be included as a separate internal/external element in the 360-degree video transmission apparatus.

The tiling system may receive the viewport information from the feedback processor of the transmission side. The tiling system may selectively transmit only a tile including a viewport area. Only nine tiles including the viewport area (1000) among a total of 16 tiles in the 2D image shown in FIG. 10A may be transmitted. Here, the tiling system may transmit the tiles in a unicast manner via a broadband, because the viewport area varies depending on the user.

In this case, the feedback processor of the transmission side may transmit the viewport information to the data encoder. The data encoder may encode the tiles including the viewport area with higher quality than that of other tiles.

Further, the feedback processor of the transmission side may transmit the viewport information to the metadata processor. The metadata processor may transmit metadata related to the viewport area to each internal element of the 360-degree video transmission apparatus or may include the metadata in 360-degree video-related metadata.

By using this tiling method, it is possible to save transmission bandwidths and to differently perform processing for each tile, thereby achieving efficient data processing/transmission.

The foregoing embodiments related to the viewport area may be similarly applied to specific areas other than the viewport area. For example, processing performed on the viewport area may be equally performed on an area determined as an area in which users are interested through the aforementioned gaze analysis, an ROI, and an area (initial viewpoint) that is reproduced first when a user views a 360-degree video through a VR display.

In another embodiment of the 360-degree video transmission apparatus according to the present invention, the transmission processor may perform transmission processing differently for each tile. The transmission processor may apply different transmission parameters (modulation orders or code rates) to each tile such that robustness of data delivered via each tile is changed.

Here, the feedback processor of the transmission side may deliver feedback information, received from the 360-degree video reception apparatus, to the transmission processor, and the transmission processor may perform transmission processing differentiated for tiles. For example, the feedback processor of the transmission side may deliver the viewport information, received from the reception side, to the transmission processor. The transmission processor may perform transmission processing on tiles including the viewport area to have higher robustness than that of other tiles.

FIG. 11 shows an example of 360 video related metadata according to an exemplary embodiment of the present invention. As described above, the 360-degree video related metadata may include diverse metadata related to 360-degree video. According to the context, the 360-degree video related metadata may also be referred to as 360-degree video related signaling information. The 360-degree video related metadata may be included in a separate signaling table and may then be transmitted, or the 360-degree video related metadata may be included in DASH MPD and may then be transmitted, or the 360-degree video related metadata may be included in a file format, such as ISOBMFF, and so on, in the form of a box and may then be delivered. In case the 360-degree video related metadata is included in a box form, the metadata is included in multiple levels, such as file, fragment, track, sample entry, sample, and so on, and, therefore, metadata for the data of the corresponding level may be included.

According to the exemplary embodiment, part of the metadata that will be described later on may be configured as a signaling table and then delivered, and the remaining part of the metadata may be included in a box or track format within the file format.

According to the exemplary embodiment, the 360 video related metadata according to the present invention may include default metadata related to a projection format, metadata related to stereoscopic, metadata related to Initial View/Initial Viewpoint, metadata related to ROI, metadata related to the Field of View (FOV), and/or metadata related to the cropped region. According to the exemplary embodiment, in addition to the above-described metadata, the 360 video related metadata may further include additional metadata.

The exemplary embodiment of the 360 related metadata according to the present invention may correspond to a format including at least one or more of the above-described default metadata, stereoscopic related metadata, initial viewpoint related metadata, ROI related metadata, FOV related metadata, cropped region related metadata, and/or metadata that may be added later on. The exemplary embodiment of the 360 related metadata according to the present invention may be diversely configured in accordance with the number of cases of the detailed metadata being included in each exemplary embodiment. According to the exemplary embodiment, in addition to the above-described metadata, the 360 video related metadata may further include additional information.

The stereo_mode field may indicate a 3D layout supported by the corresponding 360-degree video. It may also be possible to indicate whether or not the corresponding 360-degree video supports 3D by using only this field. In this case, the stereoscopic field may be omitted. When the value of this field is equal to 0, the 360-degree video may correspond to a mono mode. More specifically, a projected 2D image may include only one mono view. In this case, the corresponding 360-degree video may not support 3D.

When the value of this field is equal to 1 or 2, the corresponding 360-degree video may follow a left-right layout or a top-bottom layout. The left-right layout and the top-bottom layout may be referred to as a side-by-side format and a top-bottom format, respectively. In the left-right layout, 2D images on which a left image/a right image are projected may be located at the left/right side on an image frame. In the top-bottom layout, 2D images on which a left image/a right image are projected may be located at the top/bottom side on an image frame. When this field is equal to other values, the remaining values may be reserved for future use.

The initial-view-related metadata may include information on a view (initial viewpoint) that a user views when the 360-degree video is reproduced (or played-back) for the first time. The initial-view-related metadata may include an initial_view_yaw_degree field, an initial_view_pitch_degree field, and/or an initial_view_roll_degree field. In some embodiments, the initial-view-related metadata may further include additional information.

The initial_view_yaw_degree field, the initial_view_pitch_degree field, and the initial_view_roll_degree field may indicate an initial viewpoint when the 360-degree video is reproduced (or played-back). In other words, a center point of a viewport that is viewed for the first time when performing playback (or reproduction) may be indicated by these three fields. More specifically, the initial_view_yaw_degree field may indicate a yaw value for the initial view. More specifically, the initial_view_yaw_degree field may indicate the position of the center point as the rotational direction (symbol) and the extent of rotation (angle) being related to the yaw axis. Additionally, the initial_view_pitch_degree field may indicate a pitch value for the initial view. More specifically, the initial_view_pitch_degree field may indicate the position of the center point as the rotational direction (symbol) and the extent of rotation (angle) being related to the pitch axis. And, additionally, the initial_view_roll_degree field may indicate a roll value for the initial view. More specifically, the initial_view_roll_degree field may indicate the position of the center point as the rotational direction (symbol) and the extent of rotation (angle) being related to the roll axis. An initial viewpoint when reproducing (or playing-back) the corresponding 360-degree video, i.e., a center point of the viewpoint that is first shown when reproducing (or playing-back) the video may be indicated based on the initial_view_yaw_degree field, the initial_view_pitch_degree field, and the initial_view_roll_degree field. Thus, a specific region of the 360-degree video may be displayed and provided to the initial viewpoint of the user. Additionally, the width and height of an initial viewport based on the indicated initial viewpoint may be determined through the field of view (FOV). More specifically, the 360-degree video receiving device (or reception apparatus) may provide a user with a predetermined area of the 360-degree video as an initial viewport using these three fields and the FOV information.

In some embodiments, the initial viewpoint indicated by the initial-view-related metadata may be changed for each scene. More specifically, the scenes of the 360-degree video may be changed with time according to 360-degree content. An initial viewpoint or an initial viewport which the user views first may be changed for each scene of the 360-degree video. In this case, the initial-view-related metadata may indicate an initial viewpoint for each scene. For this, the initial-view-related metadata may further include a scene identifier identifying a scene to which the initial viewpoint is applied. In addition, since the FOV may be changed for each scene of the 360-degree video, the initial-view-related metadata may further include scene-wise FOV information indicating an FOV corresponding to the scene.

The ROI-related metadata may include information related to the above-described ROI. The ROI-related metadata may include a 2d_roi_range_flag field and/or a 3d_roi_range_flag field. The 2d_roi_range_flag field may indicate whether or not the ROI-related metadata includes fields expressing the ROI based on a 2D image, and the 3d_roi_range_flag field may indicate whether or not the ROI-related metadata includes fields expressing the ROI based on a 3D space. In some embodiments, the ROI-related metadata may further include additional information, such as differential encoding information based on the ROI and differential transmission processing information based on the ROI.

When the ROI-related metadata includes fields expressing the ROI based on a 2D image, the ROI-related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. These fields may indicate the minimum x coordinate, the maximum x coordinate, the minimum y coordinate, and the maximum y coordinate of the left top end, respectively.

The min_width field, the max_width field, the min_height field, and the max_height field may respectively indicate the minimum/maximum values of the width and height of the ROI. More specifically, these fields may respectively indicate the minimum value of the width, the maximum value of the width, the minimum value of the height, and the maximum value of the height, respectively.

The min_x field, the max_x field, the min_y field, and the max_y field may indicate the minimum/maximum values of coordinates in the ROI. More specifically, these fields may respectively indicate the minimum x coordinate, the maximum x coordinate, the minimum y coordinate, and the maximum y coordinate of coordinates in the ROI. These fields may be omitted.

When the ROI-related metadata includes fields expressing the ROI based on coordinates in a 3D rendering space, the ROI-related metadata may include a min_yaw field, a max_yaw field, a min_pitch field, a max_pitch field, a min roll field, a max_roll field, a min_field_of_view field, and/or a max_field_of_view field.

The min_yaw field, the max_yaw field, the min_pitch field, the max_pitch field, the min roll field, and the max_roll field may respectively indicate an area that the ROI occupies in a 3D space as the minimum/maximum values of yaw, pitch, and roll. More specifically, these fields may respectively indicate the minimum value of the reference amount of rotation in relation to the yaw axis, the maximum value of the reference amount of rotation in relation to the yaw axis, the minimum value of the reference amount of rotation in relation to the pitch axis, the maximum value of the reference amount of rotation in relation to the pitch axis, the minimum value of the reference amount of rotation in relation to the roll axis, and the maximum value of the reference amount of rotation in relation to the roll axis.

The min_field_of_view field and the max_field_of_view field may indicate the minimum/maximum values of the FOV of the 360-degree video data. The FOV may refer to a range of vision within which the 360-degree video is displayed at once when the video is reproduced (or played-back). The min_field_of_view field and the max_field_of_view field may respectively indicate the minimum value and the maximum value of the FOV. These fields may be omitted. These fields may be included in the FOV-related metadata that will be described later on.

The FOV-related metadata may include information related to the above-described FOV. The FOV-related metadata may include a content_fov_flag field and/or a content_fov field. In some embodiments, the FOV-related metadata may further include additional information, such as information on the minimum/maximum values of the FOV.

The content_fov_flag field may indicate whether or not information on the FOV of the 360-degree video that was intended at the time of production exists. In case the value of this field is equal to 1, the content_fov field may exist.

The content_fov field may indicate information on the FOV of the 360-degree video that was intended at the time of production. In some embodiments, part of the 360-degree video that is displayed to the user at once may be determined based on the vertical or horizontal FOV of the 360-degree video receiving device. Alternatively, in some embodiments, the part of the 360-degree video that is displayed to the user at once may be determined while reflecting the FOV information of this field.

The cropped-region-related metadata may include information on an area including actual 360-degree video data in an image frame. The image frame may include an active video area, in which actual 360-degree video data is projected, and an inactive video area. Here, the active video area may be referred to as a cropped area or a default display area. The active video area is an area that is seen as a 360-degree video in an actual VR display. The 360-degree video receiving device or the VR display may process/display only the active video area. For example, when the aspect ratio of the image frame is 4:3, only an area of the image frame, excluding a portion of the upper part and a portion of the lower part of the image frame, may include the 360-degree video data. This area may be referred to as the active video area.

The cropped-region-related metadata may include an is_cropped_region field, a cr_region_left_top__x field, a cr_region_left_top_y field, a cr_region_width field, and/or a cr_region_height field. In some embodiments, the cropped-region-related metadata may further include additional information.

The is_cropped_region field may be a flag indicating whether or not the entire area of the image frame is used by the 360-degree video receiving device or the VR display. Herein, this field may be referred to as an active video area that is shown in the area that is mapped to the 360-degree video data or in the VR display. The is_cropped_region field may indicate whether or not the entire image frame corresponds to the active video area. When only a portion of the image frame is the active video area, the following four fields may be further included.

The cr_region_left_top_x field, the cr_region_left_top_y field, the cr_region_width field, and the cr_region_height field may indicate the active video area in the image frame. These fields may respectively indicate the x coordinate of the left top of the active video area, they coordinate of the left top of the active video area, the width of the active video area, and the height of the active video area, respectively. The width and the height may be expressed in pixel units.

A 360-degree video based VR system may provide visual/auditory experience for different viewing orientations based on a user's position in relation to the 360 video based on the above-described 360 video processing process. A VR system providing visual/auditory experience for different viewing orientations based on a fixed position of the user in relation to the 360 video may be referred to as a three degrees of freedom (3DoF) based VR system. Meanwhile, a VR system providing extended visual/auditory experience for different viewing orientations at different viewpoints and/or different viewing positions may be referred to as a 3DoF plus or 3DoF+ based VR system.

Figure 12:
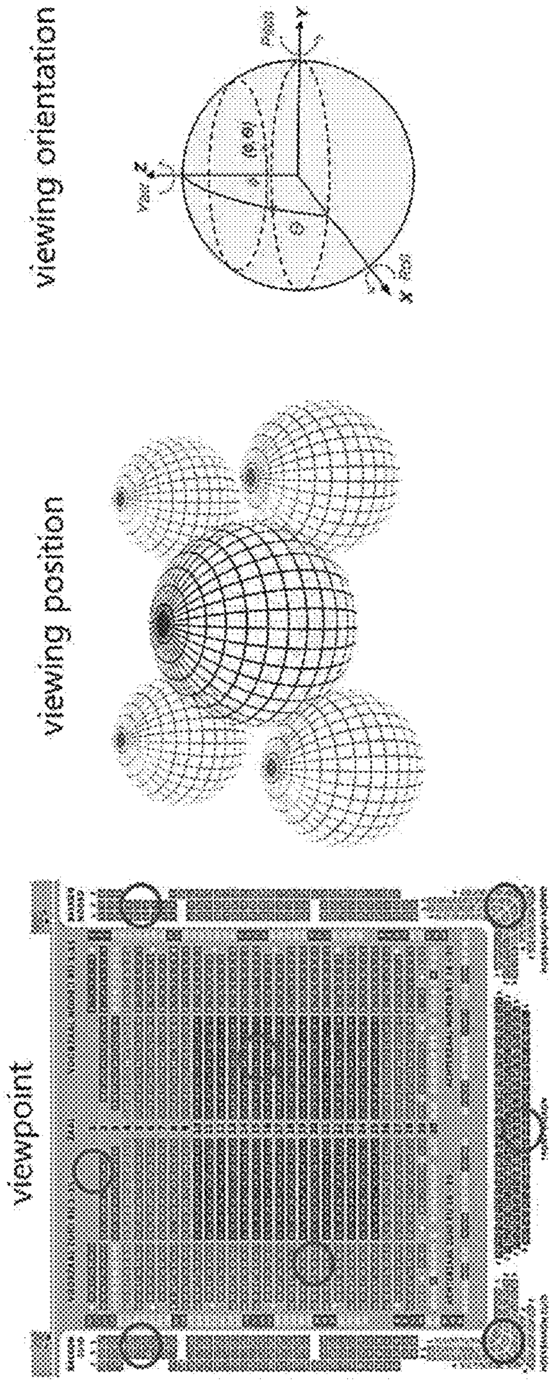
FIG. 12 shows a general view of the concept of a viewpoint, a viewing position, and a viewing orientation.

FIG. 12 shows a general view of the concept of a viewpoint, a viewing position, and a viewing orientation.

Referring to FIG. 12, when a space shown in (a) (e.g., a performance stage) is assumed, each of the marked circles may indicate different viewpoints. The video/audio being provided from each viewpoint positioned within the same space may be correlated to one another at the same time slot. In this case, depending upon a change in the user's viewing orientation (e.g., head motion) at a specific viewpoint, different visual/auditory experiences may be provided to the user. More specifically, as shown in (b), spheres of diverse viewing positions in relation to a specific viewpoint may be assumed, and video/audio/text information reflecting the relative positions of each viewing position may be provided.

Meanwhile, as shown in (c), in a specific viewing position of a specific viewpoint, visual/auditory information of diverse directions (or orientations), such as the conventional 3DoF, may be delivered. At this point, main source (e.g., video/audio/text) as well as diverse additional sources may be integrated and then provided, and, in this case, the corresponding source may be linked to the viewing orientation of the user and then delivered, or the corresponding information may be delivered independently.

Figure 13:
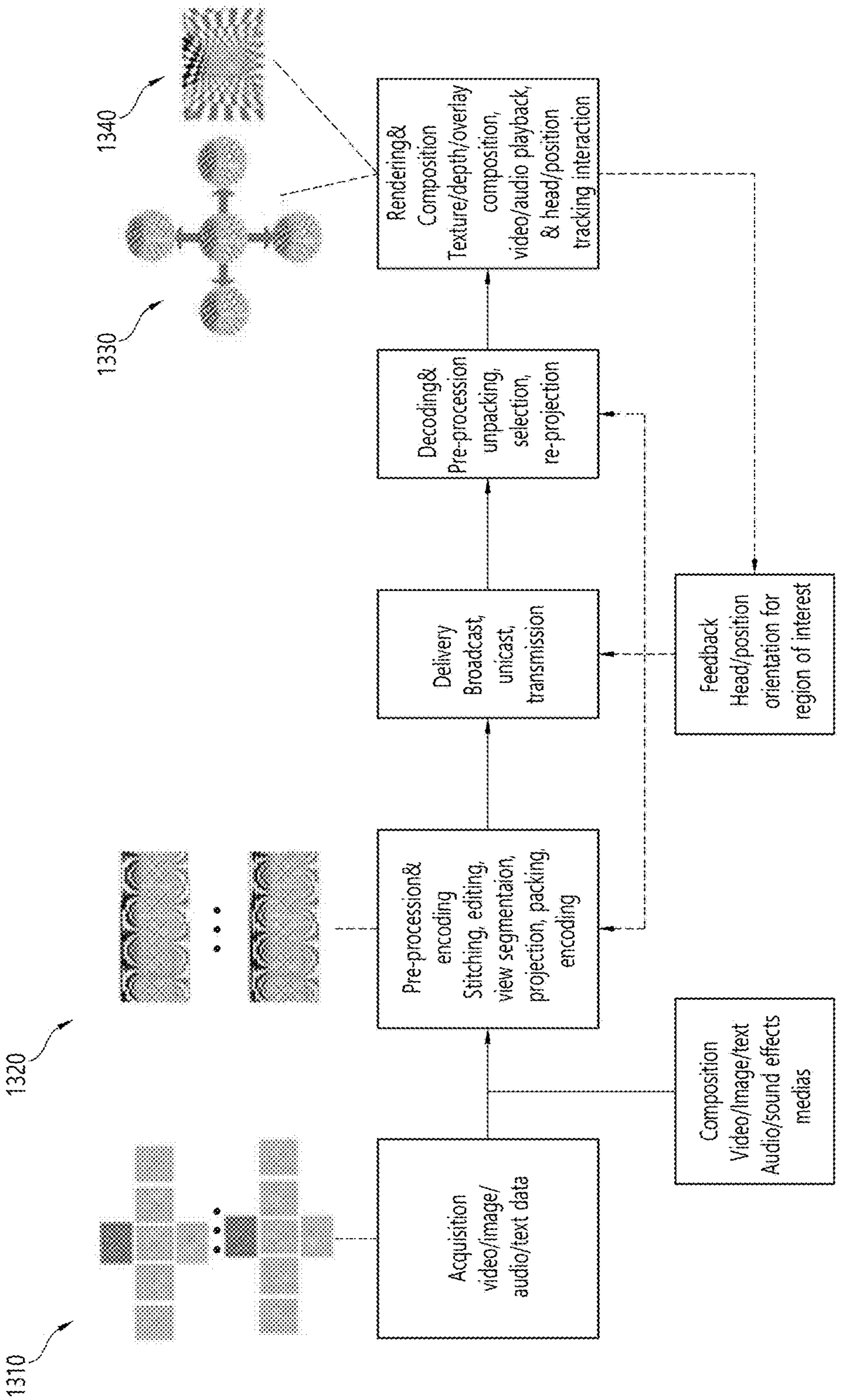
FIG. 13 shows a general view of an exemplary architecture for providing 3DoF+ video according to the present invention.

FIG. 13 shows a general view of an exemplary architecture for providing 3DoF+ video according to the present invention. FIG. 13 may illustrate a 3DoF+ end-to-end system flow chart including image acquisition, pre-processing, transmission, (post-)processing, rendering, and feedback processes of the 3DoF+.

Referring to FIG. 13, an acquisition process may refer to a process of acquiring 360 video (or 360-degree video) by performing capturing, composition, or generation processes of a 360 video. By performing the acquisition process diverse video/audio information according to a change in the viewing orientation (e.g., head motion) in relation to multiple positions may be acquired. At this point, the video information may not only include visual information (e.g., texture) but also depth information. At this point, as shown in the exemplary visual information of (1310), diverse information of different viewing positions according to different viewpoints may be respectively acquired.

A composition process may include a procedure and method for performing composition in order to include not only the information acquired through the video/audio input device but also video (video/image, and so on), audio (audio/sound effects, and so on), and text (subtitles, and so on) in the user's experience.

A pre-processing process corresponds to a preparation (pre-processing) process for transmitting/delivering the acquired 360 video, which may include the above-described stitching, projection, region-wise packing processes and/or an encoding process, and so on. More specifically, this process may include the pre-processing process and the encoding process for modifying/supplementing the data of the video/audio/text information in accordance with the producer's intentions. For example, in the pre-processing process of the audio may include a stitching process for mapping the acquired visual information on a 360 sphere, an editing process for removing area boundaries or reducing differences in chroma/luma or adding visual effects of the image, a view segmentation process for segmenting the image according to the viewpoint, a projection process for mapping an image of the 360 sphere to a 2D image, a region-wise packing process for repositioning the image in accordance with the regions, and an encoding process for compressing the image information. As shown in the example of the video aspect of (1320), multiple projection images of different viewing positions according to different viewpoints may be generated.

The transmission process may refer to a process of processing and transmitting that audio/video data and metadata that are processed in the preparation process (pre-processing process). As a method for delivering (or transporting) diverse audio/video data and related metadata of different viewing positions according to different viewpoints, as described above, a broadcasting network and/or a communication network may be used, or a one-way transport method may be used.

The (post-)processing and composition processes may refer to a post-processing process for decoding the received/stored video/audio/text data and for performing final playback (or reproduction). For example, the post-processing process may include an unpacking process for unpacking the above-described packed image, a re-projection process for recovering the 2D-projected image to a 3D spherical image, and so on.

The rendering process may refer to a process for rendering and displaying image/video data that is/are re-projected to the 3D space. During this process, the video/audio signal may be reconfigured to a format for being finally outputted. A viewing orientation, a viewing position/head position, and a viewpoint where the region of interest of the user exists may be tracked, and, according to this information, only the necessary image/audio/text information may be optionally used. At this point, in case of the image signal, depending upon the region of interest of the user, different viewing positions may be selected, as shown in (1330), and finally, an image of a specific viewing orientation of a specific viewing position at a specific viewpoint may be outputted, as shown in (1340).

Figure 14A:
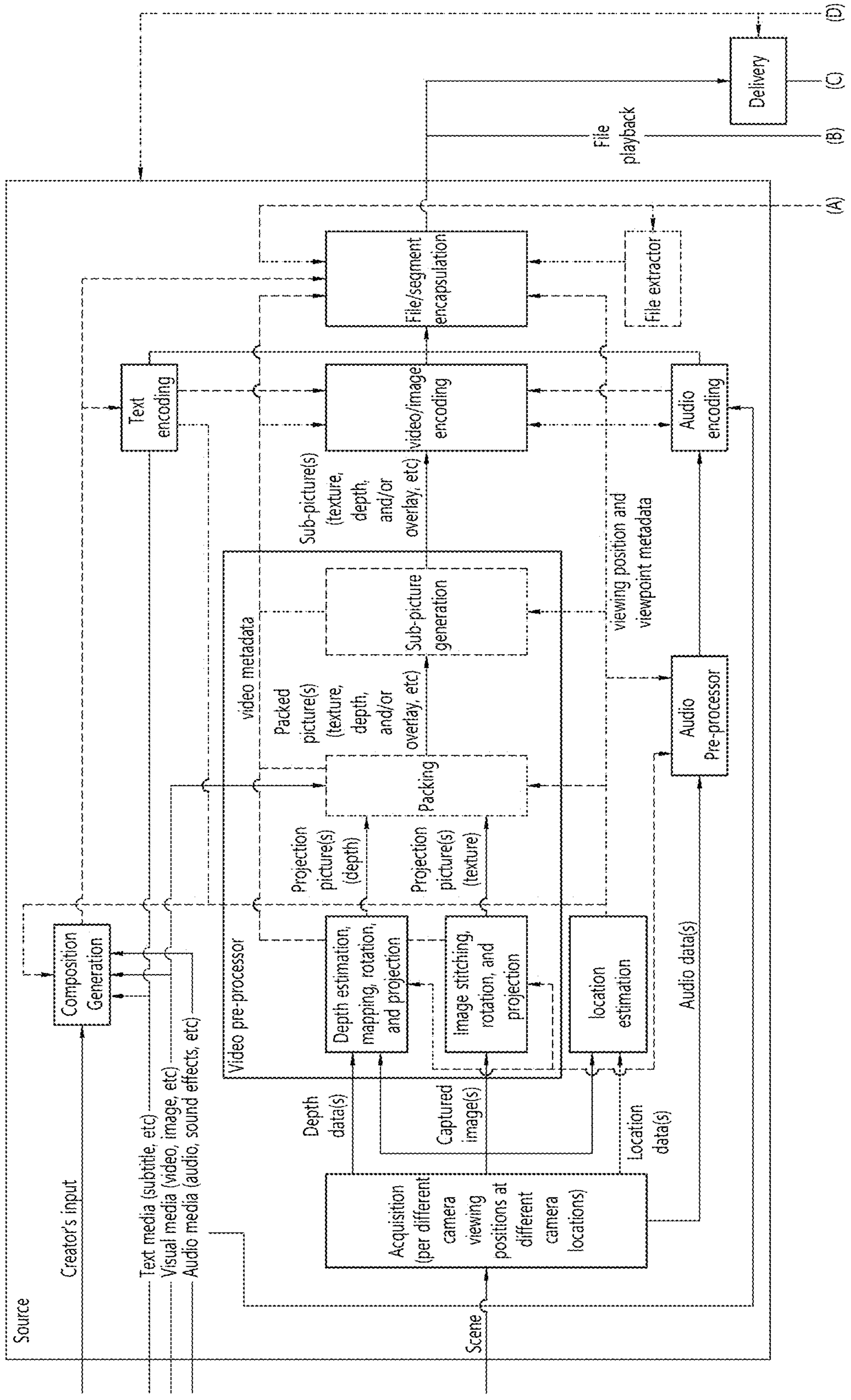
FIG. 14*a* and FIG. 14*b* are examples of a 3DoF+ end-to-end system architecture.
Figure 14B:
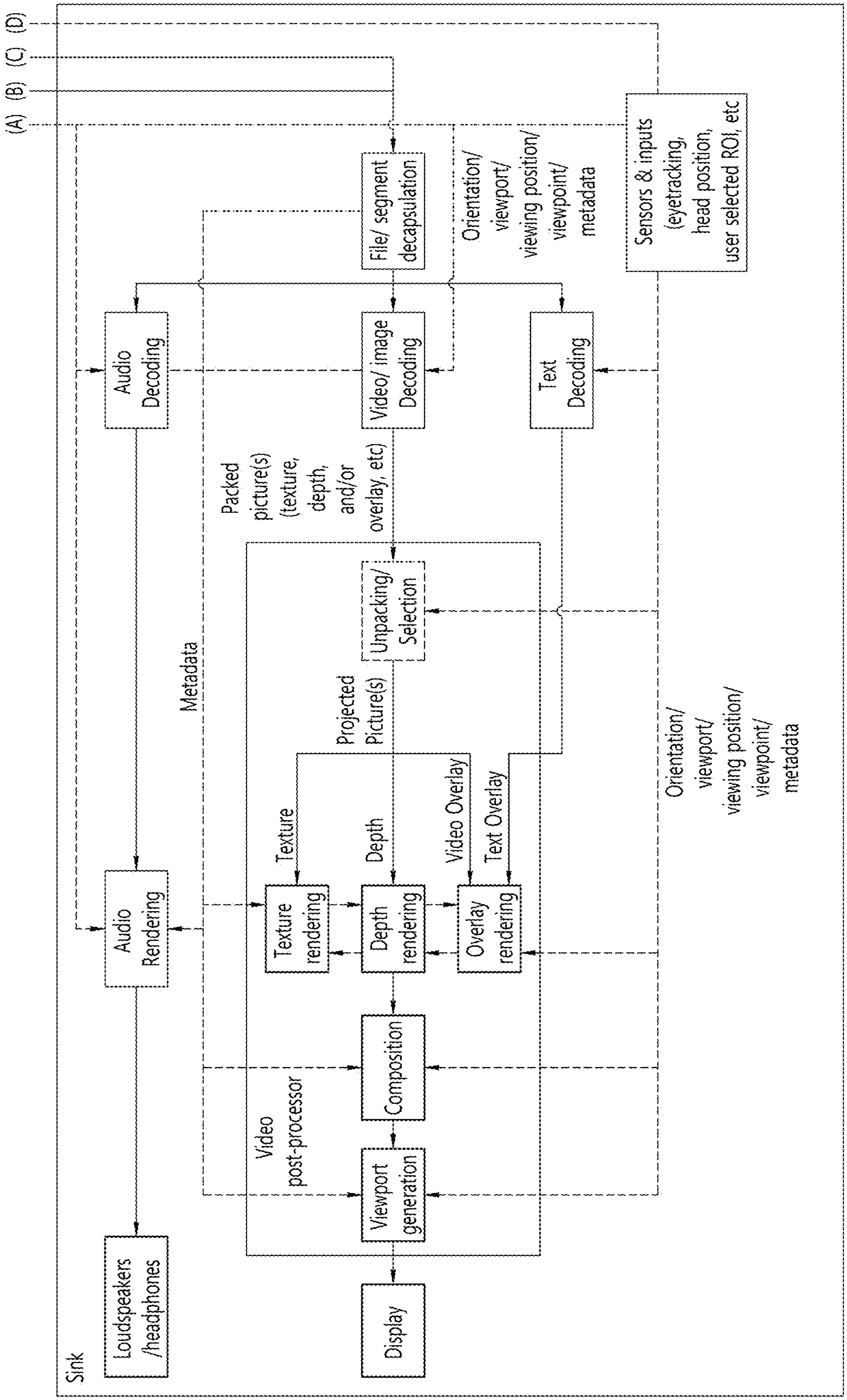

FIG. 14*a* and FIG. 14*b* are examples of a 3DoF+ end-to-end system architecture. The above-described 3D0F+360 content may be provided by the architecture of FIG. 14*a* and FIG. 14*b*.

Referring to FIG. 14*a*, a 360 video transmitting device (transmitting end) may be broadly configured of a part acquiring 360 video (image)/audio data (acquisition unit), a part processing the acquired data (video/audio pre-processor), a part for composing additional information (composition generation unit), a part for encoding text, audio, and the projected 360-degree video (encoding unit), and a part for encapsulating the encoded data (encapsulation unit). As described above, the encoded data may be outputted in a bitstream format, and the encoded data may be encapsulated in a file format, such as ISOBMFF, CFF, and so on, or may be processed in the form of other DASH segments. The encoded data may be delivered (or transported) to a 360 vide receiving device through a digital storage medium. Alternatively, although it is not explicitly shown in the drawing, the encoded data may be processed for transmission by the transmission processor and may, then, be transmitted via broadcast network or broadband.

In the data acquisition part (or unit) different information may be simultaneously or consecutively acquired in accordance with a sensor orientation (or viewing orientation, in case of an image), a sensor position (or a viewing position, in case of an image), and an information acquisition point of the sensor (or viewpoint, in case of an image). And, at this point, video, image, audio, position information, and so on may be acquired.

In case of an image data, each of texture and depth information may be acquired, and different video pre-processing may be performed in accordance with the property of characteristic of each component. For example, in case of the texture information, a 360 omnidirectional image may be configured by using images having different viewing orientations of the same viewing position acquired from the same viewpoint by using image sensor position information. And, for this, a video stitching process may be performed. Additionally, projection and/or region-wise packing processes may be performed in order to change the image to a format appropriate for encoding. In case of a depth image, an image may generally be acquired by a depth camera, and, in this case, a depth image may be created to have a texture format. Alternatively, depth data may also be generated based on separately measured data. After generating an image per component (or component-wise image), a process of reconfiguring the image (sub-picture generation) by performing additional packing to a video format suitable for efficient compression or by segmenting the image to necessary parts that are actually needed may be performed. Information on the image configuration that is used by a video pre-processing end is delivered (or transported) as video metadata.

In addition to the acquired data (or data that are to be mainly serviced), in case of servicing video/audio/text information that are additionally given, information for performing composition when performing final playback (or reproduction) of such information may be required to be provided. A composition generation unit generates information enabling a final playback end to perform composition of media data (video/image in case of an image, audio/sound effects in case of a sound (audio), and subtitles, and so on, in case of a text) being generated from an external source based on the intentions of the producer, and such information is delivered (or transported) as composition metadata.

The video/audio/text information that are processed by each process may each be compressed by using the respective encoder, and, depending upon the application, the information may be encapsulated in file or segment units. At this point, only the necessary information may be extracted (by a file extractor) in accordance with a video, file or segment configuration method.

Additionally, information enabling the receiver to reconfigure each data is delivered (or transported) at a file format/system level. Such information may include information for video/audio reconfiguration (video/audio metadata), composition information for overlay (composition metadata), video/audio playable viewpoint information and viewing position information according to each viewpoint (viewing position and viewpoint metadata), and so on.

Referring to FIG. 14*b*, the 360 video receiving device (receiving end) may be broadly configured of a part for decapsulating a received file or segment (file/segment decapsulation unit), a part for generating video/audio/text information from a bitstream (decoding unit), a part for reconfiguring the video/audio/text to a format suitable for playback (or reproduction) (post-processor), a part for tracking a region of interest of the user (tracking unit), and a display, which corresponds to a playback (or reproduction) device.

A bitstream that is generated by decapsulation may be segmented (or divided) into video/audio/text, and so on, depending upon the type of data and may be separately decoded to a playable format.

The tracking part (or unit) may generate information on a viewpoint of the user's region of interest, a viewing position at the corresponding viewpoint, and a viewing orientation at the corresponding viewing position, and this information may be used for the selection or extraction of a region of interest by each module in the 360 video receiving device or may be used in the post-processing process for emphasizing the information on the region of interest. Additionally, in case the information is delivered to the 360 video transmitting device, the information may be used for file selection (file extractor) or sub-picture selection for an efficient bandwidth usage, diverse image reconfiguration methods based on the region of interest (viewport/viewing position/viewpoint dependent processing).

The decoded image signal may be processed by diverse processing methods in accordance with the image configuration method. In case the 360 video transmitting device has performed image packing, a process of reconfiguring the corresponding image based on the information delivered via the metadata is needed. In this case, video metadata that is generated by the 360 video transmitting device may be used. Additionally, in case an image of multiple viewpoints, or multiple viewing positions, or various viewing orientations is included in the decoded image, information matching the viewpoint, viewing position, viewing orientation of the region of interest of the user that is generated by performing tracking may be selected and processed. At this point, the viewing position and viewpoint related metadata that is generated by the transmitting end may be used. Additionally, in case multiple components in relation to a specific viewpoint, viewing position, and viewing orientation are being delivered, or in case video information for an overlay is being separately delivered, a rendering process for each case may be included. The video data (texture, depth, overlay) that is processed with a separate rendering process may be processed with a composition process. And, at this point, the composition metadata that is generated by the transmitting end may be used. Finally, information for performing playback at a viewport in accordance with the region of interest of the user may be generated.

The decoded audio signal may be generated as a playable audio signal by the render and/or through the (post-)processing process. And, at this point, information best-fitting the requirements of the user may be generated based on the information on the region of interest of the user and the metadata being delivered by the 360 video receiving device.

The decoded text signal may be delivered to the renderer and may then be processed as overlay information based on text, such as subtitles. When needed, a separate text post-processing process may be included.

Figure 15:
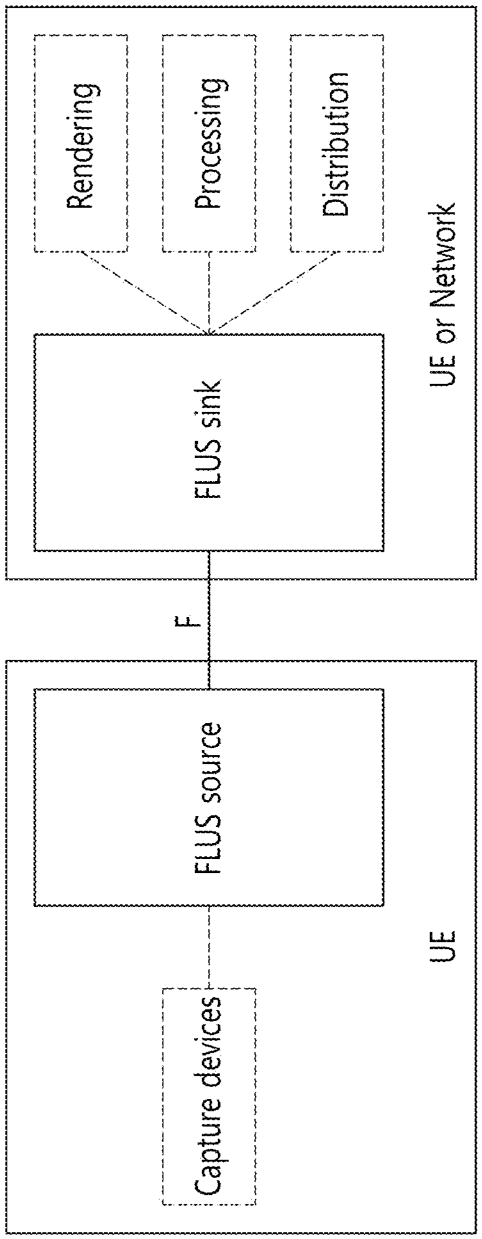
FIG. 15 shows a general view of an exemplary Framework for Live Uplink Streaming (FLUS) architecture.

FIG. 15 shows a general view of an exemplary Framework for Live Uplink Streaming (FLUS) architecture.

In FIG. 14 (FIG. 14*a* and FIG. 14*b*), detailed blocks of the above-described transmitting end and receiving end may each be sorted by source and sink functions in a Framework for Live Uplink Streaming (FLUS).

In case the detailed blocks of the transmitting end and the receiving end are sorted by source and sink functions, as shown in FIG. 14, the source function may be implemented in a 360-degree video acquisition device, and the sink function may be implemented in a network, or each of the source/sink functions may be implemented in a network node.

Figure 16:
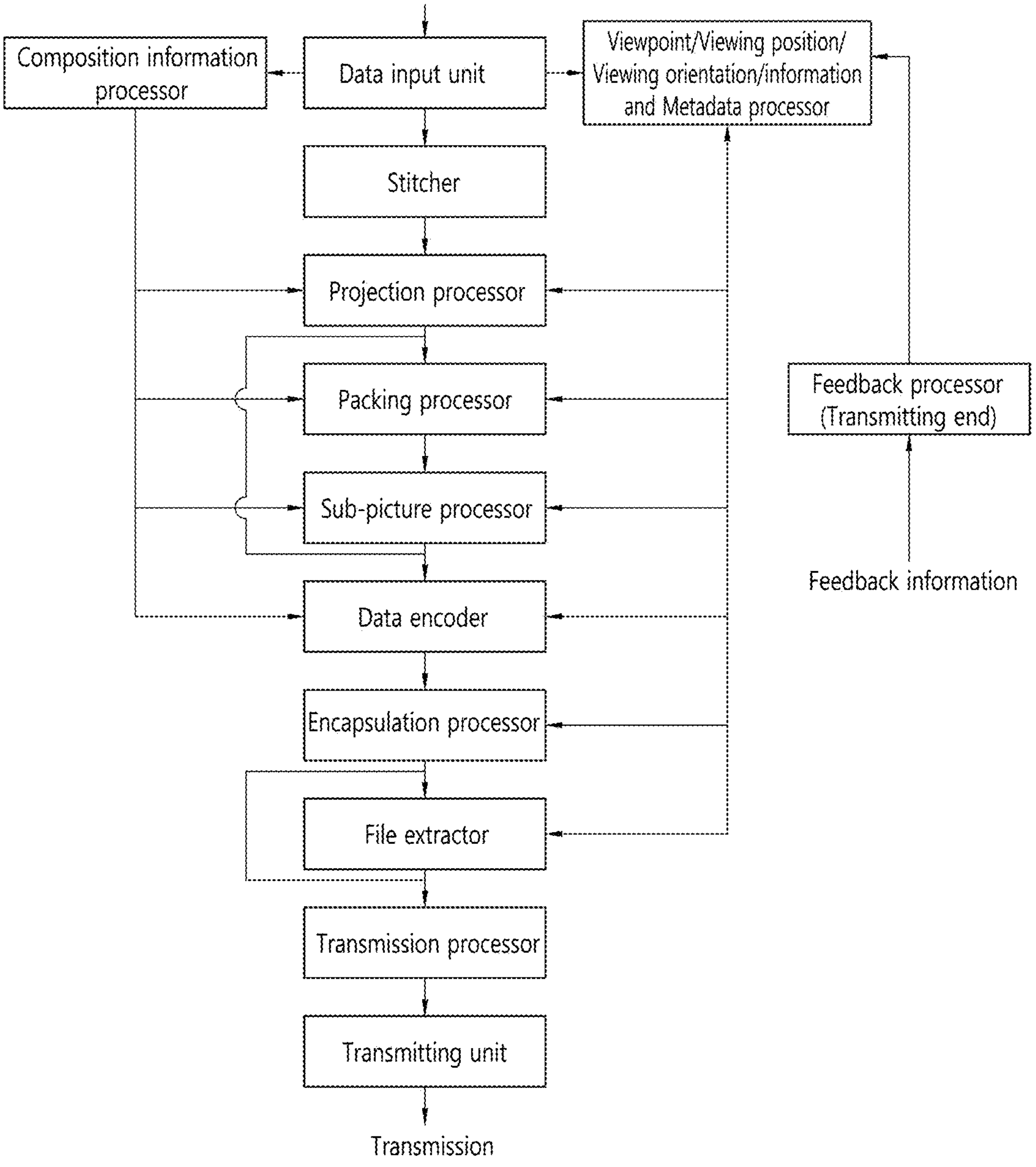
FIG. 16 shows a general configuration of a 3DoF+ transmitting end.

A general example of the transmission/reception processing processes based on the above-described architecture may be illustrated as shown in FIG. 15 and FIG. 16. The transmission/reception processing processes of FIG. 15 and FIG. 16 is described based on the image signal processing procedure, and, in case of processing other signals, such as audio or text, some parts (e.g., stitcher, projection processor, packing processor, sub-picture processor, unpacking/selection, rendering, composition, viewport generation, and so on) may be omitted, or may be varied and processed to fit an audio or text processing process.

FIG. 16 shows a general configuration of a 3DoF+ transmitting end.

Referring to FIG. 16, in case the inputted data corresponds to a camera output image, the transmitting end (360 video transmitting device) may carry out stitching for sphere image configuration for each of the viewpoint/viewing position/component. When the viewpoint/viewing position/component-wise sphere image is configured, the configured sphere image may be projected to a 2D image in order to perform coding. Depending upon the application, packing may be performed for creating the multiple images into an integrated image, or the images may be created into sub-pictures segmenting an image into detailed segmented areas. As described above, as an optional process, the region-wise packing process may not be performed, and, in this case, the packing processor may be omitted. In case the inputted data corresponds to additional video/audio/text information, a method of adding and displaying the additional information to a center image may be notified, and the additional data may also be transmitted along with the notification. The generated image and added data may be processed with an encoding process, wherein the generated image and added data are compressed and generated to a bitstream, and may then be processed with an encapsulation process, wherein the processed data are converted to a file format suitable for transmission or storing. At this point, depending upon the application or system requirement, a process of extracting a file that is needed by the receiving unit may be performed. The generated bitstream may be converted to a transport format by the transmission processor and may then be transmitted. At this point, a feedback processor of the transmitting end may process the viewpoint/viewing position/viewing orientation information and the necessary metadata based on the information delivered from the receiving end. Thereafter, the processed information and metadata may be delivered to the related transmitting unit so as to be processed.

Figure 17:
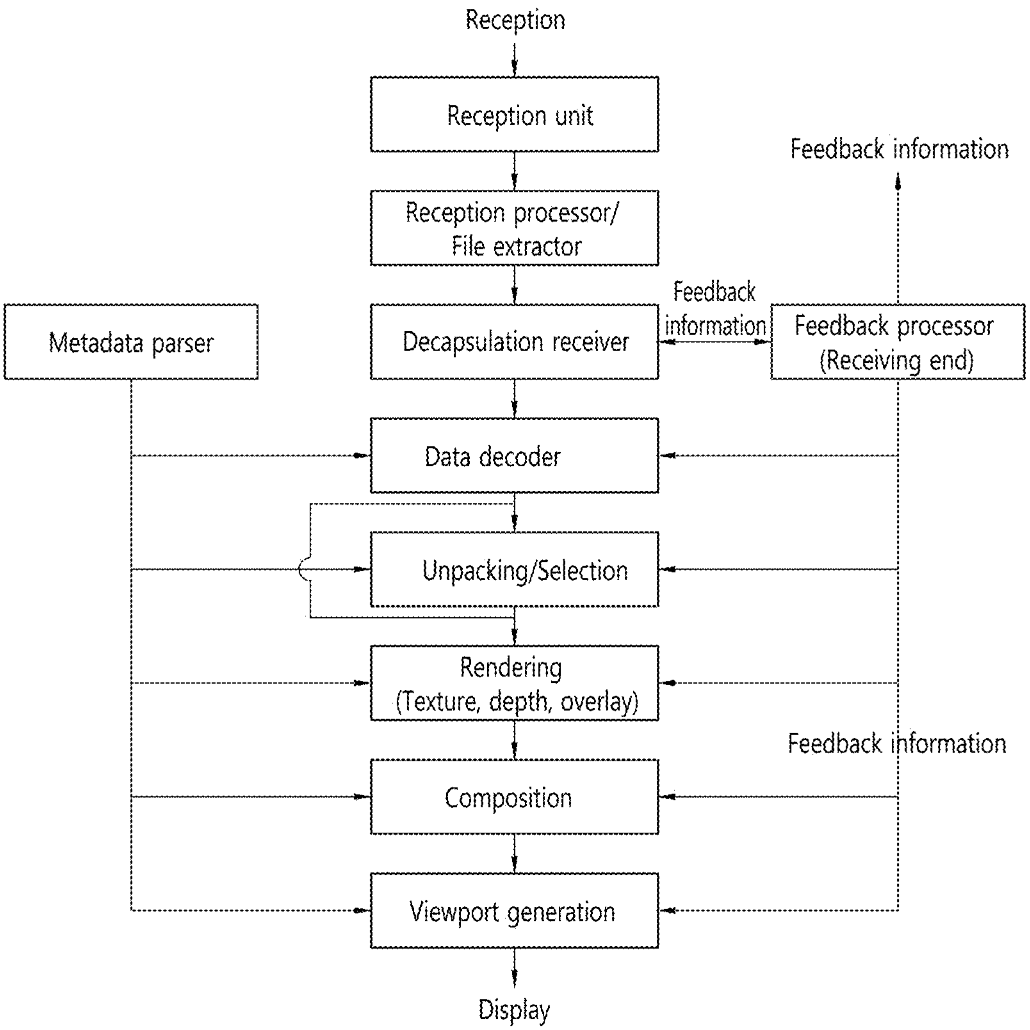
FIG. 17 shows a general configuration of a 3DoF+ receiving end.

FIG. 17 shows a general configuration of a 3DoF+ receiving end.

Referring to FIG. 17, after receiving a bitstream that is delivered from the transmitting end, the receiving end (360 video receiving device) may extract necessary files. The receiving end selects and processes an image stream within the generated file format by using the viewpoint/viewing position/viewing orientation information and video metadata that are delivered from the feedback processor, and, then, the receiving end may reconfigure the selected bitstream as image information via the decoder. In case of a packed image, unpacking may be performed based on packing information being delivered through the metadata. In case the packing process is omitted in the transmitting end, the unpacking of the receiving end may also be omitted. Moreover, when needed, a process of selecting an image appropriate for the viewpoint/viewing position/viewing orientation, which are delivered from the feedback processor, and selecting the necessary component may be performed. A rendering process for reconfiguring the texture, depth, overlay information, and so on, of the image to a format appropriate for playback (or reproduction) may be performed. Before generating a final image, a composition process for integrating different layers may be performed, and an image appropriate for a display viewport may be generated and then played-back (or reproduced).

This specification provides an image overlaying method for a 360 video (VR or augmented reality (AR)). In case of a 360 video, since a user may view an image/video/reality (in case of see-through) by changing the viewpoint/viewing orientation by 360 degrees, the user may be exposed to a wider range of contents. Although auxiliary information on a specific position of the 360 content may be immediately shown to the user's viewport, in this case, a connection between the auxiliary information and the connected position may be disconnected. In this case, the user shall locate the position of the information that is being shown in his (or her) viewpoint. In order to intuitively display a specific position and the respective auxiliary information at the same time, the auxiliary information being matched to a specific viewpoint may be displayed in overlay, or the auxiliary information may be displayed near a specific viewpoint being matched with the auxiliary information and a line shall be drawn and displayed to indicate that the corresponding information is the information on the specific viewpoint. For such usage, the 360 video overlay shall support a method for designating the position of an overlay so that the overlay can exist in the user viewport as well as the three-dimensional (3D) space. The present invention provides a method for supporting image overlay in relation to a 360 video. The present invention may be applied to a 3DoF based VR system as well as a 3DoF+ based VR system, and the present invention may also be applied to an augmented reality (AR) system.

The present invention provides a method for storing and signaling information for supporting an overlay, which will be described later on in detail. The information for supporting the overlay may be delivered (or transported) in an overlay related metadata format. The information for supporting the overlay may be delivered to the data encoder and/or encapsulation processor through the data input unit and/or metadata processor of the transmitting end and may then be processed for transmission, and then, the information may be transmitted to the receiving end. In this case, the related information may be delivered in a bitstream format. The bitstream may also be referred to as a video stream or a video bitstream. The receiving end may extract the necessary files from the received bitstream and may extract overlay related metadata via the capsulation processor and the metadata parser. Thereafter, the extracted metadata is delivered to the rendering unit, and the rendering unit renders the overlay, which is then processed with the composition process, thereby being displayed on a screen.

Since the image overlay for the two-dimensional (2D) image/video has not considered the 360 3D space, its characteristics are different from those of the overlay for the 360 video and, therefore, cannot be immediately applied to the 360 video. According to the present invention, the position and order of the overlay (overlay content, overlay texture, overlay image, and so on) may be defined, as described below. For example, the overlay according to the present invention may be broadly sorted to categories in accordance with the (rendering) type of the overlay. The categories correspond to: 1) an overlay on the current viewport, 2) an overlay on a 360 surface, and 3) an overlay for a 3D space inside the 360 surface. Herein, the 360 surface may correspond to a spherical surface or a cubic surface. The overlay on the current viewport may also be referred to as a viewport-relative overlay, and the overlay on a 360 surface may also be referred to as a sphere-relative projected omnidirectional overlay, and the overlay for a 3D space inside the 360 surface may also be referred to as a sphere-relative 2D overlay. The image overlaying in the 3D space inside the 360 surface may correspond to a 2D plane image. According to the present invention, diverse related metadata may be signaled in accordance with each overlay type, and the metadata may include the position and order information related to the overlay. Hereinafter, the overlaying subject may be interchangeably referred to as an overlay content, overlay visual media, overlay texture, (overlay) graphic, overlay region, overlay image, overlay texture, overlay video, overlay text, overlay, and so on.

In order to support the above-described overlay according to the present invention, for example, overlay related metadata may be generated and transmitted, as described below. The following table shows an example of a related metadata being transmitted in an OverlayLocationConfigBox. However, this is merely exemplary, and, therefore, the title of the box in which the metadata is being transmitted may be set up differently, and the metadata may be included as the data of a separate track within the file. Moreover, part of the information within the overlay related metadata may also be omitted.

TABLE 1

```
Class OverlayLocationConfigBox extends FullBox('olcb', version=0,
flags=0) {
    unsigned int(1) stereoscopic__flag;
    unsigned int(8) overlay__group__id;
    unsigned int(1) sphere__region__flag;
    unsigned int(1) range__included__flag;
    if(sphere__region__flag == 1) {
        signed int(32) centre__azimuth;
        signed int(32) centre__elevation;
        singed int(32) centre__tilt;
        if (range__included__flag) {
            unsigned int(32) azimuth__range;
            unsigned int(32) elevation__range;
        }
    }
    if(overlay__group__id == 5) {          // on the sphere, or cube
        unsigned int(16) depth;   // order to composite in the group
    } else if(overlay__group__id == 4) { // in 3d space
        if(sphere__region__flag == 1) {
            unsigned int(16) distance; // distance from center of sphere
        } else {
            signed int(32) centre__x;
            signed int(32) centre__y;
            signed int(32) centre__z;
            if (range__included__flag) {
                unsigned int(32) width;
                unsigned int(32) height;
            }
            signed int(32) rotation__yaw;
            signed int(32) rotation__pitch;
            signed int(32) rotation__roll;
        }
        unsigned int(1) billboards__flag; // always face the camera
    } else {                // over the current viewport
        unsigned int(16) reference__width;
        unsigned int(16) reference__height;
        unsigned int(16) top__left__x;
        unsigned int(16) top__left__y;
        unsigned int(16) 2d__width;
        unsigned int(16) 2d__height;
        unsigned int(16) depth;   //order to composite in the group
        unsigned int(32) tilt;
```

TABLE 1-continued

```
        if(stereoscopic__flag== 1) {
            unsigned int(1) relative__disparity__flag;
            if(relative__disparity__flag ==1) {
                signed int(16) disparity__in__percent;
            } else {
                signed int(16) disparity__in__pixels;
            }
        }
    }
    unsigned int(1) target__flag;        // to indicate target position
    if(target__flag == 1) {
        signed int(32) target__azimuth;
        signed int(32) target__elevation;
    }
}
```

Referring to Table 1, a stereoscopic_flag field indicates whether or not an overlay layer should be stereoscopically rendered. In case the value of the stereoscopic_flag field is equal to 0, this may indicate that the overlay layer shall be monoscopically rendered. And, in other cases, i.e., in case the value of the stereoscopic_flag field is equal to 1, this may indicate that the overlay layer shall be stereoscopically rendered by using disparity.

An overlay_group_id field indicates where a visual media (i.e., overlay image) shall be positioned. More specifically, the overlay_group_id corresponds to information indicating the above-described overlay type (or information for the overlay type). The overlay_group_id may also be referred to as an overlay_rendering_type, an overlay_type, or a display_mode, and so on. The information for the overlay type may indicate one of the overlay types. For example, the overlay types may include 1) an overlay on a current viewport, 2) an overlay on a 360 surface, and 3) an overlay for a 3D space inside the 360 surface. In this case, for example, values 0 to 2 of the overlay_group_id field may indicate the above-described overlay types of 1) to 3). Alternatively, by further segmenting the overlay types on the current viewport, the order may be further defined. For example, in case the value of the overlay_group_id field is equal to 1, the visual media may be positioned on the current viewport, and this may indicate that the corresponding visual media has the highest priority, such as, for example, a logo, and so on. And, in case the value of the overlay_group_id field is equal to 2, the visual media may be positioned on the current viewport, and this may indicate that the corresponding visual media has a lower priority than the case where the value of this field is equal to 1. For example, subtitles and/or closed caption, and so on may correspond to the case where the overlay_group_id field is equal to 2. In case the value of the overlay_group_id field is equal to 3, the visual media may be positioned on the current viewport, and this may indicate that the corresponding visual media has a lower priority than the case where the value of this field is equal to 2. Depending upon the context of the content, part of the order may be defined in advance. For examaple, the priority levels for the logo and/or subtitles may be pre-defined. In case the value of the overlay_group_id field is equal to 4, this may indicate that the visual media may be positioned on a 3D space inside the 360 surface. The 360 surface may correspond to a spherical surface or a cubic surface. And, in case the value of the overlay_group_id field is equal to 5, this may indicate that the visual media may be positioned on the 360 surface. The overlay_group_id field may imply (or suggest) the order of the overlay layers that are to be configured. Alternatively, information related to the overlay order may be explicitly used (or signaled). Accordingly, the overlay order of the visual media within the same overlay group, i.e., which visual media may be given a higher priority level in an overlaying situation, may be specifically indicated. The exemplary overlay positions and order according to the value of the overlay_group_id field may be represented as shown below in the following table.

TABLE 2

| overlay_group_ id value | Meaning | Example |
|---|---|---|
| 1 | located over the current viewport, and has highest priority | logo |
| 2 | located over the current viewport, and has lower priority than overlay_group_id 1 | subtitle, closed caption |
| 3 | located over the current viewport, and has lower priority than overlay_group_id 2 | |
| 4 | located in 3d space | |
| 5 | located over the 360° surface, which is sphere or cube | |

Figure 18:
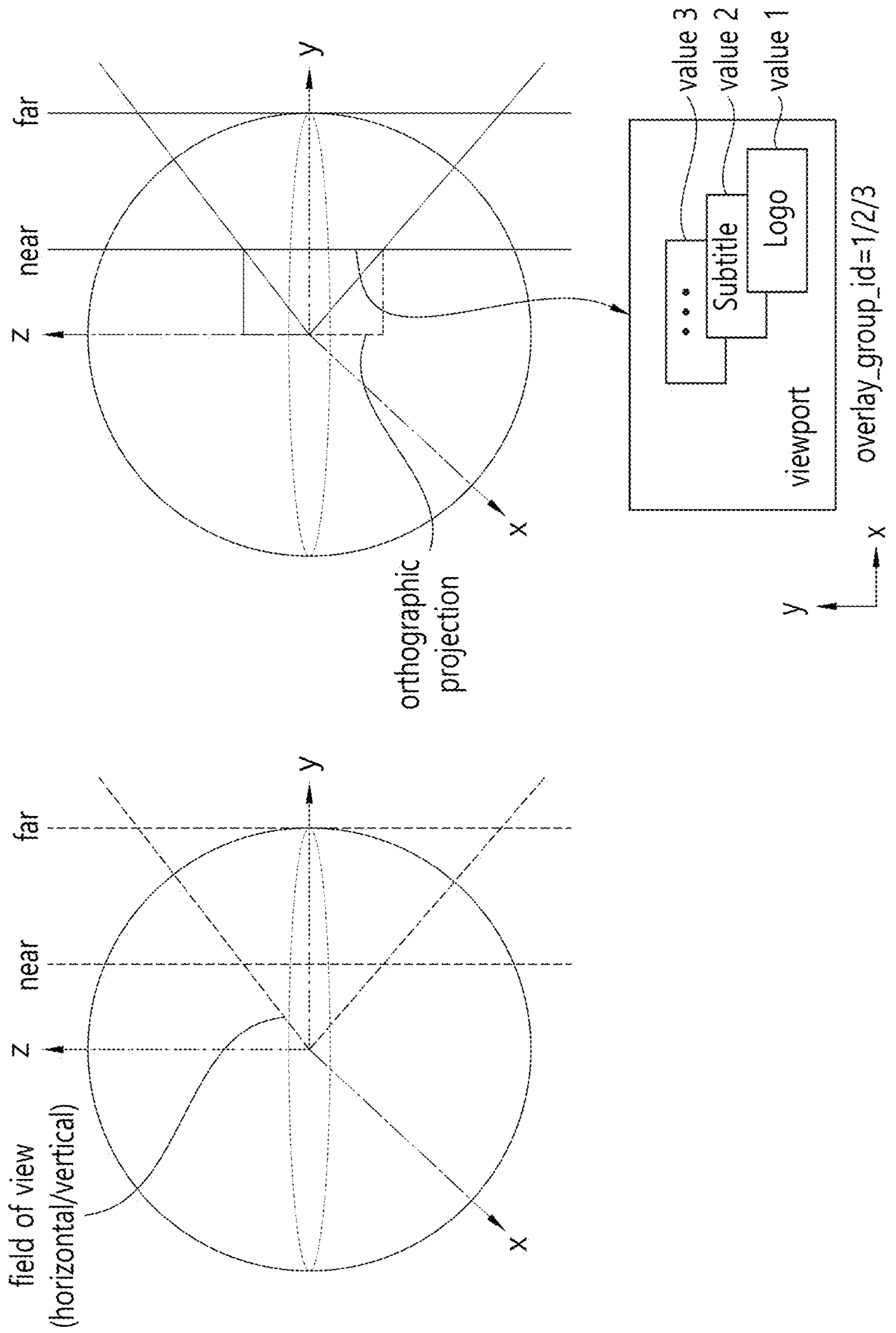
FIG. 18 to FIG. 20 respectively show exemplary overlay positions according to an overlay type.
Figure 19:
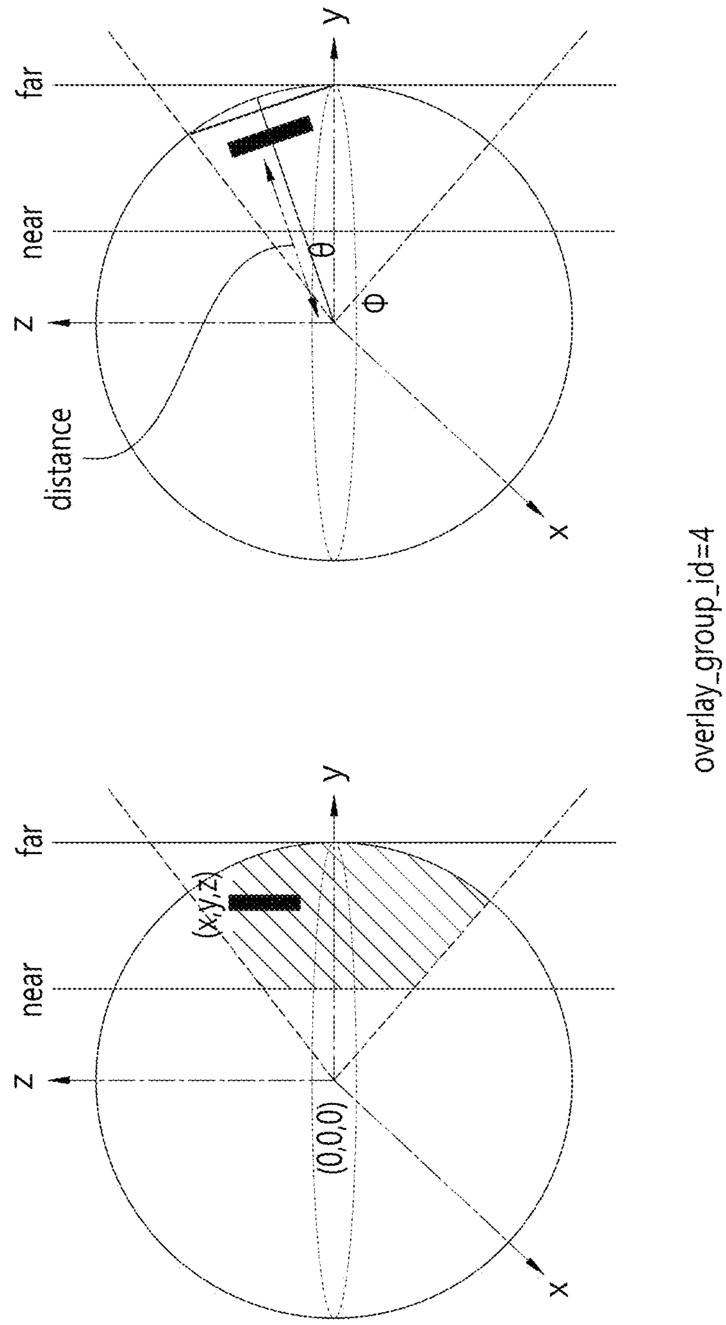
Figure 20:
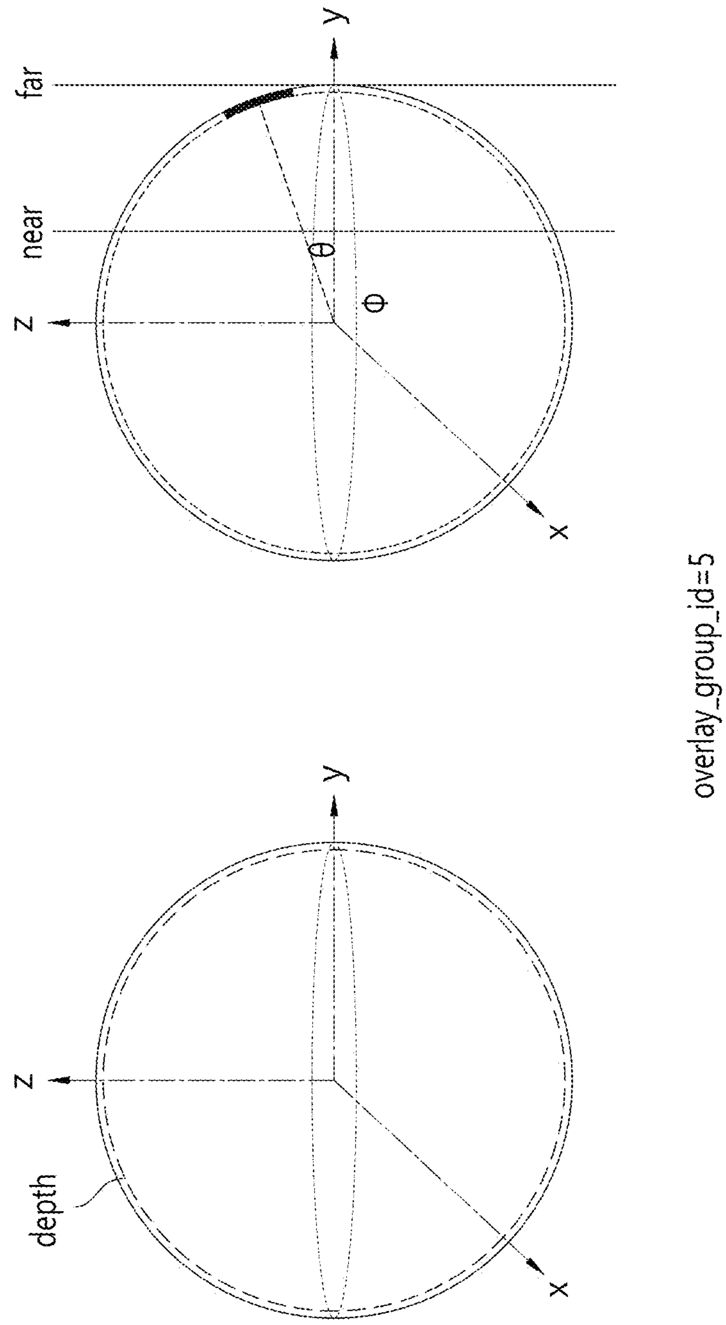

For example, overlay positions according to the overlay_group_id field values may be indicated as shown below in the following drawings. FIG. 18 to FIG. 20 respectively show exemplary overlay positions according to an overlay_type. More specifically, for example, FIG. 18 corresponds to a case where an overlay image overlays with a current viewport. This may represent cases where overlay_group_id field values are equal to 1 to 3. FIG. 19 corresponds to a case where an overlay image overlays with a 3D space inside a 360 surface. This may represent a case where the overlay_group_id field value is equal to 4. FIG. 20 corresponds to a case where an overlay image overlays with a 360 surface. This may represent a case where the overlay_group_id field is equal to 5.

A sphere_region_flag may indicate whether or not an overlay position is based on azimuth and elevation of a spherical coordinate, which corresponds to a 3D coordinate. In case the value of the sphere_region_flag is equal to 1, this may indicate that the overlay position is indicated based on azimuth and elevation. In other cases, the overlay position may be indicated by other methods.

A centre_azimuth field and a centre elevation field indicates azimuth and elevation values of a sphere region. These values may be indicated in units of $2^{-16}$ degrees. The centre_azimuth field values may be within a range of $-180*2^{16}$ to $180*2^{16}-1$. The centre elevation field values may be within a range of $-90*2^{16}$ to $90"*2^{16}-1$.

A centre tilt may indicate a tilt angle of the sphere region. The tilt value may be indicated in units of $2^{-16}$ degrees. The centre tilt value may be within a range of $-180*2^{16}$ to $180*2^{16}-1$.

An azimuth_range field and an elevation range field indicates azimuth and elevation ranges through a center point of the sphere region. The values of the fields may be indicated in units of $2^{-16}$ degrees. The value of the azimuth_range field is within a range of 0 to $360*2^{16}$. And, the value of the elevation_range field is within a range of 0 to $180*2^{16}$.

A depth field indicates a composite order. A smaller value may indicate that the corresponding overlay layer is positioned closer to the top of the overlay layers within the overlay group. The value of this field is within a range of 0 to $2^{16}$.

A distance field indicates a distance of a unit sphere from the center. In other words, the distance field may correspond to a randius of the unit sphere. The value of the distance field is relative to the unit sphere and may be within a range of 0 to $2^{-16}$.

A centre_x field, a centre_y field, and a centre_z field indicate positions within a 3D coordinate space. An origin within the 3D coordinate space may correspond to the center of the unit sphere. The values of this field may be relative to the unit sphere. The value of this field may be indicated in units of $2^{-16}$.

A width field and a height field indicate the overlay size. The values of these fields may be relative to the unit sphere, and the values of these fields may be indicated in units of $2^{-16}$.

A rotation_yaw field, a rotation_pitch field, and a rotation roll field may respectively indicate yaw, pitch, and roll angles of a rotation being applied to the unit sphere. The values of this field may be relative to the unit sphere. The value of this field may be indicated in units of $2^{-16}$. The value of the rotation_yaw field may be within a range of $-180*2^{16}$ to $80*2^{16}-1$. The value of the rotation_pitch field may be within a range of $-90*2^{16}$ to $90*2^{16}-1$. The value of the rotation_roll field may be within a range of $-180*2^{16}$ to $180*2^{16}-1$.

A billboards_flag field indicates whether or not the rotation changes in accordance with the camera viewing orientation. In case the value of the billboards_flag field is equal to 1, a normal value of an overlay layer (plane) of the visual media may be equal to the current face vector of the camera.

A reference_width field and a reference height field respectively indicate the width and height of a reference rectangular space in which all ROI coordinates (top_left_x, top_left_y, 2d_width, and 2d_height) are calculated.

A top_left_x field and a top_left_y field respectively indicate horizontal and vertical coordinates of the rectangular region.

A 2d_width field and a 2d_height field respectively indicate the width and height of the rectangular region.

A tilt field indicates a tilt angle of the sphere region. The tilt field may indicate the tilt angle in units of $2^{-16}$ degrees. The value of the tilt field may be within a range of $-180*2^{16}$ to $180*2^{16}-1$.

A relative_disparity_flag field may indicate whether the displarity is given as a percentage value for the width of a display window of a single view (a case where the field value is equal to 1) or whether the disparity is given as a number of pixels (a case where the field value is equal to 0).

A disparity_in_percent field indicates the disparity, in units of $2^{-16}$, as a fraction of the width of the display window for a single view. In case a displacement direction is the opposite, the value of this field may be equal to a negative number. The values of the disparity_in_percent field may be used to position the region on a left side for a left eye view and to position the region on a right side for a right eye view.

A disparity_in_pixels field indicates the displarity in pixel units. In case a displacement direction is the opposite, the value of this field may be equal to a negative number. The values of the disparity_in_pixels field may be used to position the region on a left side for a left eye view and to position the region on a right side for a right eye view.

A target_flag field may indicate whether or not the visual media has a reference point. The overlay may be used for diverse purposes. For example, the overlay may be used for providing supplementary information related to a specific position. In this case, the overlay visual media may be placed at an exact position, or may be placed near the corresponding position in order to avoid blocking (or covering) the main information. In case of the latter, the target_flag field may be used. In case the value of this field is equal to 1, the visual media may have position information in relation to the specific point.

A target_azimuth field and a target_elevation field may respectively indicate azimuth and elevation values of the sphere region. The values of the target_azimuth field and the target_elevation field may indicate the azimuth and elevation in units of $2^{-16}$ degrees. The value of the target_azimuth field may be within a range of $-180*2^{16}$ to $180*2^{16}-1$. And, the value of the target_elevation field may be within a range of $-90*2^{16}$ to $90*2^{16}-1$.

The above-described overlay related metadata may be transmitted from the transmitting device to the receiving device by using diverse methods.

For example, the overlay related metadata may be transmitted in an overlay timed metadata track format. For this, an overlay timed metadata track may be defined, and the overlay timed metadata track may be linked to one or more media tracks. In this case, the overlay timed metadata track may be linked to one or more media along with a 'sdsc' track reference. In this case, an OverlayLocationConfigBox may exist in a metadata sample entry, and the OverlayLocationConfigBox may indicate the position and order related to the overlay. The OverlayLocationConfigBox may be included, for example, as shown below in the following table.

TABLE 3

```
class OverlayObjectSampleEntry(type) extends MetaDataSampleEntry
(type) {
    OverlayLocationConfigBox( );
}
```

As another example, the overlay related metadata may be transmitted in a time information format within an overlay track and sample. For this, an overlay track may be defined. In this case, an OverlayLocationConfigBox may exist in a sample entry. The OverlayLocationConfigBox may indicate the position and order related to the overlay. An individual sample within the media data may include begin-time and end-time information for performing additional display. The OverlayLocationConfigBox may be included, for example, as shown below in the following table.

TABLE 4

```
class OverlayObjectSampleEntry(type) extends SampleEntry ('ovob') {
    OverlayLocationConfigBox( );
}
```

Figure 21:
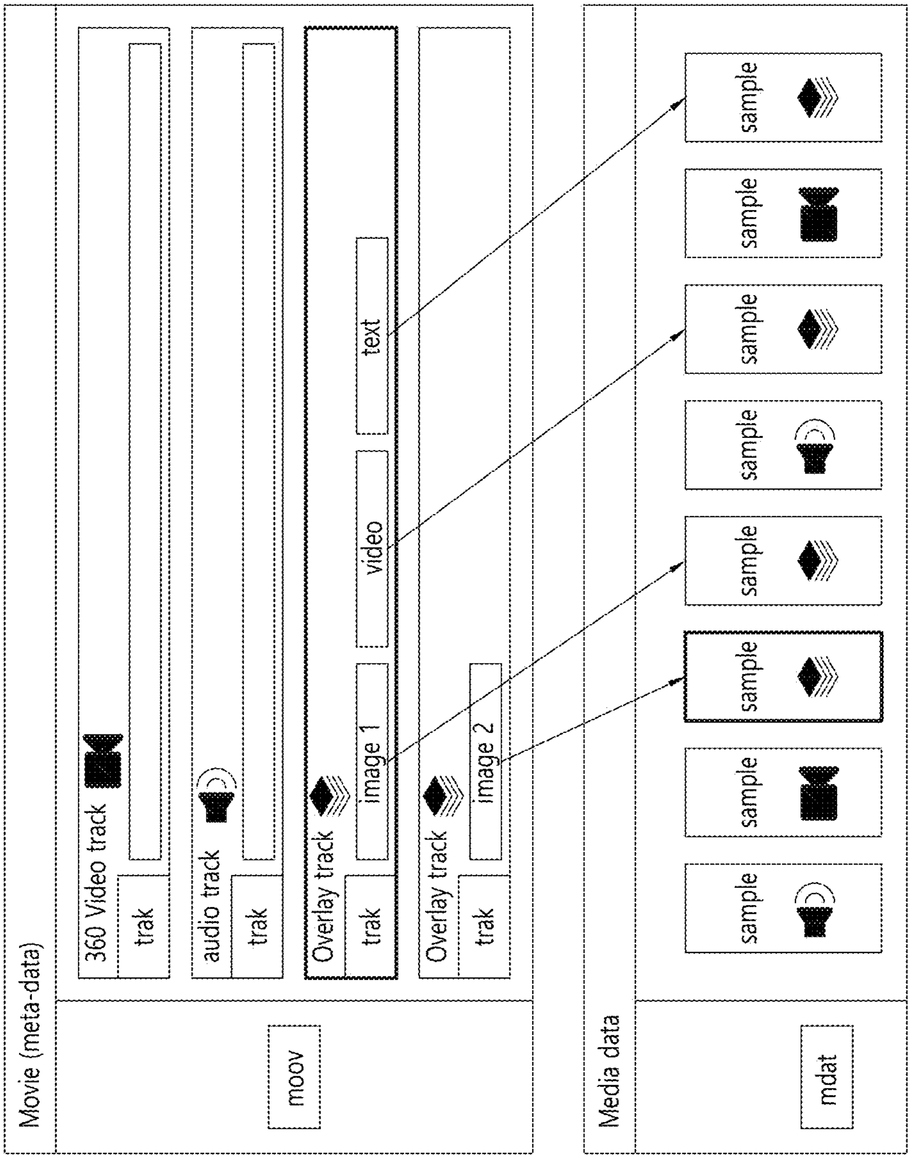
FIG. 21 shows an example of an overlay track and display time information being stored in a sample.

FIG. 21 shows an example of an overlay track and display time information being stored in a sample.

Figure 22:
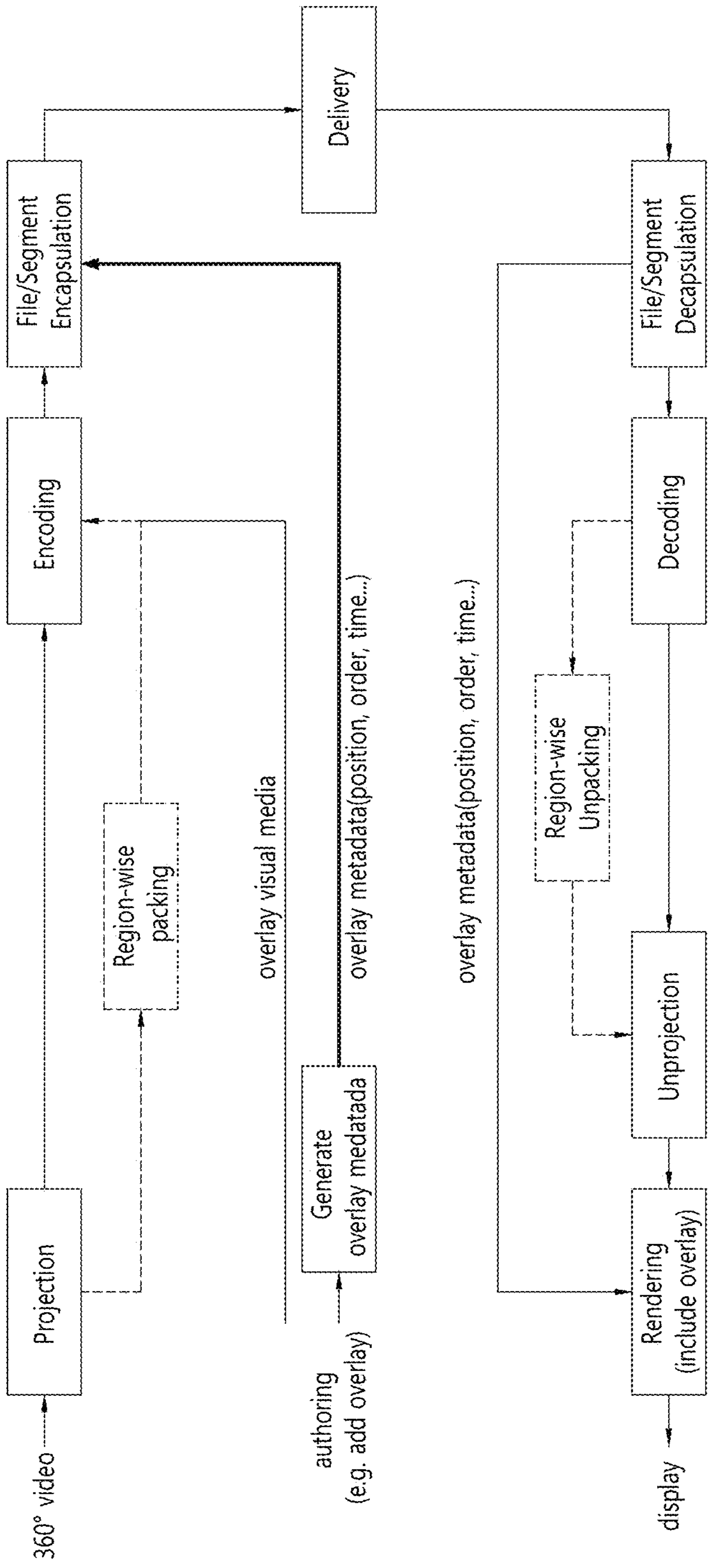
FIG. 22 shows a general view of a 360 video transmission/reception method based on overlay related metadata.

FIG. 22 shows a general view of a 360 video transmission/reception method based on overlay related metadata.

Referring to FIG. 22, as described above, the 360 video transmitting device may perform a projection procedure and, when needed, a region-wise packing procedure on the 360 video. Thus, a 2D picture may be derived. The 2D picture may be encoded in a bitstream format by performing an encoding procedure.

Meanwhile, an overlay image for overlay (overlay visual media) may be additionally encoded by performing the encoding procedure. Thereafter, when overlay related metadata is generated, the generated metadata is encpasualted to a media file format along with the output of the encoding procedure. Then, the processed media file may be transmitted to the 360 video receiving device.

The 360 video receiving device may receive the media file and may, then, acquire a 360 video related bitstream (encoded 360 video information), overlay image related bitstream (encoded overlay image information), and metadata by performing a decapsulation procedure. The 360 video receiving device may perform a decoding procedure based on the 360 video related bitstream (encoded 360 video information) and may decode a 2D picture related to the 360 image/video. The 2D picture may correspond to a projected picture or a packed picture. Additionally, the 360 video receiving device may decode the overlay image based on the 360 video related bitstream (encoded 360 video information). When rendering the 360 image/video based on the overlay related metadata, the 360 video receiving device may overlay and render the overlay image according to the specific position and specific order.

Meanwhile, a Metadata Sample Entry may be differently or separately defined based on where the overlay is positioned (or placed).

For example, in case an overlay is placed (or positioned) in a sphere region, an OverlayOnSphereSample may exist in a sample entry. This may be included, for example, as shown below in the following table.

TABLE 5

```
Class OverlayOnSphereSample Entry(type)
    extends SphereRegionSampleEntry('ovsp', version=0, flags=0) {
        OverlayOnSphereConfigBox( );
}
Class OverlayOnSphereConfigBox extends FullBox('oscb', version=0,
flags=0) {
        unsigned int(16) depth;  // order to composite in the group
        unsigned int(1) billboards_flag; // always face the camera
        unsigned int(1) target_flag;      // to indicate target position
        if(target_flag == 1) {
            signed int(32) target_azimuth;
            signed int(32) target_elevation;
        }
}
```

The semantics of each field may be as defined in Table 1, which is presented above. More specifically, fields having the same name as the fields listed above may carry the same information. This is also the same in the following description.

Figure 23:
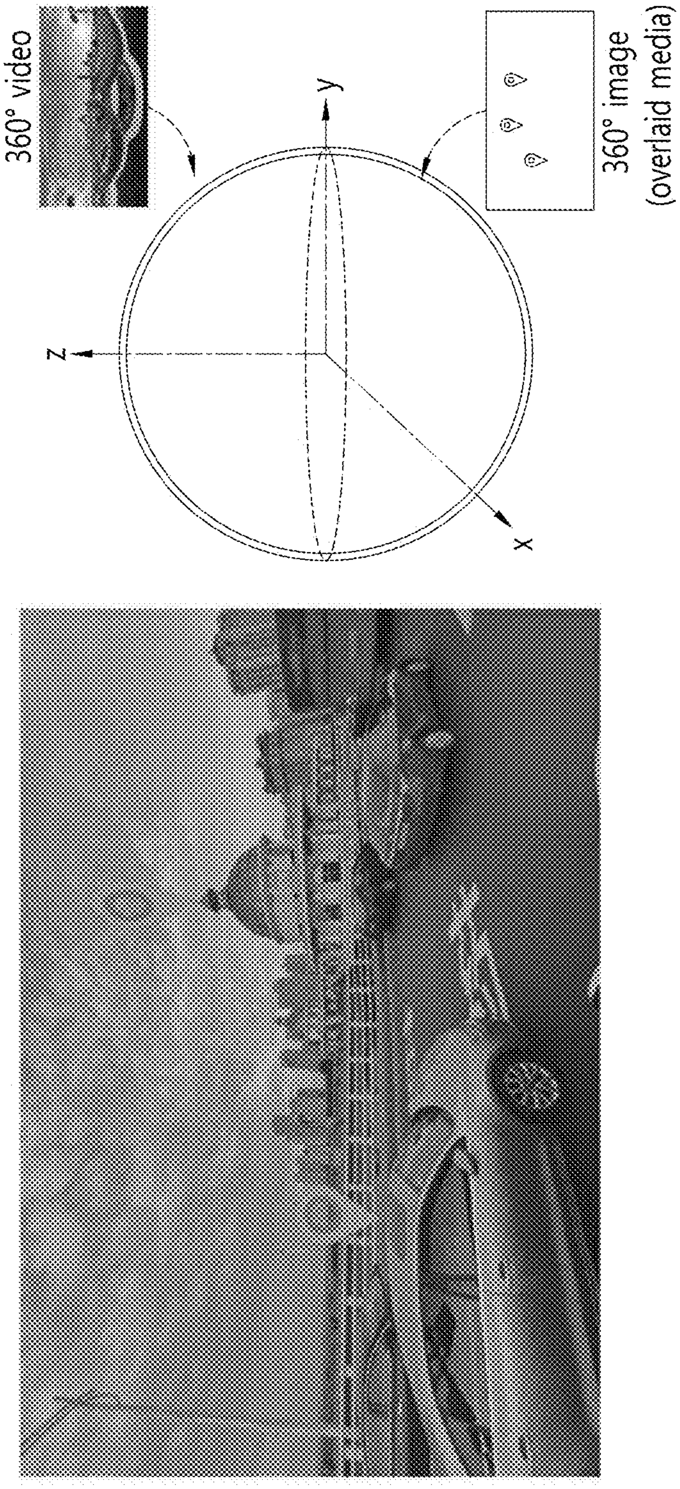
FIG. 23 and FIG. 24 are examples of a case where an overlay is positioned on a sphere region.
Figure 24:
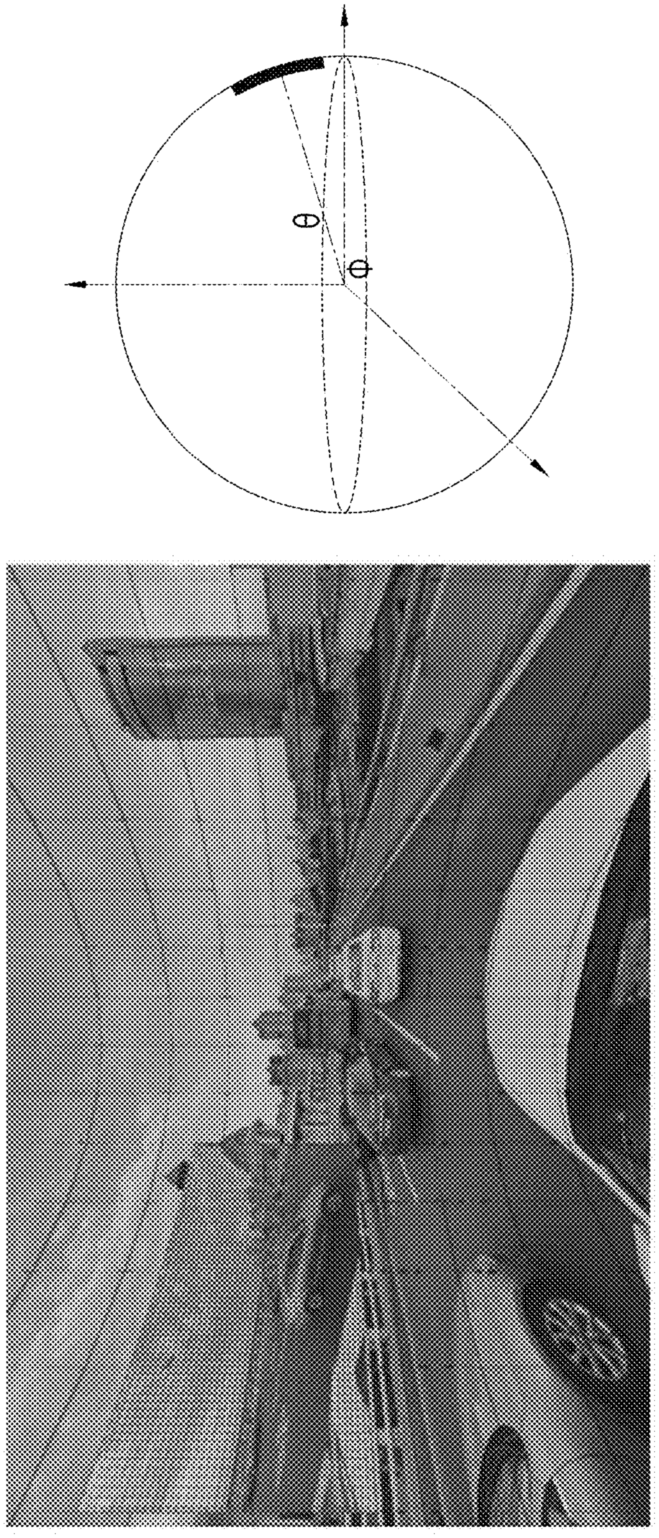

FIG. 23 and FIG. 24 are examples of a case where an overlay is positioned on a sphere region. In case the overlay is positioned on the sphere region, an overlay image may be displayed as shown in FIG. 23 and FIG. 24.

As another example, in case the overlay is positioned on the current viewport, OverlayOverViewportSample may exist in the sample entry. An example of the same may be represented as shown below in the following table.

TABLE 6

```
Class OverlayOverViewportSample Entry(type)
    extends MetaDataSampleEntry('ovvi', version=0, flags=0) {
        OverlayOverViewportConfigBox ( );
}
Class OverlayOverViewportConfigBox extends FullBox('ovcb',
version=0, flags=0) {
        unsigned int(16) reference_width;
        unsigned int(16) reference_height;
        unsigned int(16) top_left_x;
        unsigned int(16) top_left_y;
        unsigned int(16) 2d_width;
        unsigned int(16) 2d_height;
        unsigned int(16) depth;  // order to composite in the group
        unsigned int(32) tilt;
```

TABLE 6-continued

```
        if(stereoscopic__flag== 1) {
                unsigned int(1) relative__disparity__flag;
                if(relative__disparity__flag ==1) {
                    signed int(16) disparity__in__percent;
                } else {
                    signed int(16) disparity__in__pixels;
                }
        }
        unsigned int(1) target__flag;        // to indicate target position
        if(target__flag == 1) {
            signed int(32) target__azimuth;
            signed int(32) target__elevation;
        }
}
```

Figure 25:
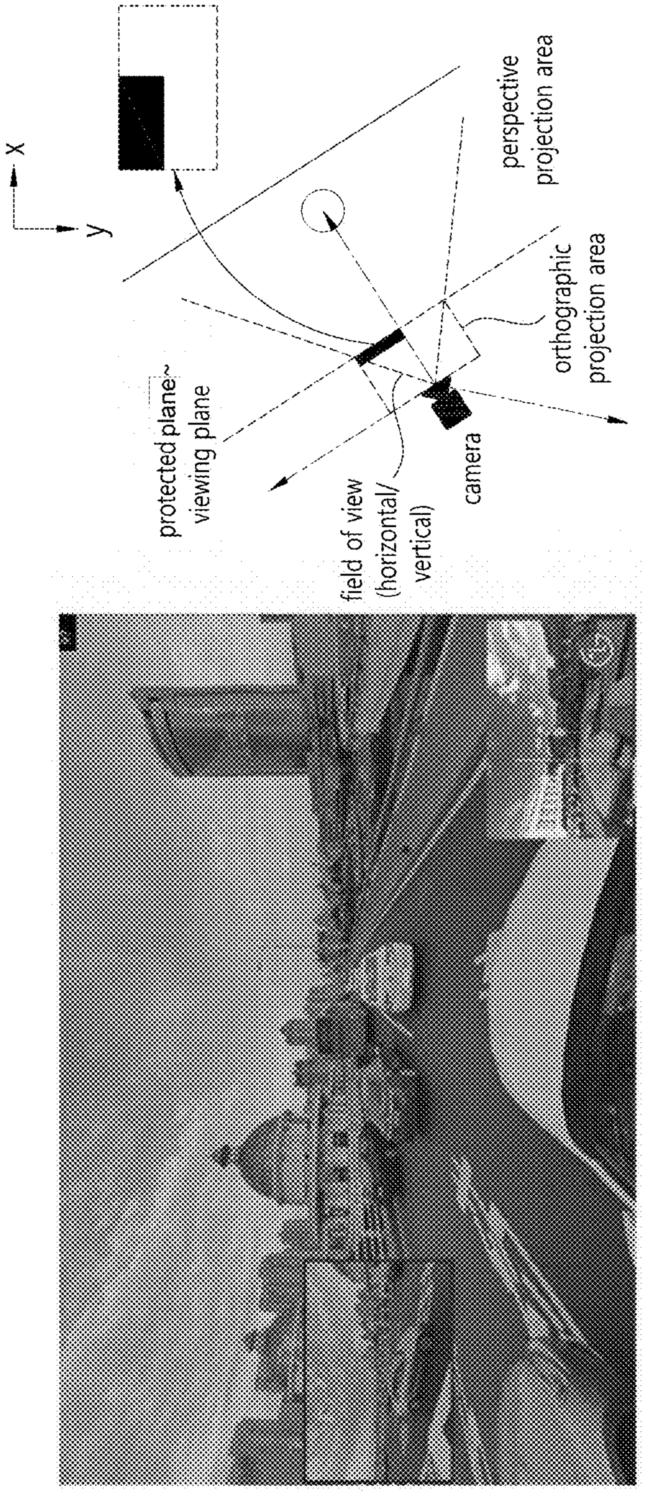
FIG. 25 illustrates a case where an overlay is positioned on a current viewport.

FIG. 25 illustrates a case where an overlay is positioned on a current viewport. In case the overlay is positioned on the current viewport, the overlay image may be indicated as shown in FIG. 25.

As another example, in case an overlay is positioned in a 3D space within a sphere or a cube an OverlayIn3DSpaceSample may exist in a sample entry. This may be represented, for example, as shown below in the following table.

TABLE 7

```
Class OverlayIn3DSpaceSample Entry(type)
    extends MetaDataSampleEntry('ov3d', version=0, flags=0) {
        OverlayIn3DSpaceConfigBox ( );
}
Class OverlayIn3DSpaceConfigBox extends FullBox('o3cb', version=0,
flags=0) {
        signed int(32) centre__x;
        signed int(32) centre__y;
        signed int(32) centre__z;
        if (range__included__flag) {
            unsigned int(32) width;
            unsigned int(32) height;
        }
        signed int(32) rotation__yaw;
        signed int(32) rotation__pitch;
        signed int(32) rotation__roll;
        unsigned int(1) billboards__flag; // always face the camera
        unsigned int(1) target__flag;        // to indicate target position
        if(target flag == 1) {
            signed int(32) target__azimuth;
            signed int(32) target__elevation;
        }
}
```

Figure 26:
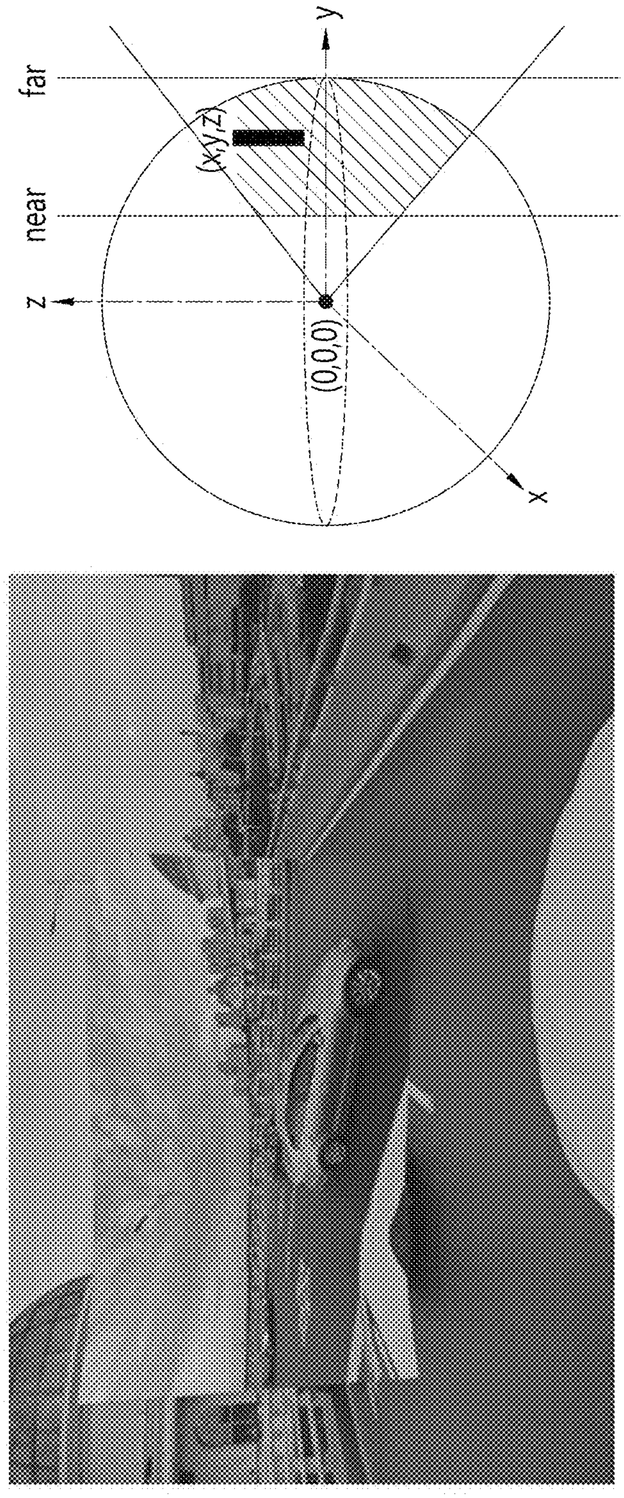
FIG. 26 is an example of a case where an overlay is positioned in a 3D space within a sphere or cube.

FIG. 26 is an example of a case where an overlay is positioned in a 3D space within a sphere or cube. In case the overlay is positioned in the 3D space within a sphere or cube, the overlay image may be indicated as shown in FIG. 26.

Meanwhile, an overlay metadata track may include information on overlay position, size, property (opacity, interaction, and so on) for overlay rendering. The rendering metadata of the overlay (overlay related metadata) may be changed in time, and, in this case, as described above, the rendering metadata of the overlay may be stored as timed metadata.

Figure 27:
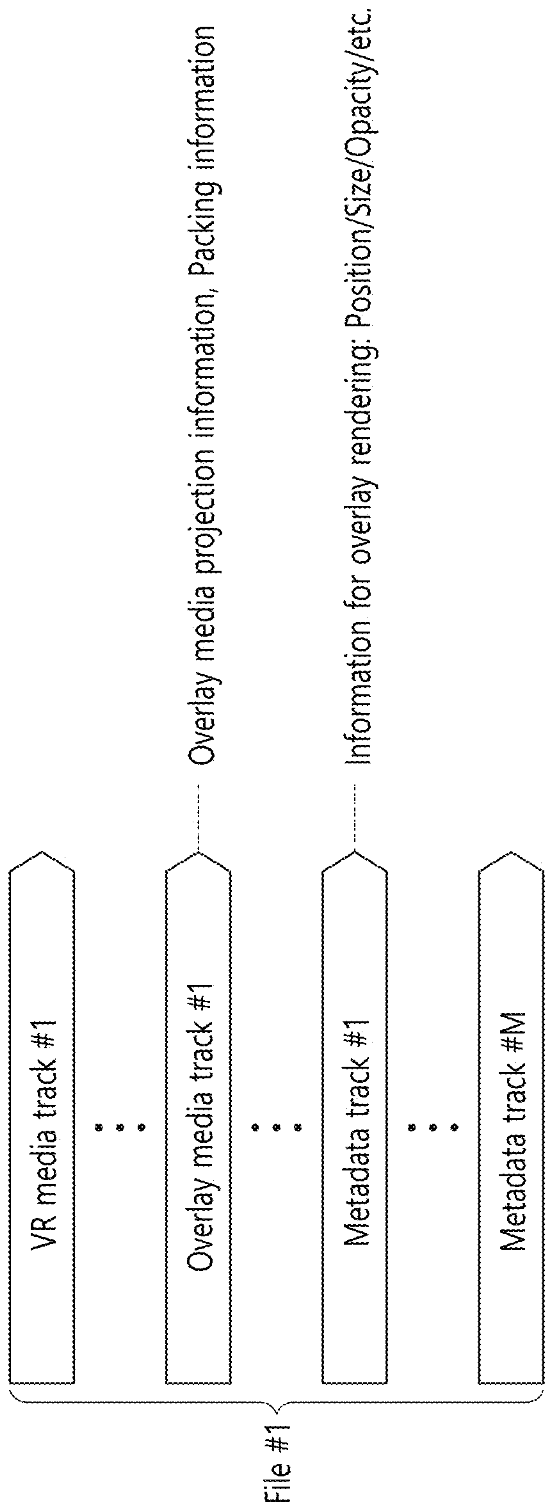
FIG. 27 shows an exemplary overlay metadata track including overlay-related metadata.

FIG. 27 shows an exemplary overlay metadata track including overlay-related metadata.

An example of position related information overlaying with an overlay image (media) may be shown below in the following table.

TABLE 8

```
aligned(8) class OverlayPosStruct( ) {
    unsigned int(8) region__type;
    if(region__type == 0) {
        ViewportOverlayRegion( );
    } else if (region__type == 1) {
        SphereOverlayRegion( );
    } else if (region__type == 2) {
        3DOverlayRegion( );
    }
}
```

Herein, a region_type field indicates a layer position type. For example, when a value of the region_type field is equal to 0, this may indicate that the overlay is displayed on the user viewport. And, when the value of the region_type field is equal to 1, this may indicate that the overlay is positioned on the sphere, and when the value of the region_type field is equal to 2, this may indicate that the overlay is positioned in a 3D space.

For example, in case the overlay is positioned on the user viewport, the overlay related metadata may include the following.

TABLE 9

```
aligned(8) class ViewportOverlayRegion( ) {
    unsigned int(16) rect__left__percent;
    unsigned int(16) rect__top__percent;
    unsigned int(16) rect__width__percent;
    unsigned int(16) rect__height__precent;
    unsigned int(16) order;
    unsigned int(1) stereoscopic__flag;
    bit(7) reserved=0;
    if (stereoscopic__flag == 1) {
        unsigned int(1) relative__disparity__flag;
        if (relative__disparity__flag == 1) {
            signed int(16) disparity__in__percent;
        } else {
            signed int(16) disparity __in__pixels;
        }
    }
}
```

ViewportOverlayRegion( ) indicates position related information where the overlay media is overlayed.

Herein, since position information of a top left point of a rectangular plane (rect_left_percent and rect_top_percent fields) and size information of the rectangular plane (rect_width_percent field, rect_height_percent field) may vary in accordance with the size of the display, the values may be specified in percentage.

An order field specifies an order of overlays in preparation for a case where overlays overlay (or overlap). And, when performing rendering, the receiver may control the order or may control the displacement (or positioning) values.

A stereoscopic_flag field corresponds to flag information indicating whether or not stereo is supported.

A relative_disparity_flag field corresponds to flag information indicating whether or not relative displarity values are assigned, when stereo is supported.

A disparity_in_percent field indicates a relative disparity value.

A disparity_in_pixels field indicates a pixel-unit disparity value.

Figure 28:
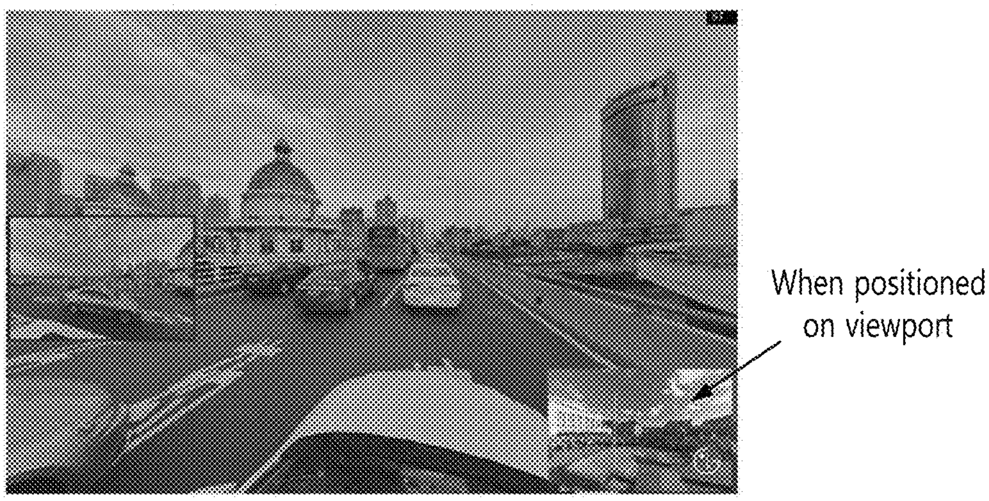
FIG. 28 is an example of a case where an overlay is positioned on a viewport.

FIG. 28 is an example of a case where an overlay is positioned on a viewport. The overlay may be positioned on the viewport, as shown in the drawing, by using the overlay related metadata.

As another example, in case an overlay is positioned on a sphere, overlay related metadata may include the following.

TABLE 10

```
aligned(8) class SphereOverlayRegion( ) {
    unsigned int(1) proj_shape=0;
    if (poj_shape == 1) {
            unsigned int(32) proj_reg_width_percent;
            unsigned int(32) proj reg height percent;
            unsigned int(32) proj_reg_top_percent;
            unsigned int(32) proj_reg_left_percent;
    } else if (proj_shape == 2) {
            unsigned int(8) num_rings;
            unsigned int(8) num_sectors;
            for (i = 0; i < num_rings; i++) {
                for (j =0; j < num_sectors; j++) {
                    unsigned int(16) proj_points_x[i][j];
                    unsigned int(16) proj_points_y[i][j];
                }
            }
            unsigned int(3) transform_type[i];
            bit(5) reserved = 0;
            for (i = 0; i < num_rings; i++) {
                for (j =0; j < num_sectors; j++) {
                    unsigned int(16) proj_points_x[i][j];
                    unsigned int(16) proj_points_y[i][j];
                }
            }
    } else if (proj_shape ==0) {
        unsigned int(8) shape_type;
            signed int(32) centre_azimuth;
            signed int(32) centre_elevation;
            unsigned int(32) azimuth_range;
            unsigned int(32) elevation_range;
            signed int(32) centre_tilt;
    }
    unsigned int(1) interpolate;
    unsigned int(16) deptn;
}
```

SphereOverlayRegion( ) indicates position related information overlaying with an overlay media.

A proj_shape field indicates a projected shape. If the value of the proj_shape field is equal to 0, this indicates none, if the value of the proj_shape field is equal to 1, this indicates a rectangle, and the value of the proj_shape field is equal to 2, this indicates a polygon.

In case the projected shape is a rectangle, and in case its position is specified by the position value within the projected picture, the position (proj_reg_top_percent field, proj_reg_left_percent field) and the size (proj_reg_width_percent field, proj_reg_height_percent field) may be specified in size reference percentage of the projected picture.

In case the projected shape is a polygon, the position value within the projected picture may be specified by a number of horizontally segmented regions (num_rings field) and a number of vertically segmented regions (num_sectors field) within the projected picture.

A proj_points_x[i] [j] field and a proj_points_y[i][j] field respectively indicate position values within the projected picture of each segmentation point.

A packed_points_x[i][j] field and a packed_points_y[i][j] field respectively indicate position values within the packed picture of each segmentation point.

In case the value of the proj_shape field is equal to 0, an on-sphere position expression type (based on a shape_type field) is designated. In case the value of the shape_type field is equal to 0, the shape may be configured of 4 great circles, and in case the value of the shape_type field is equal to 1, the shape may be configured of 2 azimuth circles and 2 elevation circles.

In order to designate values and sizes of azimuth and elevation at the center position of the overlay (centre_azimuth field, centre_elevation field), azimuth/elevation ranges (azimuth_range field, elevation_range field), and a rotation value (centre_tilt field) around a vector from the center point of the overlay to the origin of the sphere as the axis may be specified.

An interpolate field indicates flag information for performing a smooth change by filling the values between the changed (or varied) values.

A depth field indicates a distance (depth) value from the origin to an overlay center point in order to indicate the order of overlays in preparation for a case where overlays overlay.

Figure 29:
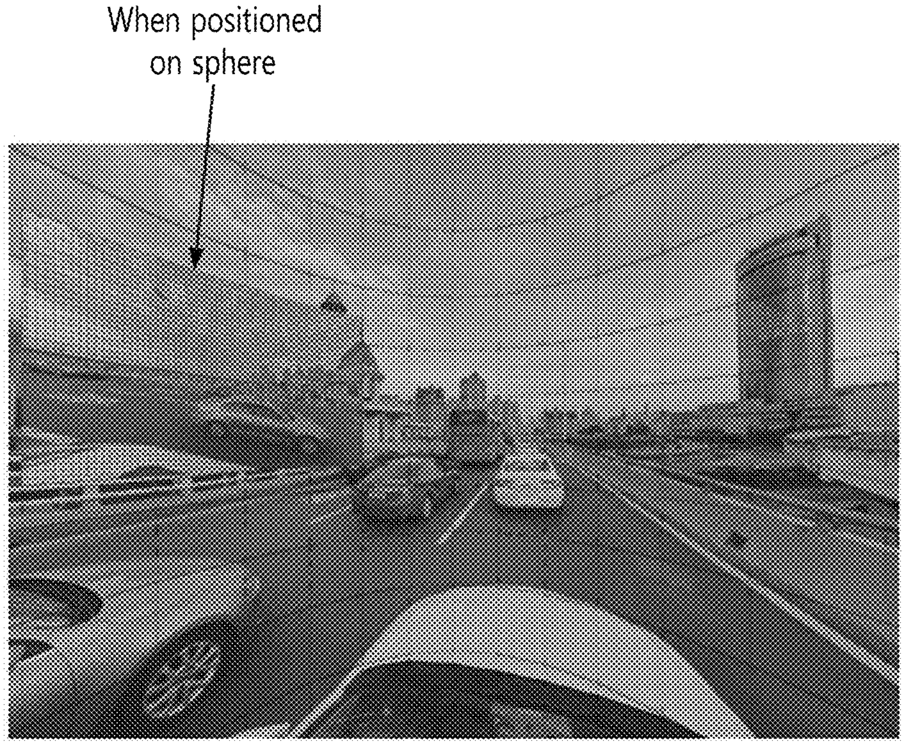
FIG. 29 is an example of a case where an overlay is positioned on a sphere.

FIG. 29 is an example of a case where an overlay is positioned on a sphere. The overlay may be positioned on the sphere, as shown in the drawing, by using the overlay related metadata.

As yet another example, a case where an overlay is positioned on a 3-dimensional (3D) space, overlay related metadata may include the following.

TABLE 11

```
aligned(8) class Overlay3DPositionStruct( ) {
    signed int(32) overlay_pos_x;
    signed int(32) overlay_pos_y;
    signed int(32) overlay_pos_z;
}
aligned(8) class OverlayRotationStruct( ) {
    signed int(32) overlay_rot_yaw;
    signed int(32) overlay_rot_pitch;
    signed int(32) overlay_rot_roll;
}
aligned(8) class 3DOverlayRegion( ) {
    unsigned int(32) width;
    unsigned int(32) height;
    bit(7) reserved=0;
    unsigned int(1) interpolate;
    Overlay3DPositionStruct( );
    OverlayRotationStruct( );
}
```

3DOverlayRegion( ) indicates position related information overlaying with an overlay media.

An overlay plane may be assumed to have a rectangular shape, and the size of the rectangualr plane may be determined by a 'width' field and a 'height' field based on y-axis and z-axis planes. Additionally, the rectangular plane may be relocated based on each of x, y, and z (overlay_pos_x field, overlay_pos_y field, overlay_pos_z field) of a position (Overlay3DPositionStruct( )) within a sphere coordinate system.

An overlay center may be set as the center, and the rotation of each axis based on the overlay coordinate system being respectively parallel to of each axis of the sphere may be indicated by overlay_rot_yaw field, overlay_rot_pitch field, and overlay_rot_roll field.

An interpolate field indicates flag information for performing a smooth change by filling the values between the changed (or varied) values.

Figure 30:
FIG. 30 is an example of a case where an overlay is positioned on a 3-dimensional (3D) space.

FIG. 30 is an example of a case where an overlay is positioned on a 3-dimensional (3D) space. The overlay may be positioned on the 3D space, as shown in the drawing, by using the overlay related metadata.

Figure 31:
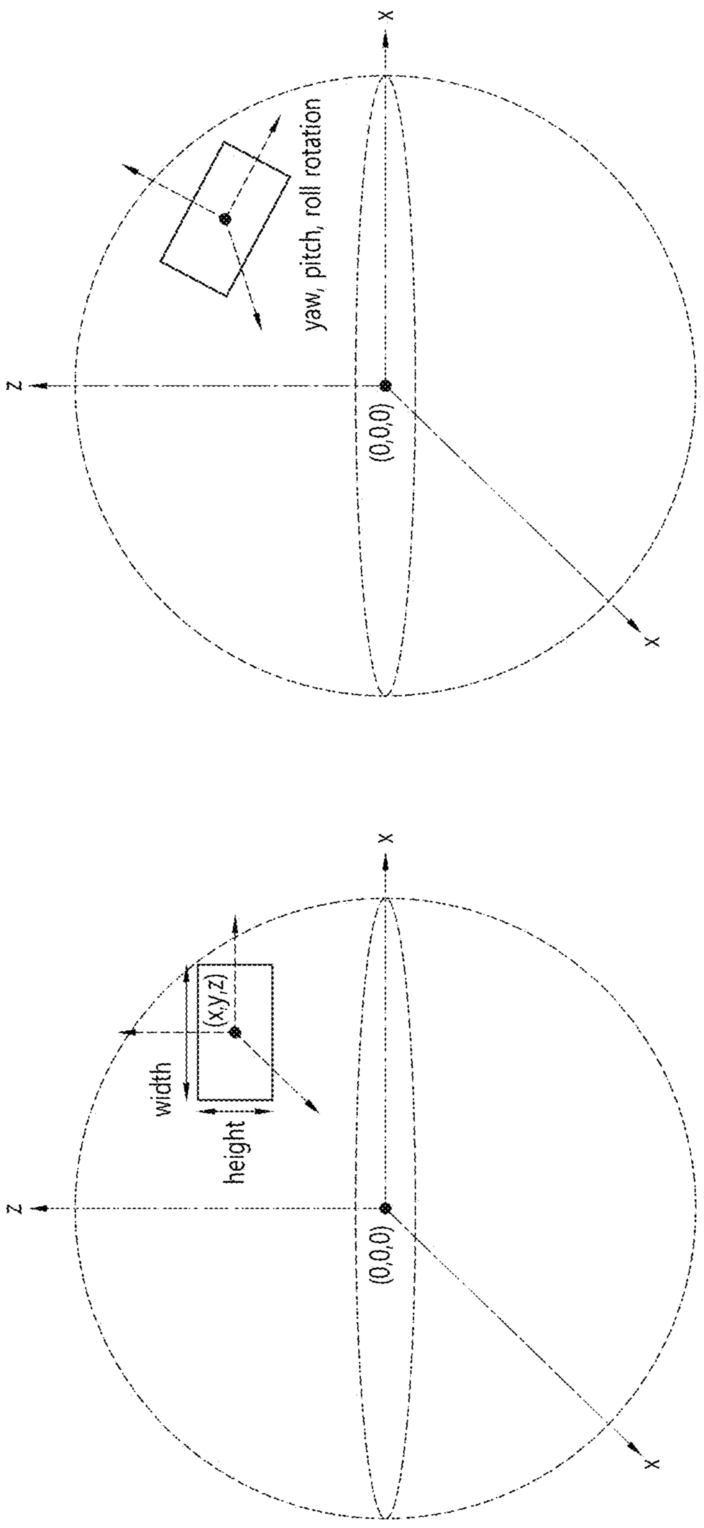
FIG. 31 shows the position/size/rotation of an overlay, when the overlay exists in a 3-dimensional (3D) space within a sphere.

FIG. 31 shows the position/size/rotation of an overlay, when the overlay exists in a 3-dimensional (3D) space within a sphere. The position, size, and rotation of the overlay may be derived, as shown in the drawing, based on an overlay_pos_x field, an overlay_pos_y field, an overlay_pos_z field, a width field, a height field, an overlay_rot_yaw field, an overlay_rot_pitch field, and/or an overlay_rot_roll field, and so on, which are included in the above-described overlay related metadata.

Additionally, the overlay related metadata may include overlay rendering property information. The overlay rendering property information may specify an opacity of an overlay plane when an overlay is being rendered, a rendering option being performed when an overlay is blended on a VR media, and a Focus effect.

Figure 32:
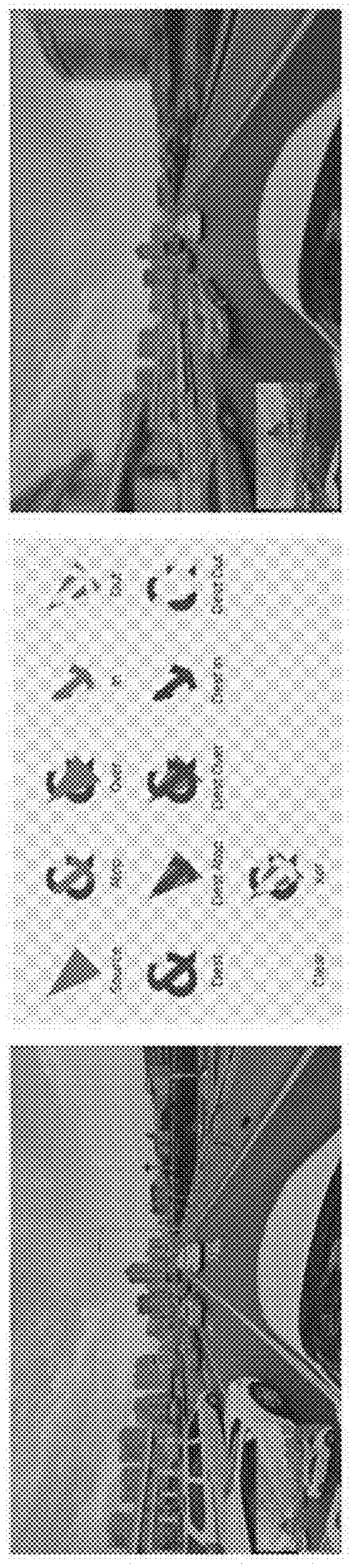
FIG. 32 shows an example of an overlay rendering property.

FIG. 32 shows an example of an overlay rendering property.

The above-described overlay rendering property may, for example, include the following.

TABLE 12

```
aligned(8) class OverlayRenderStruct( ) {
    unsigned int(1) cpacity__info__flag;
    unsigned int(1) blending__flag;
    unsigned int(1) focus__flag;
    unsigned int(5) reserve =0;
    if(opacity__info__flag == 1) {
        unsigned int(8) opacity;
    }
    if (blending__flag == 1) {
        unsigned int(8) blending__type=1;
    }
    if (focus__flag == 1) {
        unsigned int(8) focus;
    }
}
```

OverlayRenderStruct( ) indicates rendering property information that may be applied when an overlay display is being displayed/rendered.

An opacity_info_flag field corresponds to a flag indicating whether or not the entire opacity of the overlay plane is specified, and an opacity field specifies an opacity value.

A blending_flag field corresponds to a flag indicating whether or not blending that is to be applied when performing overlay composition is specified, and a blending_type field indicates the blending type. Values of the blending_type field indicate the following: 1=source_over, 2=source_atop, 3=source_in, 4=source_out, 5=dest_atop, 6=dest_over, 7=dest_in, 8=dest_out, 9=clear, 10=xor, and default settings may set the value of a source_over field to 1.

A focus_flag field corresponds to a flag indicating whether or not an overlay focus is specified, and a focus field indicates a focus value, and the value of the focus field may be within a range of 0 to 1.0. When a focus is specified on an overlay, a blur may be applied to another overlay being rendered by the receiver and to a VR media.

As described above, the overlay related metadata may carry information related to overlay position, size, rendering property, and interaction. In this case, the overlay related metadata may include information shown below, for example, in the following table.

TABLE 13

```
aligned(8) class OverlayInfoStruct( ) {
    unsigned int(32) overlay__id;
    unsigned int(16) overlay__source__id;
    unsigned int(1) overlay__essential__flag;
    unsigned int(1) overlay__priority;
    OverlayPosStruct( );
    OverlayRenderStruct( );
    OverlayMiscStruct( );
    OverlayInteractionStruct( );
}
```

OverlayInfoStruct( ) indicates overlay metadata. The overlay metadata may also be referred to as overlay related metadata.

An overlay_id field indicates an overlay metadata identifier.

An overlay_source_id field indicates an overlay media source data identifier.

An overlay_essential_flag field corresponds to flag information indicating whether or not an overlay shall be essentially overlayed.

An overlay_priority field indicates a priority when an overlay media is being overlayed.

OverlayPosStruct may indicate overlay position related information.

OverlayRenderStruct may indicate overlay rendering property related information.

OverlayMiscStruct may indicate overlay rendering miscellaneous information.

OverlayInteractionStruct may indicate overlay interaction information.

Meanwhile, dynamic overlay metadata (dynamic overlay related information) may be configured of timed-metadata.

Figure 33:
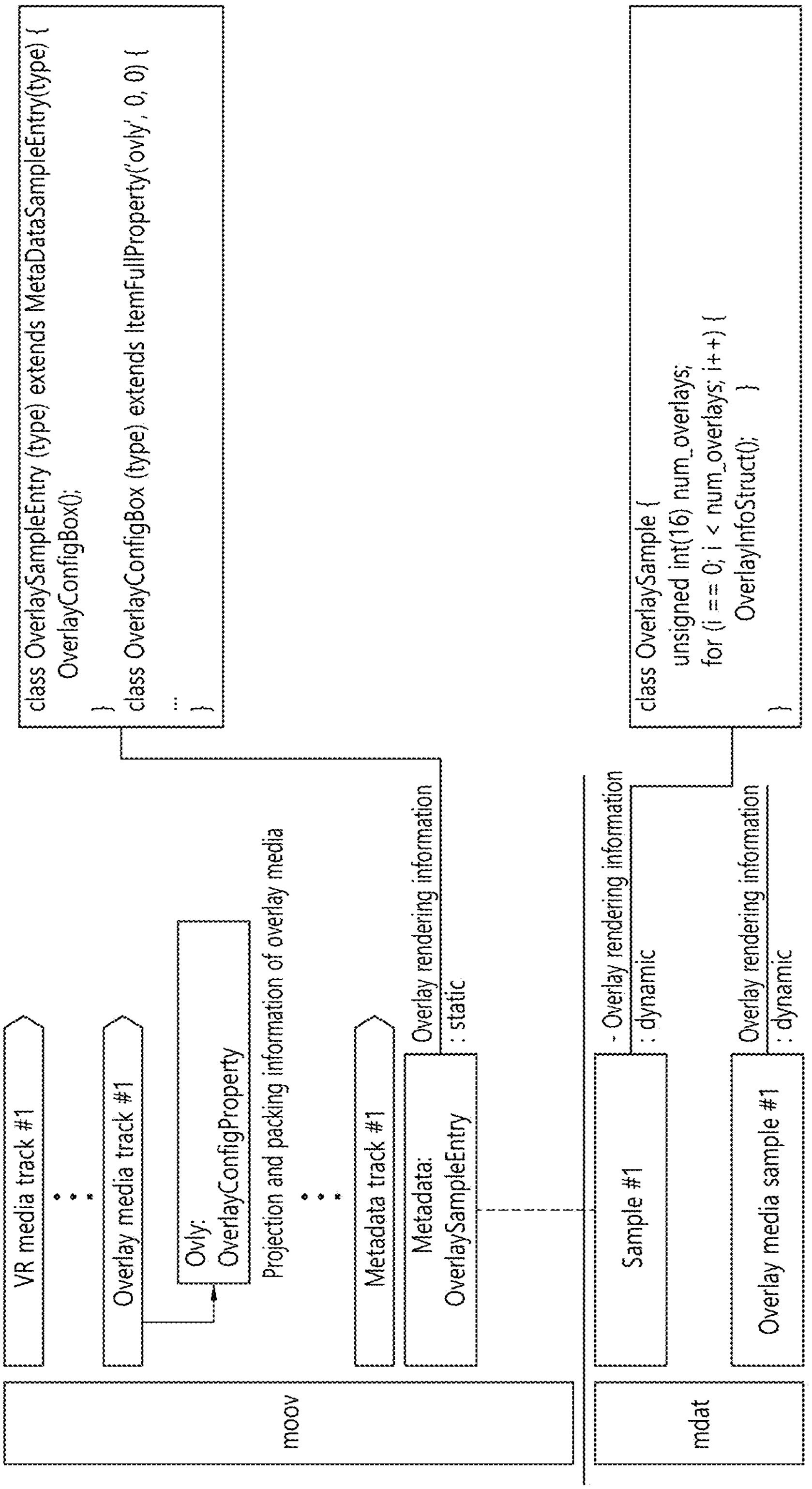
FIG. 33 shows an exemplary configuration of dynamic overlay metadata.

FIG. 33 shows an exemplary configuration of dynamic overlay metadata.

For example, in case the dynamic overlay metadata is configured of timed-metadata, as shown in FIG. 33, OverlaySampleEntry is defined, and the OverlaySampleEntry inherits MetadataSampleEntry and may summon OverlayConfigBox. Static overlay rendering metadata may be defined in the OverlayConfigBox. Actual dynamic overlay metadata may be stored in a sample. The OverlaySample may be configured of OverlayInfoStruct corresponding to a number of overlays. This may be indicated as shown below in Tables 14 and 15.

TABLE 14

```
aligned(8) class OverlayInfoStruct( ) {
    unsigned int(32) overlay__id;
    unsigned int(16) overlay__source__id;
    unsigned int(1) overlay__essential__flag;
    unsigned int(1) overlay__priority;
    OverlayPosStruct( );
    OverlayRenderStruct( );
    OverlayMiscStruct( );
    OverlayInteractionStruct( );
}
```

TABLE 15

```
class OverlaySample {
    unsigned int(16) num__overlays;
    for (i == 0; i < num__overlays; i++) {
        OverlayInfoStruct( );
    }
}
```

In order to support a case where an overlay position or rendering property, and so on, of an overlay media changes in time, the overlay metadata may be stored in a separate track and may then be delivered. The corresponding overlay media metadata track may include one or more samples, and each sample may include one or more overlay metadata. Each sample may include one or more OverlayInfoStruct.

An overlay media track may be indicated by using a TrackReferenceTypeBox of an overlay metadata track. More specifically, by allocated ‘cdsc’ as a reference type value, and by indicating one or more overlay media track identifiers or track group identifiers (a case where the overlay media is delivered via one or more tracks) to track_IDs, an overlay media track that is associated with the overlay metadata may be indicated.

Figure 34:
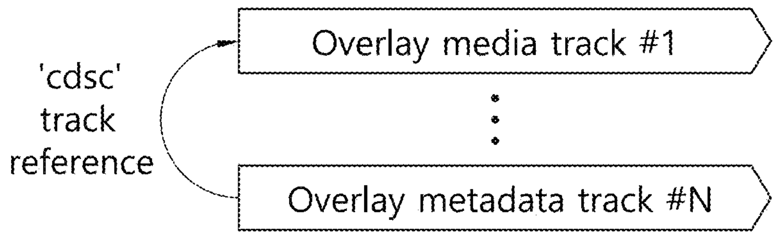
FIG. 34 shows an example of a dynamic overlay metadata track and overlay media track link signaling.

FIG. 34 shows an example of a dynamic overlay metadata track and overlay media track link signaling.

Meanwhile, the overlay metadata may also be signaled on the overlay media track by using the method shown below in FIG. 35.

Figure 35:
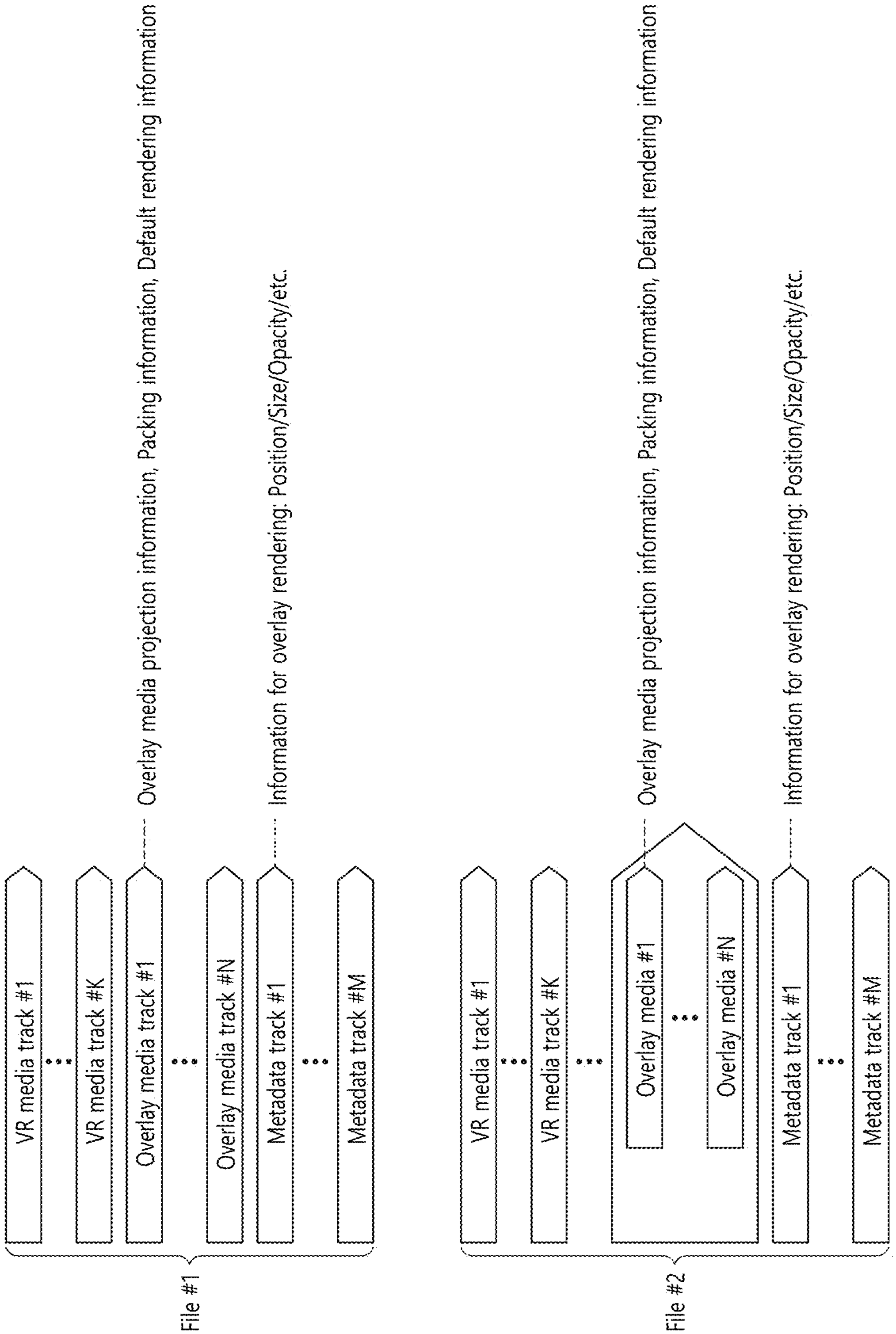
FIG. 35 shows an example of overlay metadata signaling on an overlay media track.

FIG. 35 shows an example of overlay metadata signaling on an overlay media track.

Referring to FIG. 35, OverlayConfigBox may be included in a sample entry of the overlay media track. Accordingly, the corresponding media track may include an overlay media, and overlay media related metadata being included in the track may be signaled.

In this case, the overlay related metadata may include the information shown below in the following table.

TABLE 16

```
class OverlayConfigBox extends FullBox(‘cvcf’, 0, 0) {
      unsigned int(8) num__overlays;
      OverlayMediaPackingStruct(num__overlays)
      for (i=0;i< num overlays;i++) {
            OverlayInfoStruct( );
      }
}
```

Herein, num_overlay may indicate a number of overlay media being included in each sample of the overlay media track or a maximum number of overlay media being included in a sample.

OverlayMediaPackingStruct( ) specifies projection and packing information of an overlay media.

OverlayInfoStruct( ) may include the overlay metadata that is proposed above. This may be applied to an overlay media being included in a sample of a track.

An overlay media track may include SampleToGroupBox having a grouping_type value of ‘ovgr’.

The SampleToGroupBox may indicate samples to which the same overlay metadata is to be applied among the samples included in the corresponding track.

In case a SampleToGroupBox having a grouping type value of ‘ovgr’ exists in the corresponding track, SampleGroupDescriptionBox having a grouping_type value of ‘ovgr’ may exist and the following information that is commonly applied to the corresponding samples may be included. A sample group entry (hereinafter referred to as OverlayGroupEntry) having a grouping_type value of ‘ovgr’ may be defined as shown below.

TABLE 17

```
class OverlayGroupEntry( ) extends
SampleGroupDescriptionEntry(’ovmm’) {
      OverlayInfoStruct( );
}
```

Herein, OverlayInfoStruct( ) may include overlay metadata that is to be applied to samples included in the group.

The overlay media track may include the OverlayConfigBox in a sample entry and, at the same time, overlay media track may also include SampleToGroupBox and OverlayGroupEntry( ) each having a grouping_type value of ‘ovgr’. In this case, overlay metadata being included the overlay media samples being associated with the OverlayGroupEntry( ) may be applied.

Figure 36:
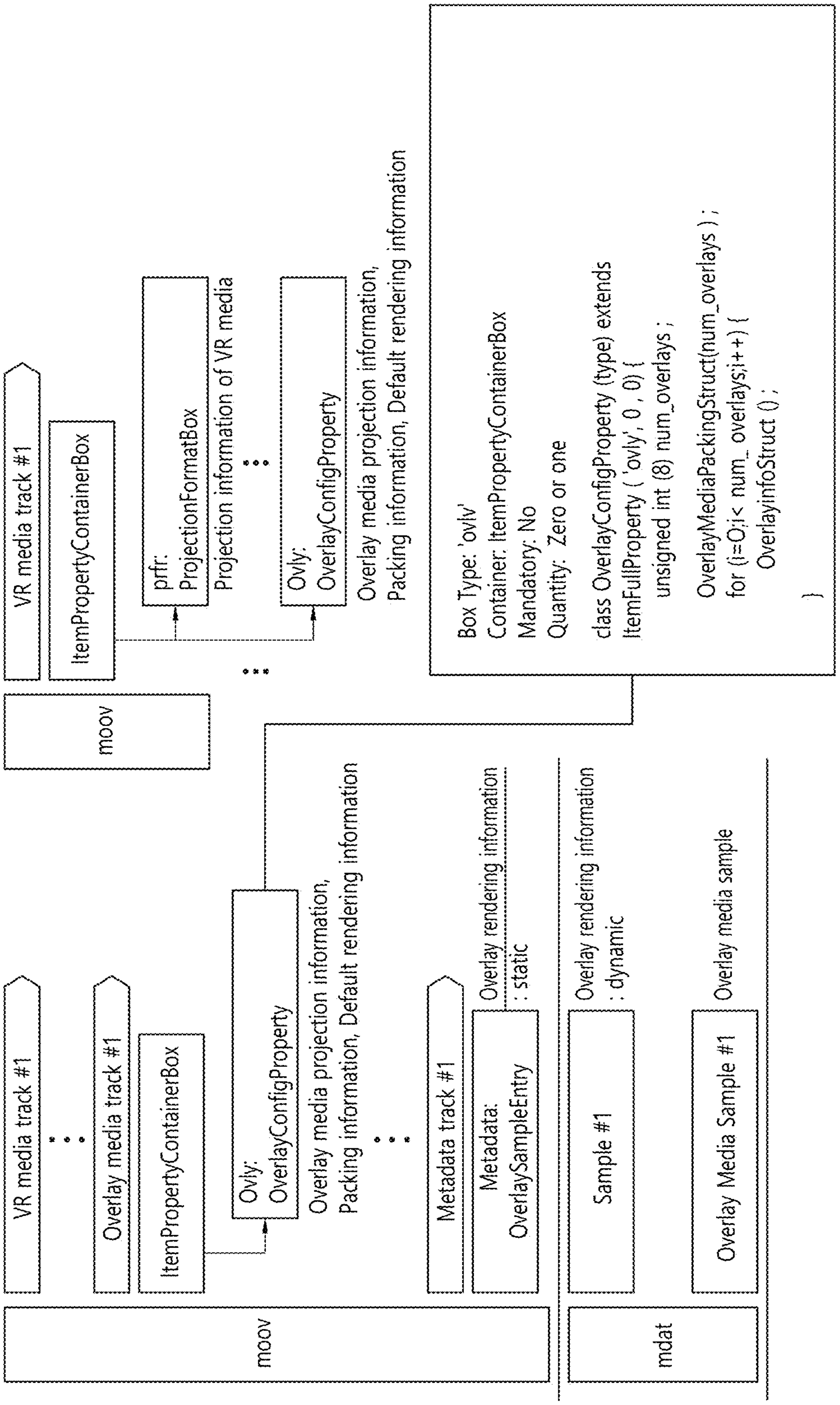
FIG. 36 and FIG. 37 show examples of overlay media packing, projection and default rendering signaling.
Figure 37:
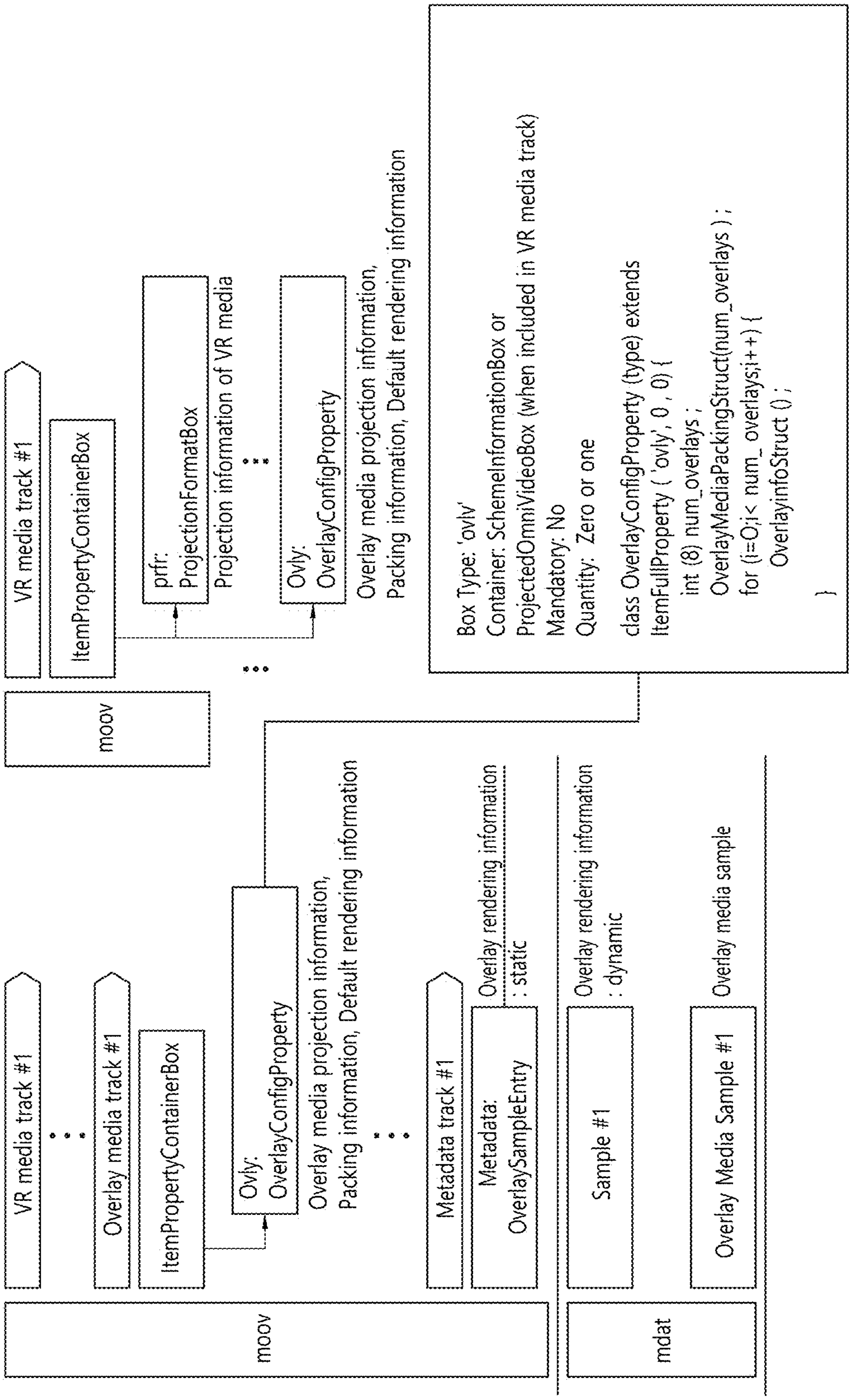

Alternatively, in order to specify overlay default rendering information along with the projection and packing information within the overlay media track, the delivery method may be changed to a method of defining the num_overlay, which corresponds to the number of overlays existing in the track, inside the OverlayConfigProperty (e.g., FIG. 36) or OverlayConfigBox (e.g., FIG. 37) and then delivering it as a parameter, and then OverlayInfoStruct( ) may be added. FIG. 36 and FIG. 37 show examples of overlay media packing, projection and default rendering signaling. FIG. 36 shows a case where the overlay media track corresponds to an image, and FIG. 37 shows a case where the overlay media track corresponds to a video.

OverlayMediaPackingStruct of FIG. 36 and FIG. 37 may, for example, include information as shown below in the following table.

TABLE 18

```
aligned(8) class OverlayMediaPackingStruct(num__overlays) {
      unsigned int(5) num__regions;
      for(i = 0; i < num__regions; i++) {
            unsigne int(8) overlay__region__id[i];
            unsigned int(16) overlay__region__width[i];
            unsigned int(16) overlay__region__height[i];
            unsigned int(16) overlay__region__top[i];
            unsigned int(16) overlay__region__left[i];
      }
      for (i = 0; i < num__overlays; i++) {
            unsigned int( 6) overlay__source__id[i] ;
            unsigned int(5) projection__type[i];
            unsigned int(3) packing__type;
            unsigned int(8) overlay__region__id[i];
            if(packing type != 0) {
                  unsigned int(1) guard__band__flag[i];
                  if (packing type == 1)
                              TextureAtlasPacking(i);
                  else if (packing__type == 2)
                        RectRegionPacking(i);
                  else if (packing__type == 3)
                        PolygonRegionPacking(i);
                  if (guard__band__flag[i])
                        GaurdBand(i);
            }
      }
}
```

Additionally, overlay related metadata may include gaze information. For example, the gaze information may be included as shown below in the following table.

TABLE 19

```
class GraphicsSampleEntry( ) extends SampleEntry (‘graf’) {
      string   namespace;
      string   schema__location;           // optional
      string   auxiliary__mime__types;     // optional, required if auxiliary
                                           resources are present
      BitRateBox ( );                      // optional
      GraphicConfigBox( );                 // optional
}
class GraphicConfigBox extends FullBox('grcb', version = 0, flags) {
      unsigned int(8) display__mode;
      unsigned int(1) stereoscopic__flag;
      bit(7) reserved = 0;
      if(display__mode==1){ // fixed position on the sphere
            ...
      }
      else if(display__mode==0 || display__mode==2 ||
      display__mode==3){// HMD, viewport, or gaze
            unsigned int(1) window__flag;
            bit(7) reserved = 0;
            if(window__flag==1){
                  ...
            }
            if(display__mode==3){// gaze
                  signed int(32) x__offset;
                  signed int(32) y__offset;
                  singed int(32) z__offset;
            ...
}
```

Herein, for example, in case an equipment capable of performing eye-gaze tracking is used, display_mode=3 may indicate that an overlay is positioned as an offset near the area gazed by the pupil of the eye. The gaze information may include at least one of an x_offset field, a y_offset field, and a z_offset field for indicating a relative overlay rendering position based on, for example, the gaze position. Values of the x_offset field, the y_offset field, and the z_offset field may indicate angles and may also indicate percentages. For example, in case the values of the x_offset field, the y_offset field, and the z_offset field indicate angles, the overlay may be positioned on a sphere. As another example, in case the values of the x_offset field, the y_offset field, and the z_offset field indicate percentages, the overlay may be positioned on a viewport.

Gaze-based (overlay) image rendering may be performed based on the gaze information. The gaze-based image rendering corresponds to extracting gaze points (x, y, z) of the actual user and rendering an image corresponding to the gaze based on the extracted gaze points. Similarly, gaze-based graphic (overlay) rendering, which is mentioned in the present invention, corresponds to determining a gaze point of the user based on the viewport of the user and then rendering the graphic (overlay image). In order to acquire the information on the viewport and gaze of the actual user, a position related sensor value of the HMD shall be received and, then, overlay of the graphic (overlay image) shall be performed based on the received sensor value. More specifically, the graphic (overlay image) may be rendered to a corresponding point by using the gaze point within the actual viewport of the user. Therefore, a graphic rendering region having its start point (or in some cases a mid-point of the graphic region) set to (x+x_offset, y+y_offset, z+z_offset) based on the gaze point (x, y, z), which is calculated from the sensor, may be generated. If the graphic is intended to be positioned at the point where the gaze point is located, the offset value for each of x, y, and z may be delivered as 0. In this case, however, since the gaze information changes continuously, (in order to read a text, and so on) instead of continuously using the sensor value, a threshold value for the gaze position value may be set, and, the graphic may be rendered to a different position only when the movement of the gaze is out-of-range of the threshold value. Alternatively, the graphic region may be set to be changed through the movement of the gaze point, only in a case where a predetermined period of time is passed.

For reference, the gaze points (x, y, z) may be calculated by using the following information.

TABLE 20

| |
|---|
| x-coordinate of helmet position |
| y-coordinate of helmet position |
| z-coordinate of helmet position |
| x-coordinate of viewer's left-eye local coordinates |
| y-coordinate of viewer's left-eye local coordinates |

TABLE 20-continued

| |
|---|
| x-coordinate of viewer's right-eye local coordinates |
| y-coordinate of viewer's right-eye local coordinates |
| focal distance along the viewer-local z-axis |

Figure 38:
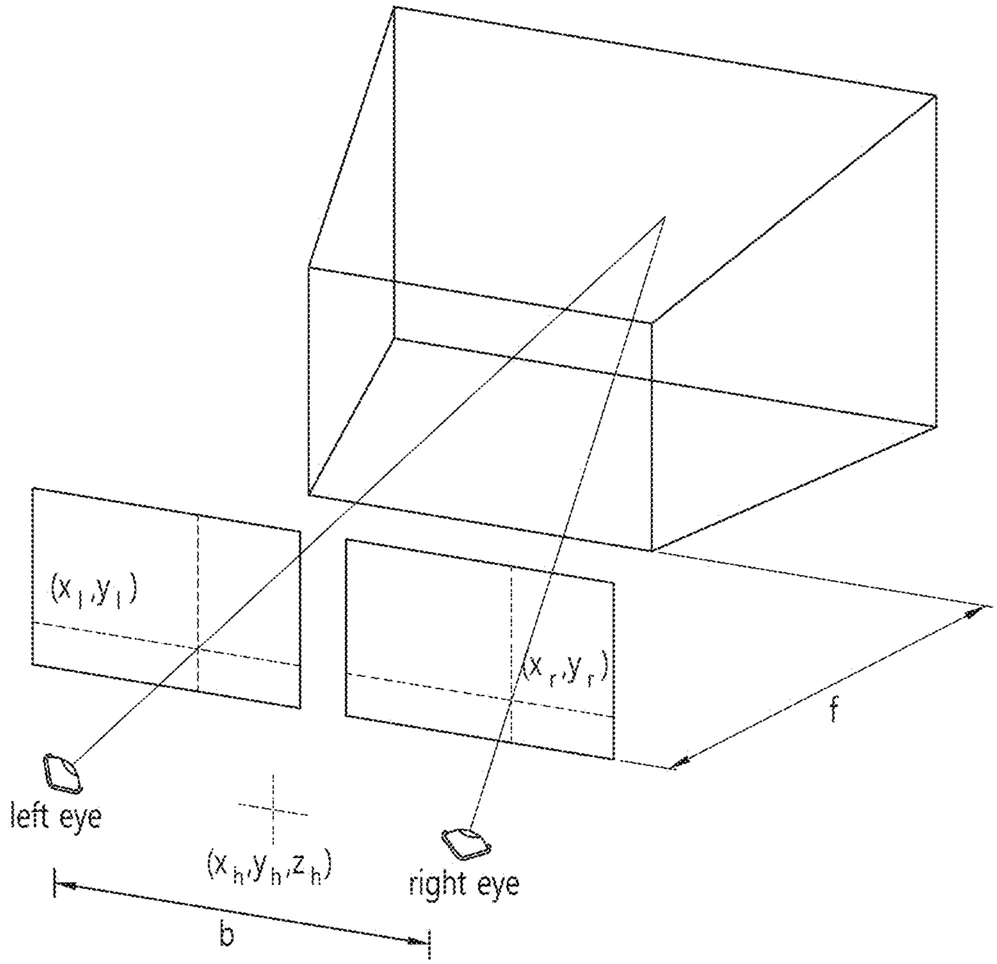
FIG. 38 is an example of a gaze point calculation.

FIG. 38 is an example of a gaze point calculation. Based on the information disclosed in Table 19, a gaze point may be calculated as shown below in FIG. 38.

In order to perform graphic overlay based on the HMD, the viewport, and the gaze, information on a screen being actually displayed to the corresponding HMD, the actual viewport, the actual gaze, and so on, shall be known. However, it is difficult to determine in advance where the user will actually gaze (or look). Additionally, it is also difficult to determine information on whether the corresponding graphic is created based on the entire 360 video, or whether the corresponding graphic is created based on only part of the 360 video. Therefore, information on the size/position of the graphic as well as information indicating the window based on which the graphic is created are needed. If the actual viewport is viewing an image that is smaller than the size of the reference window, the size of the existing graphic or position information may be appropriately reduced in accordance with the proportional ratio, and, in some cases, the position may be fixed, and the size may be reduced. Alternatively, regardless of the created window, the graphic size or position may be fixed. More specifically, since diverse cases may occur, information on the window or signaling information indicating whether or not the position or size is to be changed may be included. More specifically, depending upon the window related information that is included in the PlaneRegionConfigBox( ) and the size of the actual window being displayed on the actual viewport/gaze/HMD, the size or position of the graphic region may be fixed or enlarged or reduced in accordance with the proportional ratio. Herein, as described above, the graphic may correspond to an overlay media or an overlay image.

The above-described overlay related metadata according to the present invention may also be signaled based on DASH. When a DASH based service is provided, the fields included in the GraphicConfigBox( ) as defined above, may be included as its attribute in at least one of a Period element, an AdaptationSet element, a Representation element, a SubRepresentation element, a ContentComponent element, a SegmentBase element, an EssentialProperty element, a SupplementaryProperty element, an Accessibility element, and a Subset element in the MPD. In the following example, Essential Property and/or Supplemental Property descriptors include only the display_mode and stereoscopic_flag.

TABLE 21

| |
|---|
| The Essential Property and/or Supplemental Property descriptors with the @schemeIdURI equal to "urn:mpeg:dash:graphic:2017" and an @value attribute shall be used to signal the metadata associated to graphic data. The @value syntax shall be as described in the ABNF below. |
| @value = "display-mode" ":" display-mode "," stereoscopic-flag" ":" stereoscopic-flag |
| display-mode = (%d1-%d64) |
| stereoscopic-flag = BIT; default value 0 |

In an Adaptation set, graphic overlay information may be included as auxiliary or accessibility information, and the Representation may notify that graphic data is included. The exemplary embodiment is as shown below. At this point, @mimeType(ex: application/bitmap) and Role descriptor (e.g., @schemeIdUri="urn:mpeg:dash:role:2011" and @value="graphic"), and so on, may be included. In case a codec parameter for the Graphic is defined, this may be additionally included.

TABLE 22

```
<AdaptationSet contentType="graphic" mimeType="application/bitmap">
  <EssentialProperty schemeIdUri="urn:mpeg:dash:graphic:2017"
  value="2, 0"/>
  <Role schemeIdUri="urn:mpeg:dash:role:2011" value="graphic"/>
  <Representation id="graphic" bandwidth="1000">
    ......
  </Representation>
</AdaptationSet>
```

Overlay rendering of an overlay may be performed to a 360 video/image based on the above-described overlay metadata.

Figure 39:
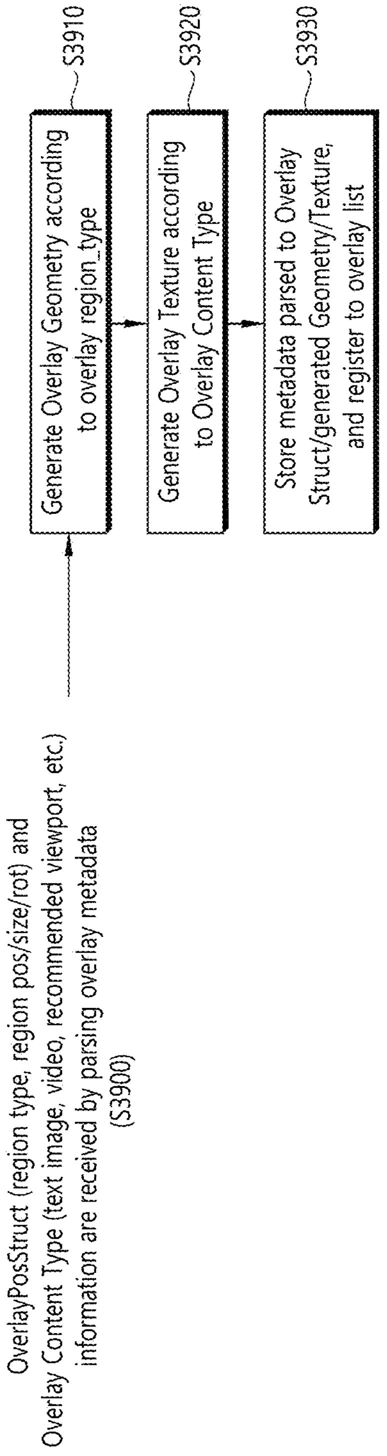
FIG. 39 shows an example of an overlay rendering procedure.

FIG. 39 shows an example of an overlay rendering procedure.

The 360 video receiving device parses overlay metadata and acquires overlay related information (S3900). More specifically, for example, the 360 video receiving device may acquire OverlayPosStruct (region type, region position/size/rotation) and information related to the overlay content type (text, image, video, Recommended Viewport, and so on).

The 360 video receiving device generates an overlay geometry according to the region_type (S3910). The region_type corresponds to information indicating an overlay_type (or rendering type), as described above. A detailed example of step S3910 will be described in detail with reference to FIG. 40.

The 360 video receiving device generates an overlay texture according to the overlay contents type (S3920). The overlay texture may include a text, an image/video, and a recommended viewport. A detailed example of step S3920 will be described in detail with reference to FIG. 41.

The 360 video receiving device may store and render/display the generated overlay geometry/texture. For this, the 360 video receiving device may store the metadata parsed in the overlay Struct and the generated overlay geometry/texture and may register the stored geometry/texture in an overlay list (S3930).

Figure 40:
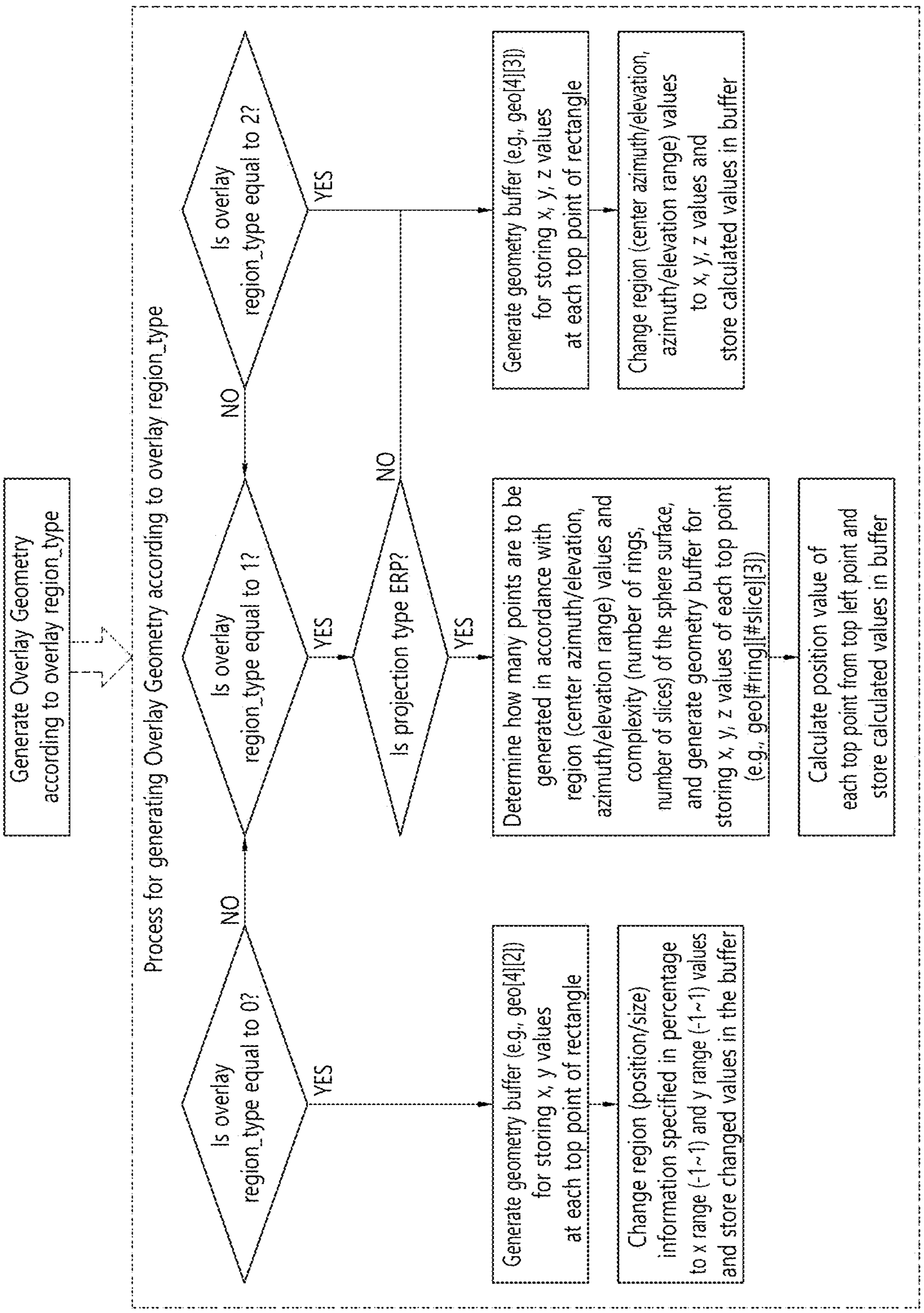
FIG. 40 shows an exemplary overlay geometry generation according to an overlay type.

FIG. 40 shows an exemplary overlay geometry generation according to an overlay type.

Referring to FIG. 40, in case the overlay type indicates an overlay on the current viewport (e.g., in case the overlay region_type is equal to 0), the 360 video receiving device generates a geometry buffer (e.g., geo[4][2]) for storing x, y values at each top point of the rectangle. The 360 video receiving device may change the overlay region (position/size) information, which is specified in percentage, to x range (−1 to 1) and y range (−1 to 1) values and may then store the changed values in the buffer.

In case the overlay type indicates an overlay on the 360 surface (e.g., in case the overlay region_type is equal to 1), the 360 video receiving device may determine whether or not the projection type is an ERP, and, in case the projection type is the ERP, the 360 video receiving device may determine how many points are to be generated in accordance with the region information (center azimuth/elevation, azimuth/elevation range) values and the complexity (number of rings, number of slices) of the sphere surface. Thereafter, the 360 video receiving device generates a geometry buffer for storing the x, y, z values of each point (e.g., geo[#ring][#slice][3]).

In case the overlay type indicates an overlay in a 3D space inside the 360 surface (e.g., in case the overlay region_type is equal to 2), or in case the overlay type indicates an overlay on the 360 surface and the projection type is not an ERP, the 360 video receiving device generates a geometry buffer for storing the x, y values at each top point of the rectangle (e.g., geo[4][2]). The 360 video receiving device changes region information (center azimuth/elevation, azimuth/elevation range) values to x, y, z coordinates values and may then store the changed values in the buffer.

Figure 41:
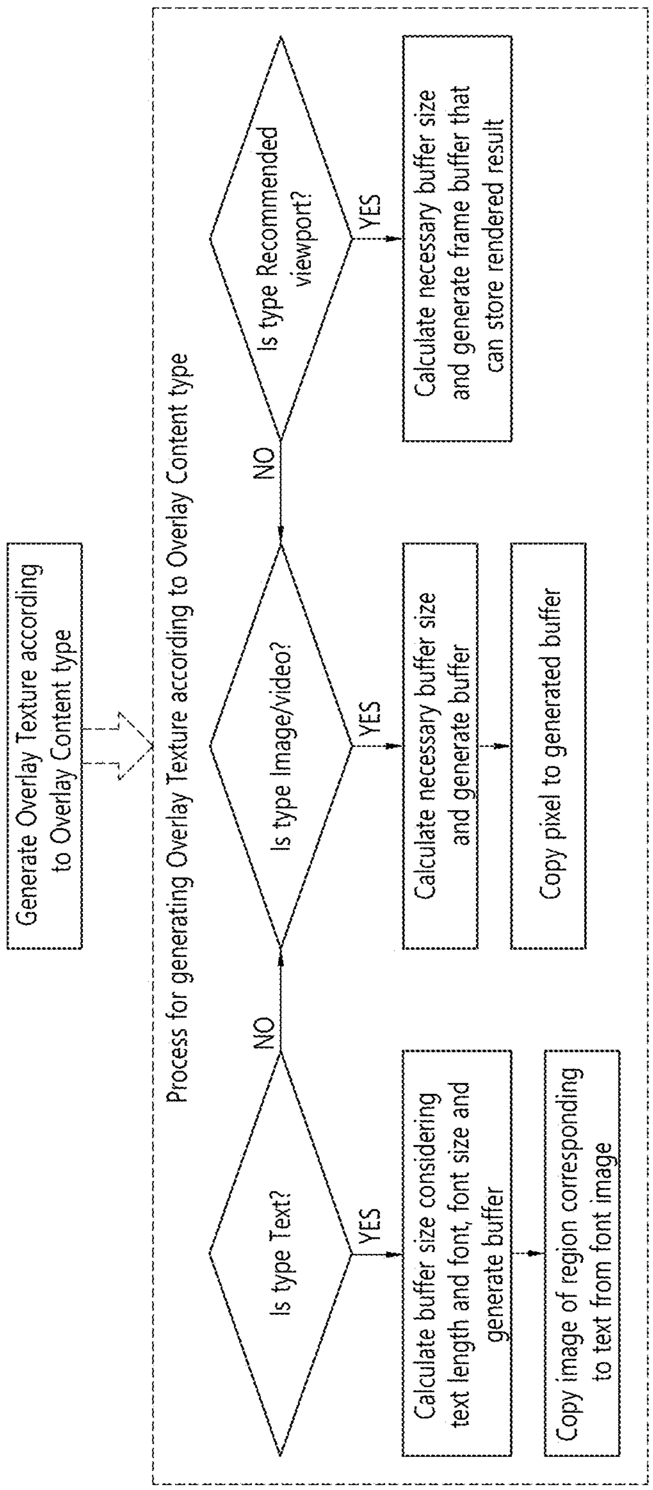
FIG. 41 shows an exemplary overlay texture generation according to an overlay content type.

FIG. 41 shows an exemplary overlay texture generation according to an overlay content type.

Referring to FIG. 41, in case the overlay content type indicates a text, the 360 video receiving device calculates a texture buffer size while considering a text length and font, and a font size and generates a buffer. The 360 video receiving device may copy an image of a region corresponding the text from a font image to the buffer.

In case the overlay content type indicates an image/video, the 360 video receiving device calculates a necessary buffer size and generates a buffer. The 360 video receiving device may copy pixels related to the image/video to the generated buffer.

In case the overlay content type indicates a recommended viewport, the 360 video receiving device calculates a necessary buffer size and generates a frame buffer that can store the rendered result.

Figure 42:
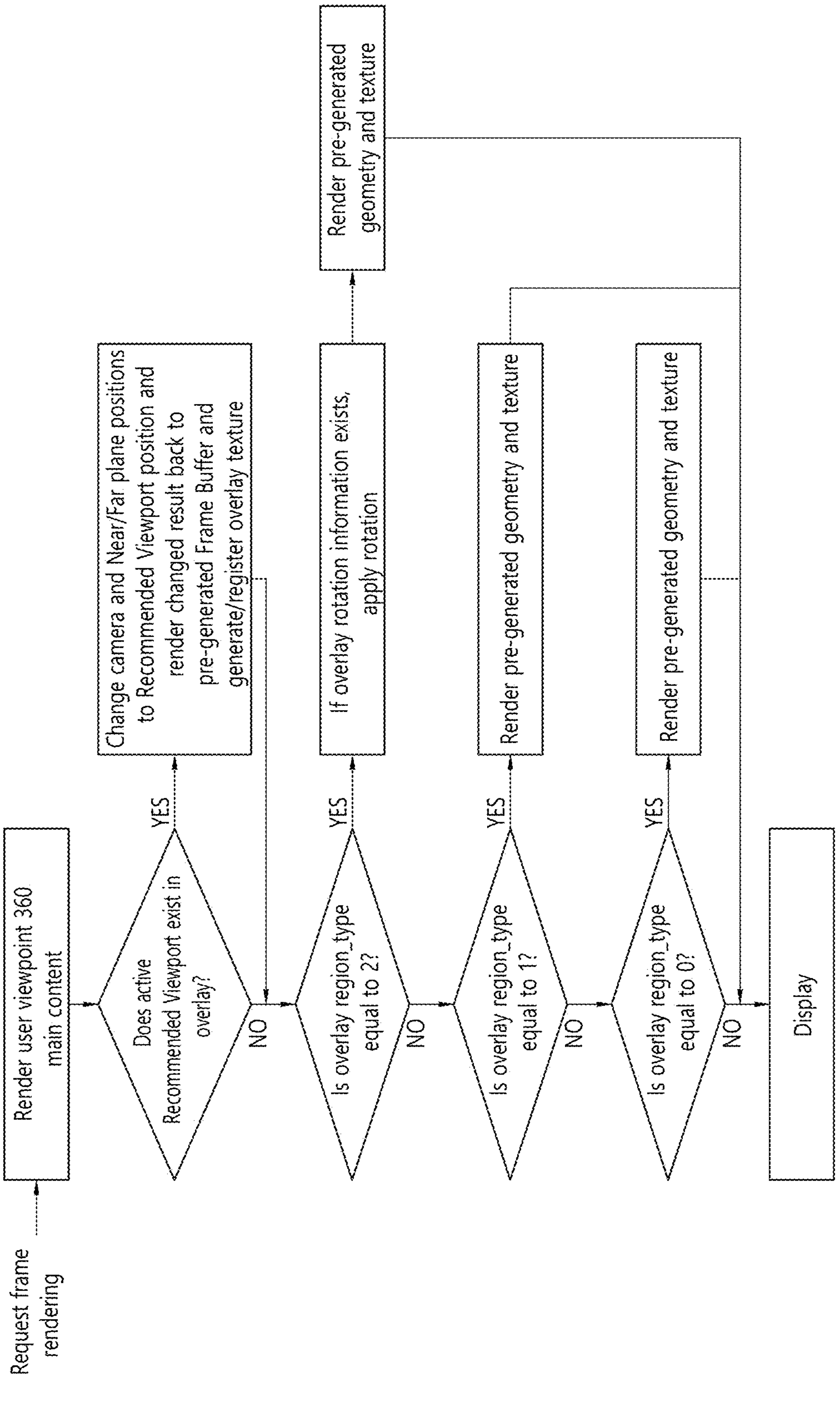
FIG. 42 shows an overlay rendering example.

FIG. 42 shows an overlay rendering example.

In case a frame rendering request exists, the 360 video receiving device renders a user viewpoint 360 main content.

The 360 video receiving device determines whether or not a recommended viewport is activated and exists among the overlay. In case the recommended viewport is activated and exists, the 360 video receiving device may change the camera and Near/Far plane positions to the recommended viewport position and may then perform rendering once again to the pre-generated frame buffer, thereby being capable of generating/registering the overlay texture.

In case the overlay type indicates an overlay in a 3D space inside the 360 surface (e.g., in case the overlay region_type is equal to 2), the 360 video receiving device applies a rotation in case rotation information exists in the overlay, and may render the overlay to the pre-generated geometry and texture.

In case the overlay type indicates an overlay on the 360 surface (e.g., in case the overlay region_type is equal to 1), the 360 video receiving device may render the overlay to the pre-generated geometry and texture.

In case the overlay type indicates an overlay on the current viewport (e.g., in case the overlay region_type is equal to 0), the 360 video receiving device may render the overlay to the pre-generated geometry and texture.

According to the above-described present invention, an overlay texture (overlay media) may be efficiently rendered to the 360 content to a wanted position and size based on the overlay type, and the necessary information may be efficiently provided to the user.

Figure 43:
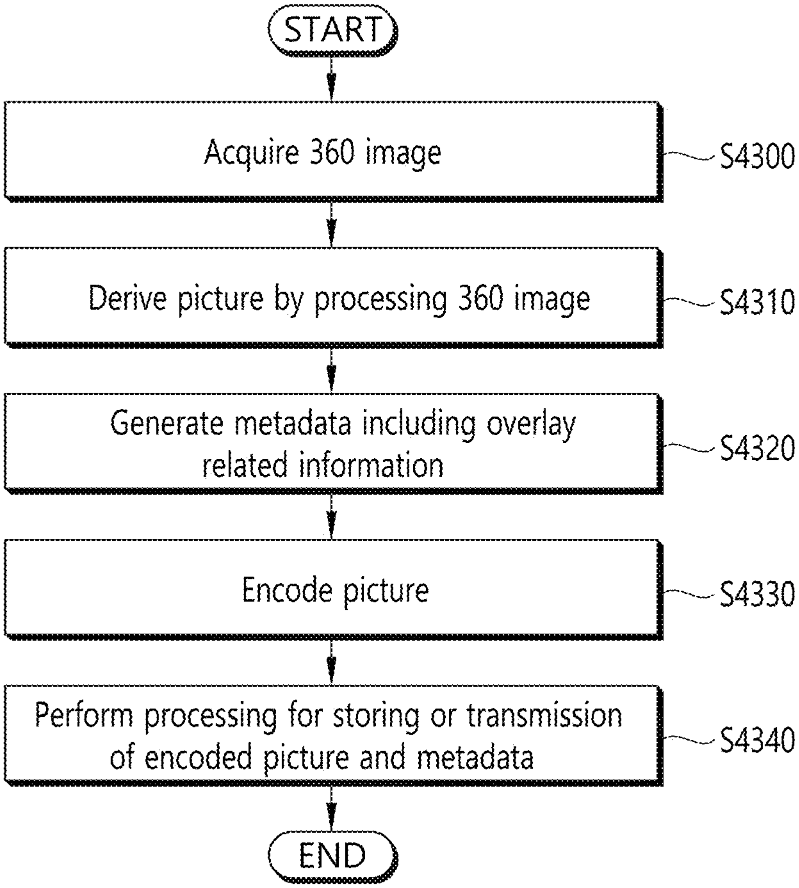
FIG. 43 shows a general view of a 360 video/image data processing method performed by a 360 video transmitting device according to the present invention.

FIG. 43 shows a general view of a 360 video/image data processing method performed by a 360 video transmitting device according to the present invention. The method shown in FIG. 43 may be performed by the 360 video transmitting device, which is disclosed in FIG. 5 or FIG. 16.

Referring to FIG. 43, the 360 video transmitting device acquires 360 video/image (S4300). The 360 video/image may correspond to a video/image that is captured by at least one camera. Alternatively, part or all of the 360 video/image may correspond to a virtual video/image being generated by a computer program, and so on. The 360 image may correspond to an independent still image or part of a 360 video.

The 360 video transmitting device processes the 360 video/image and derives a picture (S4310). The 360 video transmitting device may derive the 2D-based picture based on the above-described diverse projection formats, region-wise packing procedure, and so on. The derived picture may correspond to a projected picture or may correspond to a packed picture (in case region-wise packing procedure is applied).

The 360 video transmitting device generates 360 video/image related metadata (S4320). Herein, the metadata may include the fields that are described above in this specification. The fields may be included in a box having various levels or may be included as data in a separate track within a file. For example, the metadata may include part or all of the fields/information, which are described above in Table 1 to Table 19. For example, the metadata may include the above-described overlay related metadata (including information/fields). The overlay related metadata may include at least one of information on a region of the above-described overlay, information on a (rendering) type of the overlay, information on whether or not stereoscopic application is performed, information on a rotation of the overlay, distance information indicating a distance from a center of the unit sphere, information indicating a depth of the overlay (overlay region), information on an (layering) order of the overlay, target plug information, information on a number of overlays, overlay rendering property information, and/or gaze information, and so on. A region of the overlay may also be referred to as an overlay region.

For example, the overlay related metadata may include information on the overlay region. The overlay region may indicate a region of a layer or plane in which the overlay is positioned.

For example, the information on the overlay region may be indicated based on azimuth and elevation. For example, the information on the overlay region may include at least one of information on a position of the overlay and information on a size of the overlay. And, the information of the position of the overlay may indicate at least one of x coordinate, y coordinate, and z coordinate of a center point of the overlay within a 3D coordinate space to which the decoded picture is rendered. And, the information on the size of the overlay may indicate at least one of a width and a height of the overlay. The information on the overlay region may include the above-described sphere_region_flag field, centre_azimuth field, centre_elevation field, and/or centre_tilt field. Alternatively, the information on the overlay region may include at least one of the above-described centre_x field, centre_y field, centre_z field, width field, and/or height field.

For example, the overlay related metadata may include information on the overlay type. The information on the overlay type may indicate an overlay type having the overlay type rendered to a 3D space, an overlay type having the overlay type rendered on a viewport, or an overlay type having the overlay type rendered on a sphere surface.

For example, the information on the overlay type may indicate an overlay type having the overlay type rendered to a 3D space. In this case, the information on the overlay type may indicate an overlay region based on azimuth and elevation. In this case, the information on the overlay region may include at least one of the above-described sphere_region_flag field, centre_azimuth field, centre_elevation field, and/or centre_tilt field. Additionally, in case the information on the overlay type indicates the overlay type being rendered to a 3D space, the overlay related metadata may further include information on an overlay rotation. The information on the overlay rotation may indicate at least one of a yaw value, a pitch value, and a roll value related to the overlay rotation. Additionally, in case the information on the overlay type indicates the overlay type being rendered to a 3D space, the overlay related metadata may further include flag information indicating whether or not the overlay region or plane is rotated based on a viewing orientation. By using this flag information, an overlay layer/plane within the 3D space is rotated in accordance with an angle of the user's view, thereby allowing the user to face into an overlay layer/plane. The flag information may include the above-described billboards_flag field. Additionally, in case the information on the overlay type indicates the overlay type being rendered to a 3D space, the overlay related metadata may further include distance information indicating a distance from the center of a unit sphere.

As another example, in case the information on the overlay type indicates an overlay type being rendered on a viewport, or in case the information on the overlay type indicates an overlay type being rendered on a sphere surface, the overlay related metadata may further include information indicating a depth of the region of the overlay. The information indicating a depth of the region of the overlay may indicate a rendering priority of the overlay. For example, in case multiple overlays overlay, for the overlaying region, based on the information indicating the depth of the region of the overlay, among the plurality of overlays, an overlay being associated with the lower depth value may be rendered. The information indicating the depth of the region of the overlay may include the above-described depth field. Additionally, the overlay related metadata may further include information on a (layering) order of the overlay. For example, in case the information on the overlay type indicates an overlay type being rendered on a viewport, or in case the information on the overlay type indicates an overlay type being rendered on a sphere surface, in case multiple overlays overlay, the information on the (layering) order of the overlay may indicate a priority between the multiple overlaying overlays. In other words, the overlay related metadata may include information indicating an order between overlays each having an overlay type being rendered on a viewport.

For example, the overlay related metadata may further include target flag information indicating whether or not the overlay is associated with a reference point. An image, text, sound, or supplementary information indicated by the reference point may be provided through the overlay, or an image corresponding to a position indicated by the reference point may be rendered. The target flag information may include the above-described target_flag field.

For example, the overlay related metadata may include information on a number of overlays. In this case, overlay related information corresponding to each of the overlays may be included in the overlay related metadata.

Additionally, for example, the overlay related metadata may include overlay rendering property information. The overlay rendering property information may include at least one of opacity, focus effect, and/or blending option of a plane of the overlay.

The overlay related metadata may be included in an overlay timed metadata track. Alternatively, the overlay related metadata may be configured based on time information within an overlay track and sample.

The 360 video transmitting device encodes the derived picture (S4330). The 360 video transmitting device may encode the 2D picture and output the encoded 2D picture in a bitstream format.

The 360 video transmitting device may encode and output the overlay texture (media) in accordance with a texture (media) type that is to be overlaid. In this case, the encoded overlay texture (media) may be included in 360 image/video data, which will be described in more detail later on.

Alternatively, the texture (media) type that is to be overlaid may be pre-stored in a 360 video receiving device, or may be separately transmitted through the network.

The 360 video transmitting device performs processing for storing or transmitting the encoded picture and the metadata (S4340). The 360 video transmitting device may generate 360 image/video data based on the data related to the encoded picture and/or the metadata. In case of encoding a series of pictures corresponding to a series of images, the 360 video data including the encoded pictures may be generated.

The 360 video transmitting device may encapsulate the data related to the encoded picture(s) and/or the metadata in a file format, and the 360 video transmitting device may encapsulate the encoded 360 video data and/or the metadata in a file format, such as ISOBMFF, CFF, and so on, in order to store or transmit the encoded 360 video data and/or the metadata, or the 360 video transmitting device may process the encoded 360 video data and/or the metadata in a miscellaneous DASH segment format. The 360 video transmitting device may include the metadata in a file format. For example, the metadata may be included in a box having various levels within an ISOBMFF file format or may be included as data in a separate track within a file.

As described above, the overlay related metadata may be included in an overlay timed metadata track. Alternatively, the overlay related metadata may be configured based on time information within an overlay track and sample.

Additionally, the 360 video transmitting device may encapsulate the metadata itself to a file. The 360 video transmitting device may perform processing for transmission on the 360 video data being encapsulated according to the file format. The 360 video transmitting device may process the 360 video data according to a random (or any) transmission protocol. The processing for transmission may include processing for delivery through a broadcast network, or processing for delivery through a communication network, such as broadband, and so on. Additionally, the processing for transmission may also be performed on the metadata. The 360 video transmitting device may transmit the transmission-processed 360 image/video data (including the metadata) through the broadcast network and/or broadband.

Figure 44:
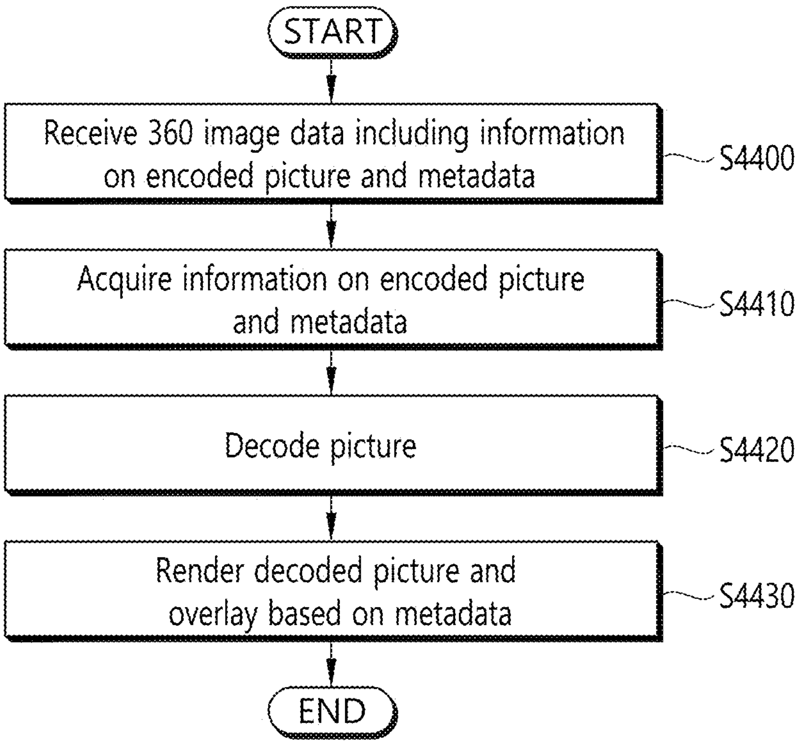
FIG. 44 shows a general view of a 360 video/image data processing method performed by a 360 video receiving device according to the present invention.

FIG. 44 shows a general view of a 360 video/image data processing method performed by a 360 video receiving device according to the present invention. The method shown in FIG. 44 may be performed by the 360 video receiving device, which is disclosed in FIG. 6 or FIG. 17.

Referring to FIG. 44, the 360 video receiving device receives a 360 image/video data (signal) (S4400). The 360 video receiving device may receive the 360 image/video data that is signaled from the 360 video transmitting device through a broadcast network. The 360 image/video data may include information on the encoded picture(s) of the 360 image/video and the metadata. Additionally, the 360 video receiving device may receive the 360 image/video data through a communication network, such as a broadband, and so on, or through a storage medium.

The 360 video receiving device acquires the information on the encoded picture(s) and the metadata (S4410). The 360 video receiving device may acquire the information on the encoded picture(s) and the metadata through a file/segment decapsulation procedure from the 360 image/video data.

The metadata may include the fields that are described above in this specification. The fields may be included in a box having various levels or may be included as data in a separate track within a file. For example, the metadata may include part or all of the fields/information, which are described above in Table 1 to Table 19. For example, the metadata may include the above-described overlay related metadata (including information/fields). The overlay related metadata may include at least one of information on a region of the above-described overlay, information on a (rendering) type of the overlay, information on whether or not stereoscopic application is performed, information on a rotation of the overlay, distance information indicating a distance from a center of the unit sphere, information indicating a depth of the overlay (overlay region), information on an (layering) order of the overlay, target plug information, information on a number of overlays, overlay rendering property information, and/or gaze information, and so on.

For example, the overlay related metadata may include information on the overlay region. The overlay region may indicate a region of a layer or plane in which the overlay is positioned.

For example, the information on the overlay region may be indicated based on azimuth and elevation. For example, the information on the overlay region may include at least one of information on a position of the overlay and information on a size of the overlay. And, the information of the position of the overlay may indicate at least one of x coordinate, y coordinate, and z coordinate of a center point of the overlay within a 3D coordinate space to which the decoded picture is rendered. And, the information on the size of the overlay may indicate at least one of a width and a height of the overlay. The information on the overlay region may include the above-described sphere_region_flag field, centre_azimuth field, centre_elevation field, and/or centre_tilt field. Alternatively, the information on the overlay region may include at least one of the above-described centre_x field, centre_y field, centre_z field, width field, and/or height field.

For example, the overlay related metadata may include information on the overlay type. The information on the overlay type may indicate an overlay type having the overlay type rendered to a 3D space, an overlay type having the overlay type rendered on a viewport, or an overlay type having the overlay type rendered on a sphere surface.

For example, the information on the overlay type may indicate an overlay type having the overlay type rendered to a 3D space. In this case, the information on the overlay type may indicate an overlay region based on azimuth and elevation. In this case, the information on the overlay region may include at least one of the above-described sphere_region_flag field, centre_azimuth field, centre_elevation field, and/or centre_tilt field. Additionally, in case the information on the overlay type indicates the overlay type being rendered to a 3D space, the overlay related metadata may further include information on an overlay rotation. The information on the overlay rotation may indicate at least one of a yaw value, a pitch value, and a roll value related to the overlay rotation. Additionally, in case the information on the overlay type indicates the overlay type being rendered to a 3D space, the overlay related metadata may further include flag information indicating whether or not the overlay region or plane is rotated based on a viewing orientation. By using this flag information, an overlay layer/plane within the 3D space is rotated in accordance with an angle of the user's view, thereby allowing the user to face into an overlay layer/plane. The flag information may include the above-described billboards_flag field. Additionally, in case the information on the overlay type indicates the overlay type being rendered to a 3D space, the overlay related metadata may further include distance information indicating a distance from the center of a unit sphere.

As another example, in case the information on the overlay type indicates an overlay type being rendered on a viewport, or in case the information on the overlay type indicates an overlay type being rendered on a sphere surface, the overlay related metadata may further include information indicating a depth of the region of the overlay. The information indicating a depth of the region of the overlay may indicate a rendering priority of the overlay. For example, in case multiple overlays overlay, for the overlaying region, based on the information indicating the depth of the region of the overlay, among the plurality of overlays, an overlay being associated with the lower depth value may be rendered. The information indicating the depth of the region of the overlay may include the above-described depth field. Additionally, the overlay related metadata may further include information on a (layering) order of the overlay. For example, in case the information on the overlay type indicates an overlay type being rendered on a viewport, or in case the information on the overlay type indicates an overlay type being rendered on a sphere surface, in case multiple overlays overlay, the information on the (layering) order of the overlay may indicate a priority between the multiple overlaying overlays. In other words, the overlay related metadata may include information indicating an order between overlays each having an overlay type being rendered on a viewport.

For example, the overlay related metadata may further include target flag information indicating whether or not the overlay is associated with a reference point. An image, text, sound, or supplementary information indicated by the reference point may be provided through the overlay, or an image corresponding to a position indicated by the reference point may be rendered. The target flag information may include the above-described target flag field.

For example, the overlay related metadata may include information on a number of overlays. In this case, overlay related information corresponding to each of the overlays may be included in the overlay related metadata.

Additionally, for example, the overlay related metadata may include overlay rendering property information. The overlay rendering property information may include at least one of opacity, focus effect, and/or blending option of a plane of the overlay.

The overlay related metadata may be included in an overlay timed metadata track. Alternatively, the overlay related metadata may be configured based on time information within an overlay track and sample.

The 360 video receiving device decodes the encoded picture(s) based on information on the encoded picture (S4420). The decoded picture may correspond to a projected picture or may correspond to a packed picture (in case the region-wise packing process is applied).

The 360 video receiving device may decode the overlay texture (media) in accordance with the texture (media) type that is to be overlaid. In this case, the encoded overlay texture (media) may be included in the 360 image/video data.

Alternatively, the texture (media) type that is to be overlaid may be pre-stored in the 360 video receiving device, or may be separately received through the network.

In some cases, the 360 video receiving device may decode the picture based on the metadata. This may include, for example, a case where decoding is performed on part of the region in which a viewpoint is positioned within a picture, or a case where decoding of another specific picture corresponding to a position having a changed viewpoint or being linked to an overlay is required.

The 360 video receiving device renders the decoded picture and overlay based on the metadata (S4430). The 360 video receiving device may process and render the decoded picture and overlay based on the metadata. In this case, the decoded picture may be processed with procedures, such as reprojection, and so on, and may then be rendered to a 3D surface. In case of the overlay, the overlay may be rendered to a position on a viewport, a 3D surface, a 3D space, and so on, according to the above-described overlay type based on the metadata.

The above-described process steps may be omitted according to the exemplary embodiment or may be replaced by process steps performing similar/same operations.

The internal components of the apparatuses illustrated above may be processors executing successive processes stored in a memory or may be hardware components configured with other hardware. These components may be disposed inside or outside the apparatuses.

The foregoing modules may be omitted according to the embodiment or may be replaced by other modules for performing similar/equivalent operations.

Each of the foregoing parts, modules, or units may be a processor or a hardware part that executes successive processes stored in a memory (or storage unit). Each step described in the foregoing embodiments may be performed by a processor or hardware part. Each module/block/unit described in the foregoing embodiments may operate as a hardware/processor. Further, the methods proposed by the present invention may be executed as codes. These codes may be written in a processor-readable storage medium and may thus be read by a processor provided by an apparatus.

Although the foregoing embodiments illustrate the methods based on a flowchart having a series of steps or blocks, the present invention is not limited to the order of the steps or blocks. Some steps or blocks may occur simultaneously or in a different order from other steps or blocks as described above. Further, those skilled in the art will understand that the steps shown in the above flowcharts are not exclusive, that further steps may be included, or that one or more steps in the flowcharts may be deleted without affecting the scope of the present disclosure.

When the embodiments of the present invention are implemented in software, the foregoing methods may be implemented by modules (processes, functions, or the like) that perform the functions described above. Such modules may be stored in a memory and may be executed by a processor. The memory may be inside or outside the processor and may be connected to the processor using various well-known means. The processor may include an application-specific integrated circuit (ASIC), other chipsets, a logic circuit, and/or a data processing device. The memory may include a read-only memory (ROM), a random access memory (RAM), a flash memory, a memory card, a storage medium, and/or other storage devices.

What is claimed is:

1. A 360-degree video data processing method performed by a 360-degree video receiving device, the method comprising:

receiving 360-degree video data including encoded pictures;

acquiring metadata;

decoding pictures; and rendering the decoded pictures and an overlay based on the metadata, wherein:

the metadata includes overlay related metadata, the overlay related metadata includes distance information indicating a distance from a center of a unit sphere for representing the 360-degree video, wherein the distance is identical as a radius of the unit sphere, the overlay related metadata includes information of the overlay, the information of the overlay includes a rendering type of overlay in 3D space of the 360-degree video, the overlay related metadata includes flag information on a disparity, when a value of the flag information is equal to 1, the flag information indicates that the disparity is provided as a percentage value of the width of a display window for one view, and when the value of the flag information is equal to 0, the flag information indicates that the disparity is provided as a number of pixels, and the overlay is rendered based on the overlay related metadata.

2. The method of claim 1, wherein:

the overlay related metadata includes information on azimuth and elevation that indicates the azimuth and elevation angles of the center of the overlay region respectively.

3. The method of claim 1, wherein:

the overlay related metadata includes range information on azimuth and elevation which indicates an azimuth range and an elevation range through a center point of a sphere region.

4. The method of claim 3, wherein:

the azimuth range is in the range of 0 to $360*2^{16}$ and the elevation range is in the range of 0 to $180*2^{16}$.

5. The method of claim 1, wherein:

the overlay related metadata includes information on tilt which is in the range of $-180*2^{16}$ to $180*2^{16}-1$.

6. The method of claim 1, wherein:

the overlay related metadata includes percentage information on the disparity which indicates the disparity as a fraction of the width of the display window for one view, and when the percentage information has negative value, a displacement direction is reversed.

7. The method claim 6, wherein:

the percentage information is used to displace a region to a left on a left eye view and to a right on a right eye view.

8. A 360-degree video data processing method performed by a 360-degree video transmitting device, the method comprising:

acquiring a 360-degree video data;

deriving pictures;

generating metadata;

encoding the pictures; and performing processing for storing or transmission of the encoded pictures and the metadata, wherein:

the metadata includes overlay related metadata, the overlay related metadata includes distance information indicating a distance from a center of a unit sphere for representing the 360-degree video, wherein the distance is identical as a radius of a unit sphere, the overlay related metadata includes information of the overlay, the overlay related metadata includes flag information on a disparity, when a value of the flag information is equal to 1, the flag information indicates that the disparity is provided as a percentage value of the width of a display window for one view, and when the value of the flag information is equal to 0, the flag information indicates that the disparity is provided as a number of pixels, and the information of the overlay includes a rendering type of overlay in 3D space of the 360-degree video.

9. A 360-degree video receiving device, the device comprising:

a reception processor receiving 360-degree video data including encoded pictures and acquiring metadata;

a data decoder decoding pictures; and a renderer rendering the decoded pictures and an overlay based on the metadata, wherein:

the metadata includes overlay related metadata, the overlay related metadata includes distance information indicating a distance from a center of a unit sphere for representing the 360-degree video, wherein the distance is identical as a radius of a unit sphere, the overlay related metadata includes information of the overlay, the information of the overlay includes a rendering type of overlay in 3D space of the 360-degree video, the overlay related metadata includes flag information on a disparity, when a value of the flag information is equal to 1, the flag information indicates that the disparity is provided as a percentage value of the width of a display window for one view, and when the value of the flag information is equal to 0, the flag information indicates that the disparity is provided as a number of pixels, and the overlay is rendered based on the overlay related metadata.

10. A 360-degree video transmitting device, the device comprising:

a projection processor configured to generate pictures of 360-degree video;

a metadata processor configured to generate metadata;

a data encoder configured to encode pictures; and a transmission processor configured to perform processing for storing or transmission of the encoded pictures and metadata, wherein:

the metadata includes overlay related metadata, the overlay related metadata includes distance information indicating a distance from a center of a unit sphere for representing the 360-degree video, wherein the distance is identical as a radius of a unit sphere, the overlay related metadata includes information of the overlay, and the information of the overlay includes a rendering type of overlay in 3D space of the 360-degree video, and the overlay related metadata includes flag information on a disparity, when a value of the flag information is equal to 1, the flag information indicates that the disparity is provided as a percentage value of the width of a display window for one view, and when the value of the flag information is equal to 0, the flag information indicates that the disparity is provided as a number of pixels.

* * * * *